(12) United States Patent
Adachi et al.

(10) Patent No.: US 10,284,797 B2
(45) Date of Patent: May 7, 2019

(54) IMAGE GENERATING SYSTEM, IMAGE GENERATION METHOD, IMAGING ELEMENT, AND RECORDING MEDIUM

(71) Applicant: Panasonic Intellectual Property Management Co., Ltd., Osaka (JP)

(72) Inventors: Yasuhiko Adachi, Hyogo (JP); Yoshikuni Sato, Fukui (JP); Hideto Motomura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 264 days.

(21) Appl. No.: 15/215,790

(22) Filed: Jul. 21, 2016

(65) Prior Publication Data

US 2016/0330389 A1 Nov. 10, 2016

Related U.S. Application Data

(63) Continuation of application No. PCT/JP2015/004719, filed on Sep. 16, 2015.

(30) Foreign Application Priority Data

Oct. 27, 2014 (JP) .................................. 2014-218151
Jul. 21, 2015 (JP) .................................. 2015-144005

(51) Int. Cl.
*H04N 5/357* (2011.01)
*H04N 5/225* (2006.01)
(Continued)

(52) U.S. Cl.
CPC ......... *H04N 5/357* (2013.01); *G02B 21/0008* (2013.01); *H04N 5/217* (2013.01);
(Continued)

(58) Field of Classification Search
CPC .. H04N 5/2256; H04N 5/2354; H04N 5/2351; H04N 5/2352; H04N 5/2353;
(Continued)

(56) References Cited

U.S. PATENT DOCUMENTS 6,061,100 A  5/2000  Ward et al.
9,426,429 B2 * 8/2016  Zheng .................... G02B 21/06
(Continued)

FOREIGN PATENT DOCUMENTS

JP  62-137037    6/1987
JP  2003-304395  10/2003
JP  2013-508775  3/2013

OTHER PUBLICATIONS

Extended European Search Report dated Sep. 28, 2017 in related European Patent Application No. 15853824.9.
(Continued)

*Primary Examiner* — Dave Czekaj
*Assistant Examiner* — Kehinde Abimbola
(74) *Attorney, Agent, or Firm* — Wenderoth, Lind & Ponack, L.L.P.

(57) ABSTRACT

An image generating system according to an aspect of the present disclosure includes an image obtaining device, an image generating circuit, and an image processing circuit. The image obtaining device includes an illuminating system that irradiates an object included in a module in which the object and an imaging element are integrated together, with light sequentially from a plurality of different radiation directions. The image obtaining device obtains a plurality of images corresponding to the plurality of different radiation directions. The image generating circuit generates a high-resolution image of the object having a higher resolution than each of the plurality of images by combining the plurality of images together. The image processing circuit
(Continued)

detects noise resulting from a foreign object located farther from an imaging surface of the imaging element than the object and removes the noise.

19 Claims, 37 Drawing Sheets

(51) Int. Cl.
H04N 5/217 (2011.01)
H04N 5/232 (2006.01)
H04N 5/349 (2011.01)
G02B 21/00 (2006.01)

(52) U.S. Cl.
CPC ....... *H04N 5/2256* (2013.01); *H04N 5/23232* (2013.01); *H04N 5/349* (2013.01)

(58) Field of Classification Search
CPC ........... H04N 13/0221; H04N 13/0253; H04N 5/2252; H04N 5/23212; H04N 13/0239; H04N 13/0257; H04N 13/0271; H04N 13/044; H04N 13/0484; G06T 5/002; G06T 2207/10116; G06T 2207/30148; G06T 7/001; G06T 2207/20192
See application file for complete search history.

(56) References Cited

U.S. PATENT DOCUMENTS

| | | | |
|---|---|---|---|
| 2006/0262301 A1* | 11/2006 | Watanabe | G01J 3/2803 356/318 |
| 2009/0152475 A1* | 6/2009 | Sasaki | G01J 3/10 250/492.1 |
| 2009/0237532 A1* | 9/2009 | Mori | H04N 5/357 348/242 |
| 2011/0013746 A1* | 1/2011 | Zeller | A61B 6/145 378/98 |
| 2011/0273581 A1* | 11/2011 | Fujii | G02B 7/34 348/222.1 |
| 2012/0098950 A1* | 4/2012 | Zheng | G02B 21/06 348/79 |
| 2012/0133786 A1* | 5/2012 | Watanabe | G06T 7/20 348/208.4 |
| 2012/0218379 A1 | 8/2012 | Ozcan et al. | |
| 2014/0118529 A1 | 5/2014 | Zheng et al. | |

OTHER PUBLICATIONS

International Search Report of PCT application No. PCT/JP2015/004719 dated Dec. 15, 2015.

* cited by examiner

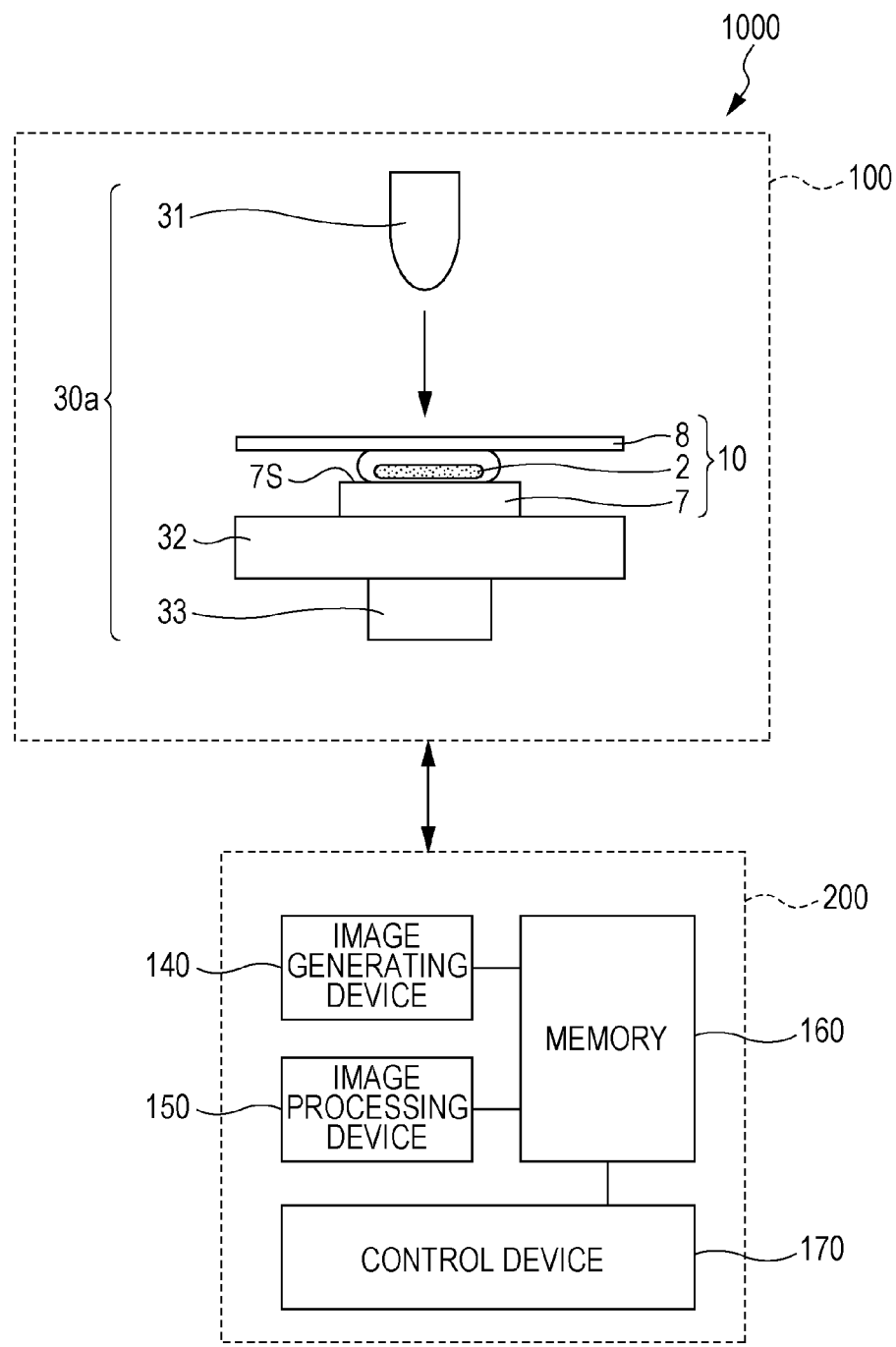

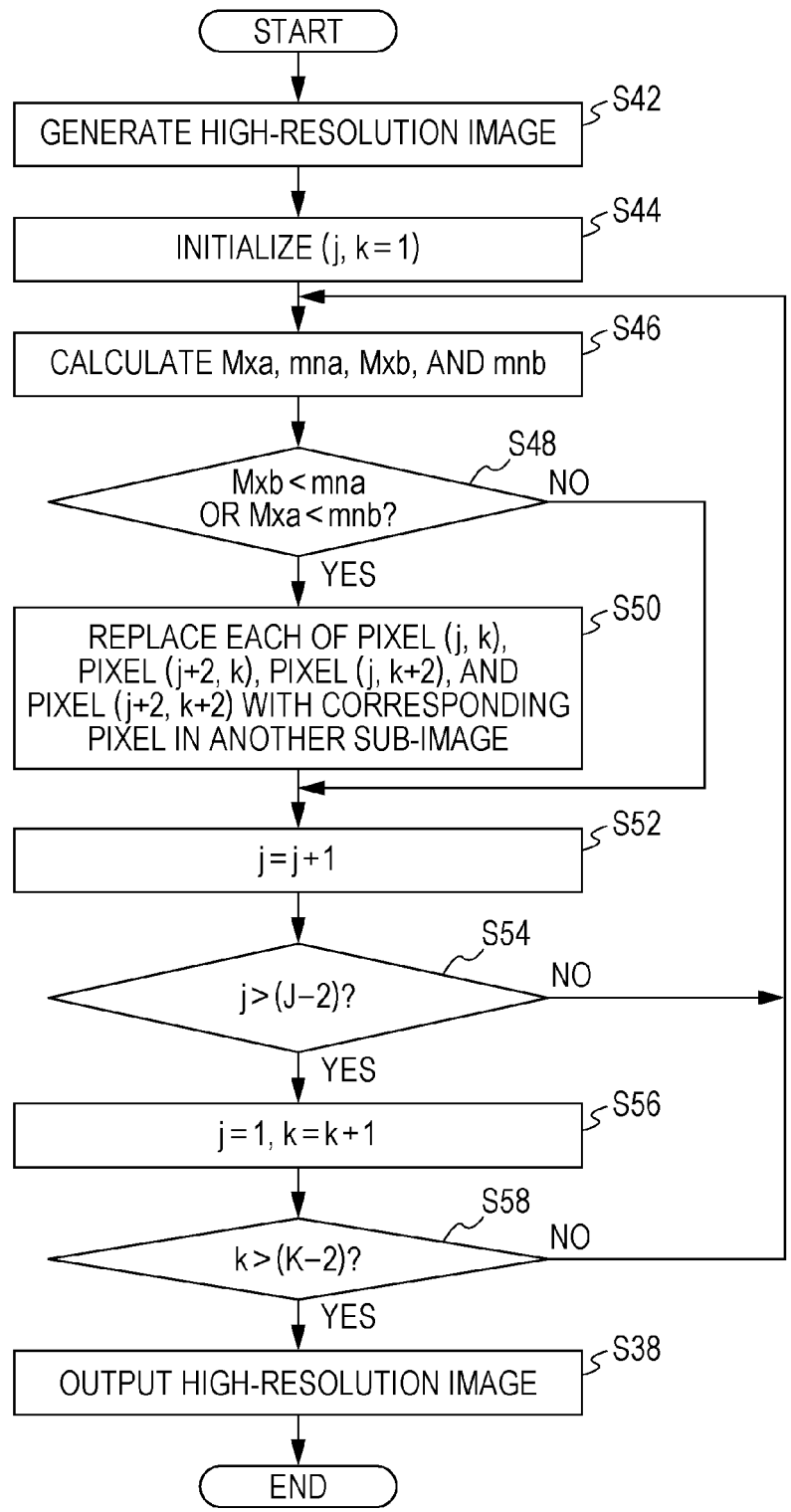

IMAGE GENERATING SYSTEM, IMAGE GENERATION METHOD, IMAGING ELEMENT, AND RECORDING MEDIUM

BACKGROUND

1. Technical Field

The present disclosure relates to an image generating system, an image generation method, and an imaging element, and a recording medium.

2. Description of the Related Art

Optical microscopes have been used to observe microstructure of objects, such as biological tissue. Optical microscopes utilize light that has passed through or been reflected by an object being observed. Observers observe an image enlarged by lenses.

Imaging systems not using lenses have also been proposed. Japanese Unexamined Patent Application Publication (Translation of PCT Application) No. 2013-508775 discloses a lens-free imaging system for imaging a cytological sample (FIG. 1). In this system, a holder holding a sample is positioned above an imaging sensor array. The sample held by the holder is irradiated with light from above, and light that has passed through the sample is incident on the imaging sensor array.

Recently, techniques for observing microstructure using CIS (Contact Image Sensing) have been attracting attention. In CIS, an object being observed is positioned in proximity to an imaging surface of an image sensor. In general, a two-dimensional image sensor including many photoelectric converters arranged in a matrix on the imaging surface is used as the image sensor. The photoelectric converters, typically photodiodes formed on a semiconductor layer or a semiconductor substrate, receive incident light and generate electric charge.

An image sensor includes many unit regions (unit pixel cells) each including a photoelectric converter. An image obtained by an image sensor is constituted by many pixels each representing a pixel value obtained by the photoelectric converter of a corresponding one of the unit pixel cells. Accordingly, resolution (resolving power) of a two-dimensional image sensor is usually dependent on the array pitch of the photoelectric converters on the imaging surface. Herein, resolution that is determined by the array pitch of the photoelectric converters is also referred to as "intrinsic resolution" of the image sensor. Since the array pitch of the photoelectric converters has become as small as approximately a wavelength of visible light, it is difficult to further increase the intrinsic resolution.

Techniques for realizing a resolution exceeding the intrinsic resolution of an image sensor have been proposed. Japanese Unexamined Patent Application Publication No. 62-137037 discloses a technique of generating an image of an object by using a plurality of images of the object that are obtained by shifting the image formation position of the object.

SUMMARY

One non-limiting and exemplary aspect of the present disclosure provides an image generating system capable of improving the practical usability of a resolution-increasing technique that realizes a resolution exceeding the intrinsic resolution of an image sensor.

In one general aspect, the techniques disclosed here feature an image generating system including an image obtaining device, an image processing circuit, and an image generating circuit. The image obtaining device includes an illuminating system that emits first illuminating light toward an object from a first direction and emits second illuminating light toward the object from a second direction different from the first direction after emitting the first illuminating light. The object is included in a module in which an imaging element including a plurality of photoelectric converters and the object including a first portion and a second portion adjacent to the first portion are integrated together. The plurality of photoelectric converters obtain a first plurality of pixel values including a first pixel value, based on first resulting light obtained as a result of the first illuminating light passing through the object, and obtain a second plurality of pixel values including a second pixel value, based on second resulting light obtained as a result of the second illuminating light passing through the object. The plurality of photoelectric converters include a first photoelectric converter and a second photoelectric converter. The first photoelectric converter outputs the first pixel value, based on part of the first resulting light obtained as a result of part of the first illuminating light passing through the first portion. The second photoelectric converter outputs the second pixel value, based on part of the second resulting light obtained as a result of part of the second illuminating light passing through the second portion. The first photoelectric converter and the second photoelectric converter are one and the same or are adjacent to each other in the imaging element. The image processing circuit determines whether an absolute value of a difference between the first pixel value and the second pixel value is larger than a predetermined threshold. The image generating circuit generates an image based on the first plurality of pixel values and the second plurality of pixel values. The number of pixel values in the generated image is more than the number of the first plurality of pixel values and the number of the second plurality of pixel values.

According to the aspect of the present disclosure, the practical usability of a resolution-increasing technique that realizes a resolution exceeding the intrinsic resolution of an image sensor improves.

It should be noted that these general or specific embodiments may be implemented as a device, a method, an integrated circuit, a computer program, or a computer-readable recording medium, or may be implemented as any selective combination of a device, a system, a method, an integrated circuit, a computer program, and a computer-readable recording medium. Examples of the computer-readable recording medium include a non-volatile recording medium, such as a CD-ROM (Compact Disc-Read Only Memory).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a schematic diagram illustrating an example of a configuration of an image generating system according to an embodiment of the present disclosure;

FIG. 24C is a flowchart illustrating still another example of the combination of the noise detection process using filters and the noise removal process;

DETAILED DESCRIPTION

<Principle of how High-Resolution Image is Generated>

In an embodiment of the present disclosure, a plurality of images obtained by performing imaging a plurality of times while changing the radiation direction of illuminating light are used to generate an image (hereinafter, referred to as a "high-resolution image") having a resolution higher than each of the plurality of images. Referring first to FIGS. 1A to 6, the principle of how a high-resolution image is generated will be described. Herein, the description will be given using a CCD (Charge Coupled Device) image sensor as an example. Note that components having substantially the same function are denoted by the same reference sign in the following description, and the description thereof may be omitted.

Figure 1A:
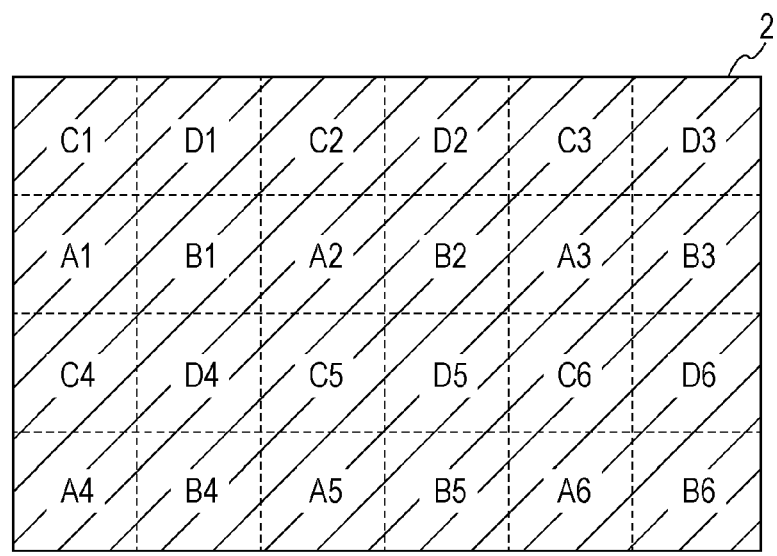
FIG. 1A is a plan view schematically illustrating a portion of an object.
Figure 1B:
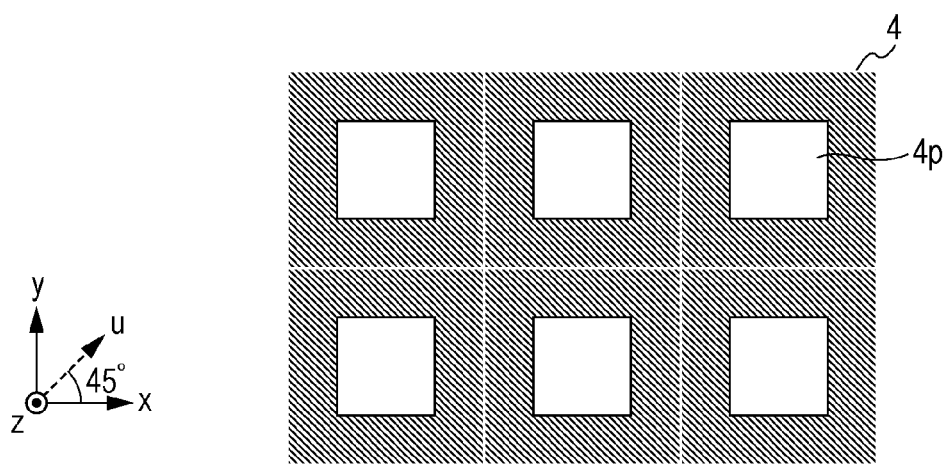
FIG. 1B is a plan view schematically illustrating some photodiodes relating to imaging of a region illustrated in FIG. 1A.

FIG. 1A and FIG. 1B are referred to. FIG. 1A is a plan view schematically illustrating a portion of an object. An object 2 illustrated in FIG. 1A is, for example, a thin slice (typically, having a thickness of several tens of micrometers or less) of biological tissue. When an image of the object 2 is obtained, the object 2 is positioned in proximity to an imaging surface of an image sensor. A distance from the surface of photoelectric converters (photodiodes in this case) of the image sensor to the object 2 is typically 1 mm or less and can be set to approximately 1 µm, for example.

FIG. 1B is a plan view schematically illustrating some photodiodes relating to imaging of the region illustrated in FIG. 1A among the photodiodes of the image sensor. In an example described here, six photodiodes are illustrated among photodiodes 4p formed on an image sensor 4. For reference, FIG. 1B illustrates arrows indicating an x-direction, a y-direction, and a z-direction that are perpendicular to one another. The z-direction indicates the direction of the normal of the imaging surface. FIG. 1B also illustrates an arrow indicating a u-direction, which is a direction rotated by 45° from the x-axis toward the y-axis on the x-y plane. Some of other figures illustrate the arrow indicating the x-direction, the y-direction, the z-direction, or the u-direction.

Components of the image sensor 4 other than the photodiodes 4p are covered with a light-shielding layer. A hatched region in FIG. 1B indicates a region covered with the light-shielding layer. An area (S2) of a light-receiving surface of each photodiode on the imaging surface of the CCD image sensor is smaller than an area (S1) of a unit region including the photodiode, that is, of a unit pixel cell. A ratio (S2/S1) of the area (S2) of the light-receiving surface to the area S1 of the unit pixel cell is called an "aperture ratio". The description will be given herein on the assumption that the aperture ratio is 25%.

Figure 2A:
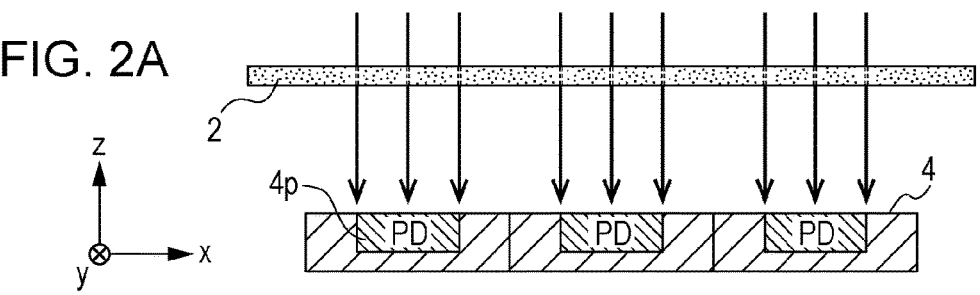
FIG. 2A is a cross-sectional view schematically illustrating a direction of light beams incident on photodiodes after passing through the object.
Figure 2B:
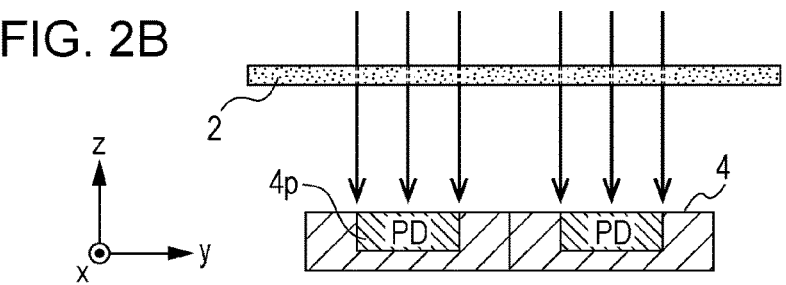
FIG. 2B is a cross-sectional view schematically illustrating the direction of light beams incident on the photodiodes 4p after passing through the object.

FIG. 2A and FIG. 2B each schematically illustrate a direction of light beams incident on the photodiodes 4p after passing through the object 2. FIG. 2A and FIG. 2B each illustrate a state where light beams are incident from a direction (first radiation direction) perpendicular to the imaging surface. As schematically illustrated in FIG. 2A and FIG. 2B, no lens for forming an image is disposed between the object 2 and the image sensor 4, and an image of the object 2 is obtained using substantially parallel light beams that pass through the object 2 in this case. Note that a lens may be disposed between the object 2 and the image sensor 4.

Figure 2C:
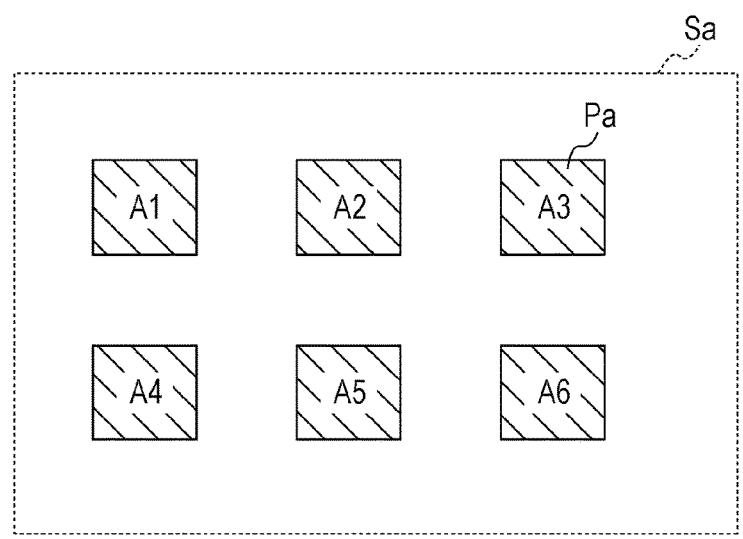
FIG. 2C is a diagram schematically illustrating six pixels obtained by the six photodiodes.

FIG. 2C schematically illustrates an image Sa (first sub-image Sa) obtained when illuminating light is radiated from the first radiation direction. As illustrated in FIG. 2C, the first sub-image Sa is constituted by six pixels Pa obtained by the six photodiodes 4p. Each of the pixels Pa has a value (pixel value) denoting an amount of light incident on a corresponding one of the photodiodes 4p.

As illustrated in FIG. 2A and FIG. 2B, when the object 2 is irradiated with light from a direction perpendicular to the imaging surface, light that has passed through a region of the entire object 2 located right above each of the photodiodes 4p is incident on the photodiode 4p. In this example, the first sub-image Sa has information regarding regions A1, A2, A3, A4, A5, and A6 (see FIG. 1A) of the entire object 2. Light that has passed through regions not located right above the photodiodes 4p is not incident on the photodiodes 4p. Accordingly, the first sub-image Sa lacks information regarding regions of the entire object 2 other than the regions A1, A2, A3, A4, A5, and A6.

Figure 3A:
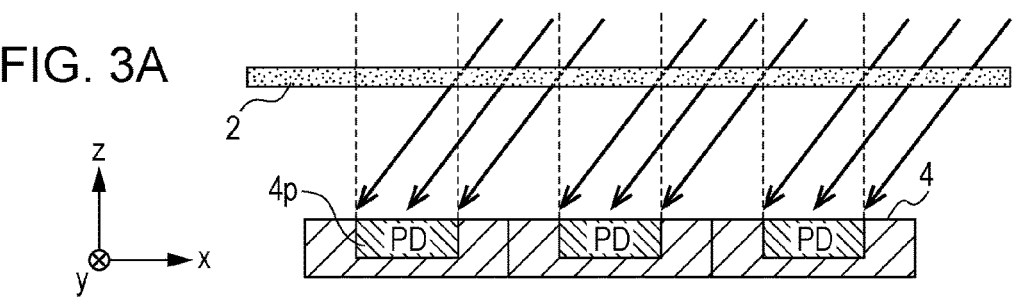
FIG. 3A is a cross-sectional view schematically illustrating a state where light beams are incident from a radiation direction different from a first radiation direction.
Figure 3B:
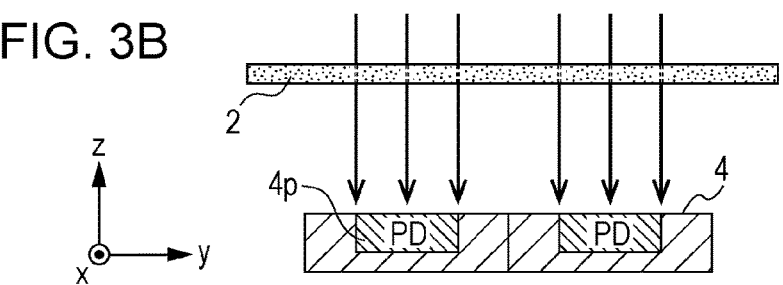
FIG. 3B is a cross-sectional view schematically illustrating a state where light beams are incident from the radiation direction different from the first radiation direction.

FIG. 3A and FIG. 3B each illustrate a state where light beams are incident from a radiation direction different from the first radiation direction. Light beams illustrated in FIG. 3A and FIG. 3B are tilted toward the x-direction with respect to the z-direction. In this case, light that has passed through a region of the entire object 2 different from a region located right above each of the photodiodes 4p is incident on the photodiode 4p.

Figure 3C:
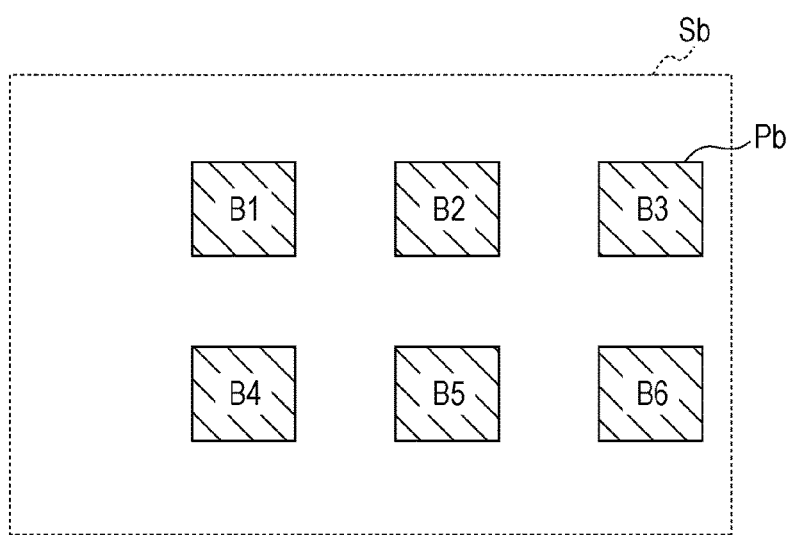
FIG. 3C is a diagram schematically illustrating six pixels obtained when illuminating light is radiated from a second radiation direction.

FIG. 3C schematically illustrates an image Sb (second sub-image Sb) obtained when illuminating light is radiated from the radiation direction (second radiation direction) illustrated in FIG. 3A and FIG. 3B. As illustrated in FIG. 3C, the second sub-image Sb is also constituted by six pixels Pb obtained by the six photodiodes 4p. However, the pixels Pb constituting the second sub-image Sb have pixel values for regions B1, B2, B3, B4, B5, and B6 (see FIG. 1A) different from the regions A1, A2, A3, A4, A5, and A6 of the entire object 2. That is, the second sub-image Sb does not have information regarding the regions A1, A2, A3, A4, A5, and A6 of the entire object 2; instead, it has information regarding the regions B1, B2, B3, B4, B5, and B6. In this example, for example, the region B1 is a region that is on the right side of and is adjacent to the region A1 in the object 2 (see FIG. 1A).

As understood from comparison of FIG. 2A and FIG. 2B with FIG. 3A and FIG. 3B, a light beam that has passed through different regions of the object 2 is successfully caused to be incident on the photodiode 4p by appropriately changing the radiation direction. This consequently allows the first sub-image Sa and the second sub-image Sb to include pixel information corresponding to different positions in the object 2.

Figure 4A:
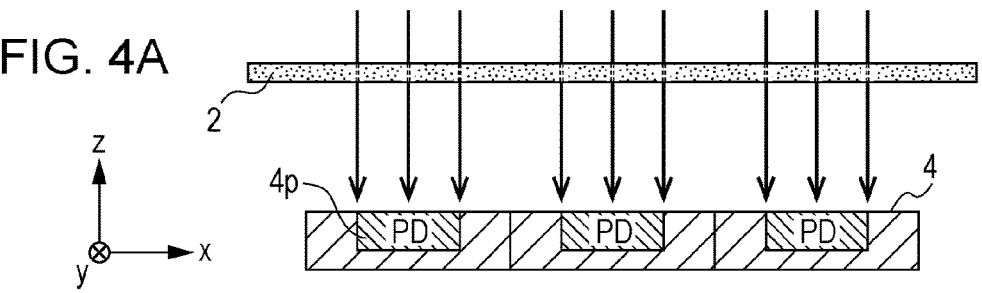
FIG. 4A is a cross-sectional view schematically illustrating a state where light beams are incident from a radiation direction different from the first radiation direction and the second radiation direction.
Figure 4B:
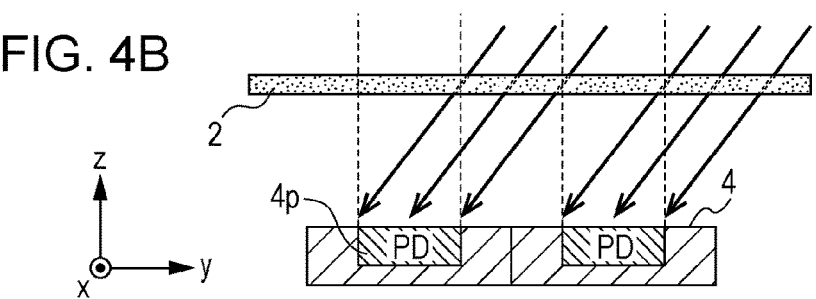
FIG. 4B is a cross-sectional view schematically illustrating a state where light beams are incident from the radiation direction different from the first radiation direction and the second radiation direction.

FIG. 4A and FIG. 4B each illustrate a state where light beams are incident from a radiation direction different from the first radiation direction and the second radiation direction. Light beams illustrated in FIG. 4A and FIG. 4B are tilted toward the y-direction with respect to the z-direction.

Figure 4C:
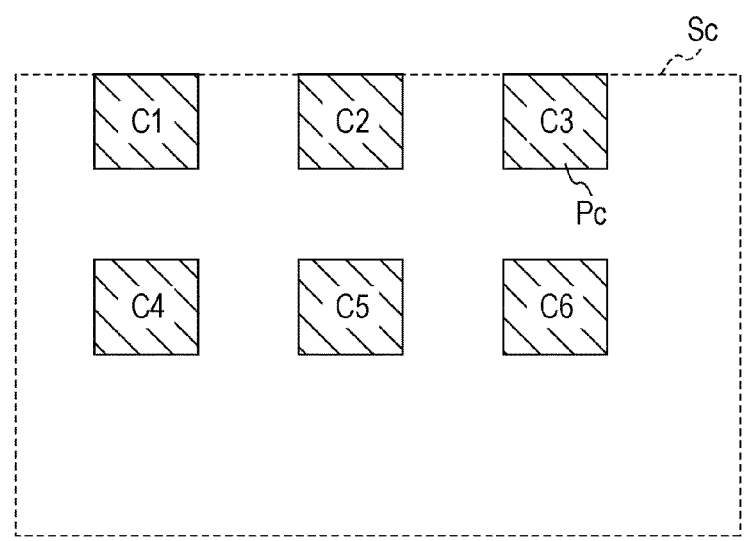
FIG. 4C is a diagram schematically illustrating six pixels obtained when illuminating light is radiated from a third radiation direction.

FIG. 4C schematically illustrates an image Sc (third sub-image Sc) obtained when illuminating light is radiated from the radiation direction (third radiation direction) illustrated in FIG. 4A and FIG. 4B. As illustrated in FIG. 4C, the third sub-image Sc is constituted by six pixels Pc obtained by the six photodiodes 4p. As illustrated, the third sub-image Sc has information regarding regions C1, C2, C3, C4, C5, and C6 illustrated in FIG. 1A in the entire object 2. In this example, for example, the region C1 is a region that is on the upper side of and is adjacent to the region A1 in the object 2 (see FIG. 1A).

Figure 5A:
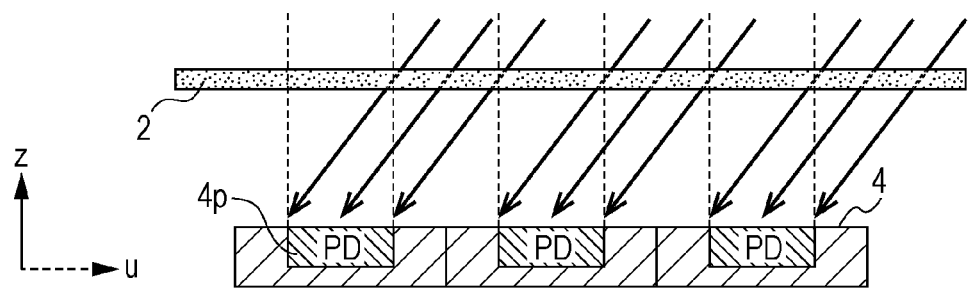
FIG. 5A is a cross-sectional view schematically illustrating a state where light beams are incident from a radiation direction different from the first radiation direction, the second radiation direction, and the third radiation direction.

FIG. 5A illustrates a state where light beams are incident from a radiation direction different from the first radiation direction, the second radiation direction, and the third radiation direction. Light beams illustrated in FIG. 5A are tilted, with respect to the z-direction, toward a direction that makes an angle of 45° with the x-axis on the x-y plane.

Figure 5B:
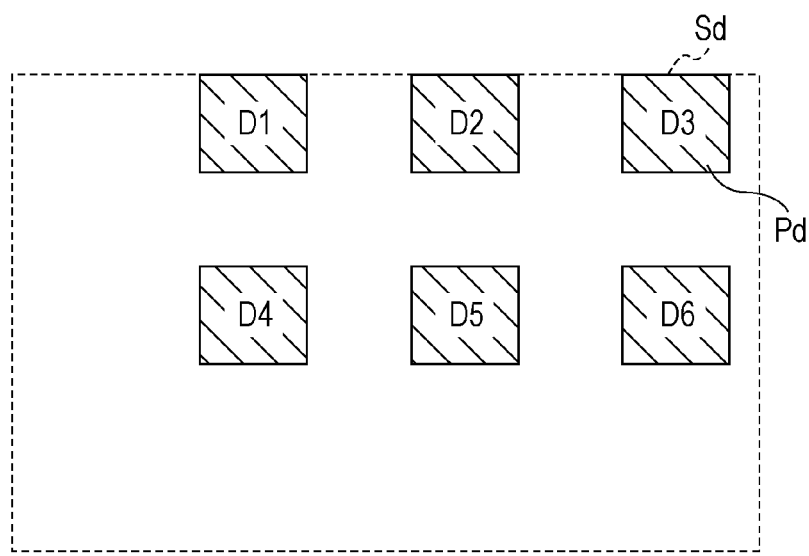
FIG. 5B is a diagram schematically illustrating six pixels obtained when illuminating light is radiated from a fourth radiation direction.

FIG. 5B schematically illustrates an image Sd (fourth sub-image Sd) obtained when illuminating light is radiated from the radiation direction (fourth radiation direction) illustrated in FIG. 5A. As illustrated in FIG. 5B, the fourth sub-image Sd is constituted by six pixels Pd obtained by the six photodiodes 4p. The fourth sub-image Sd has information regarding regions D1, D2, D3, D4, D5, and D6 illustrated in FIG. 1A in the entire object 2. In this example, for example, the region D1 is a region that is on the right side of and is adjacent to the region C1 (see FIG. 1A). As described above, the sub-images Sa, Sb, Sc, and Sd contain images based on different portions of the object 2.

Figure 6:
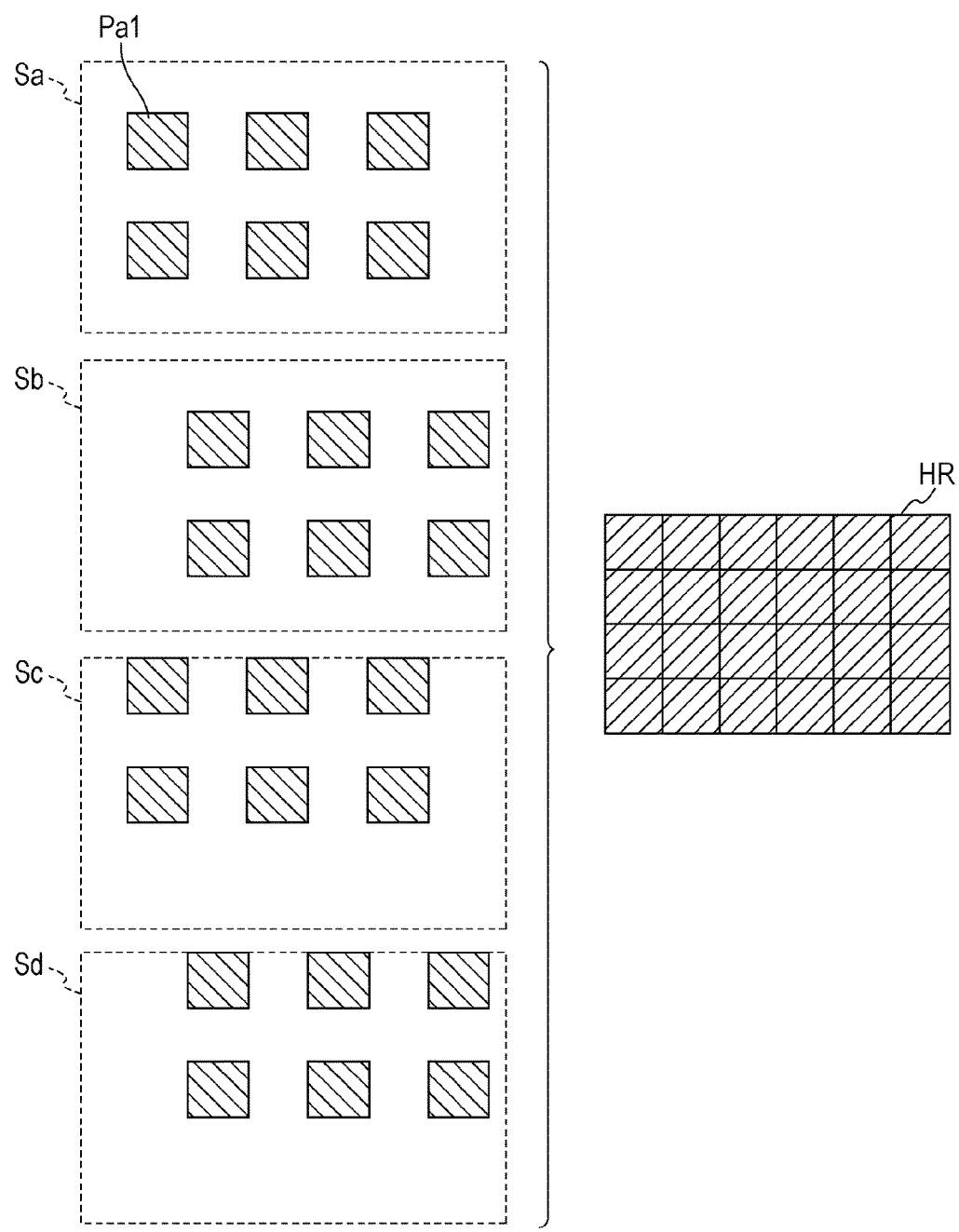
FIG. 6 is a diagram illustrating a high-resolution image obtained by combining four sub-images together.

FIG. 6 illustrates a high-resolution image HR obtained by combining the four sub-images Sa, Sb, Sc, and Sd together. As illustrated in FIG. 6, the number of pixels or pixel density of the high-resolution image HR is four times as high as the number of pixels or pixel density of each of the four sub-images Sa, Sb, Sc, and Sd.

For example, the regions A1, B1, C1, and D1 of the object 2 illustrated in FIG. 1A are focused on. As understood from the above description, a pixel Pa1 of the sub-image Sa illustrated in FIG. 6 has information regarding the region A1, instead of information regarding the entire block described above. Accordingly, the sub-image Sa can be assumed as an image lacking information regarding the regions B1, C1, and D1.

However, information which the sub-image Sa lacks can be complemented by using the sub-images Sb, Sc, and Sd having pixel information corresponding to different positions in the object 2, and the high-resolution image HR having the information regarding the entire block can be generated, as illustrated in FIG. 6. The resolution of the individual sub-images is equal to the intrinsic resolution of the image sensor 4, whereas a resolution that is four times as high as the intrinsic resolution of the image sensor 4 is achieved in this example. How much the resolution is increased (degree of super-resolution) is dependent on the aperture ratio of the image sensor. In this example, since the aperture ratio of the image sensor 4 is 25%, an increase in resolution by up to four times is achieved by radiation of light from four different directions. Let N be an integer of 2 or greater. Then, if the aperture ratio of the image sensor 4 is approximately equal to 1/N, the resolution can be increased by up to N times.

As described above, the amount of pixel information "spatially" sampled from an object can be increased by performing imaging of the object while irradiating the object with parallel light sequentially from a plurality of different radiation directions with respect to the object. By combining the plurality of resulting sub-images together, a high-resolution image having a resolution higher than each of the plurality of sub-images can be generated. Obviously, the radiation directions are not limited to those described with reference to FIG. 2A to FIG. 5B.

In the above-described example, the different sub-images Sa, Sb, Sc, and Sd illustrated in FIG. 6 have pixel information regarding different regions of the object 2 and do not have any overlap. However, different sub-images may have an overlap.

Figure 7A:
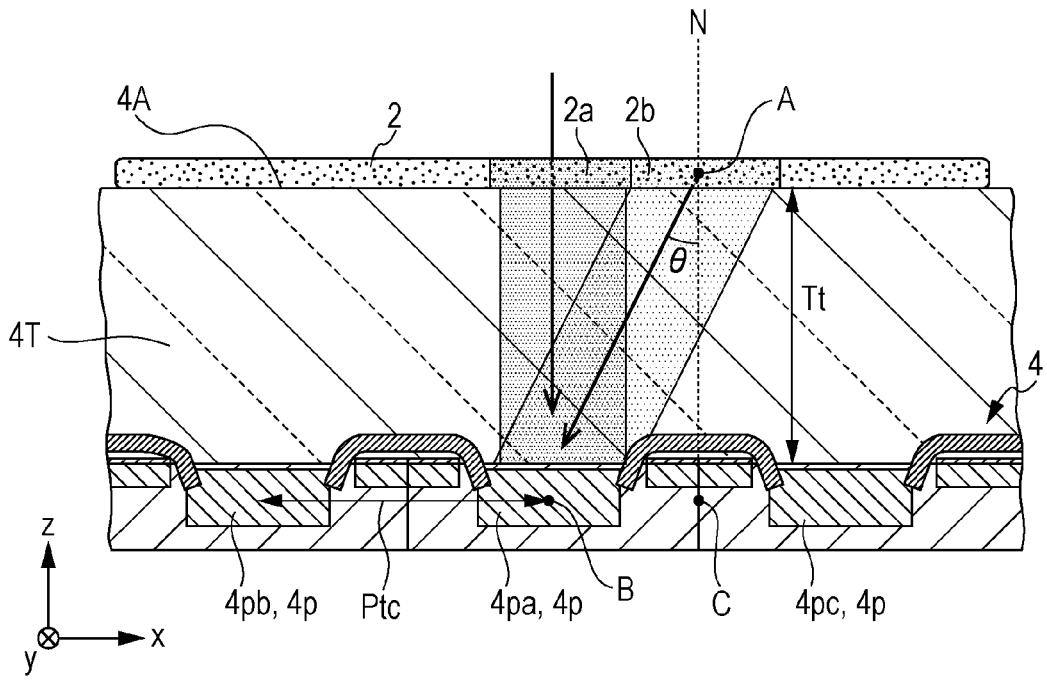
FIG. 7A is a schematic cross-sectional view for describing a method for calculating an angle between a normal of an imaging surface of an image sensor and a light beam that travels toward the photodiode.

In the above-described example, both light beams that have passed through two adjacent regions of the object 2 are incident on the same photodiode. Referring to FIG. 7A, an example of a method for calculating such a radiation direction will be described below.

FIG. 7A is a schematic cross-sectional view for describing a method for calculating an angle between a normal N of the imaging surface of the image sensor 4 and a light beam that travels toward the photodiode 4p. FIG. 7A illustrates three photodiodes 4pb, 4pa, and 4pc disposed in the x-direction among the photodiodes 4p included in the image sensor 4. In the configuration illustrated in FIG. 7A, the image sensor 4 includes a transparent layer 4T that covers these photodiodes 4pb, 4pa, and 4pc, and the object 2 is positioned on this transparent layer 4T. Typically, the surface of the transparent layer 4T is parallel to the surface of the photodiodes 4p.

As illustrated, when the object 2 is irradiated with illuminating light from a direction perpendicular to an imaging surface 4A, light that has passed through a region 2a of the object 2 is incident on the photodiode 4pa located right below the region 2a. The width of the region 2a in the x-direction is the same as the width of the photodiode 4p in the x-direction.

FIG. 7A also illustrates light that has passed through the object 2 in a state where the radiation direction is tilted by an angle θ. Hereinafter, light obtained as a result of illuminating light passing through an object is sometimes referred to as "resulting light". In the illustrated example, when the radiation direction is tilted by the angle θ, light that has passed through a region 2b adjacent to the region 2a of the object 2 is incident on the photodiode 4pa. The angle θ indicating the radiation direction can be calculated in the following manner. For the sake of simplicity, it is assumed in this example that the width of a portion located between two photodiodes 4p (portion covered with the light-shielding layer) in the x-direction is the same as the width of each photodiode 4p in the x-direction. In other words, in this example, an array pitch Ptc between the centers of two photodiodes 4p that are adjacent in the x-direction is twice the width of each photodiode 4p in the x-direction. In addition, the width of the region 2b in the x-direction and the width of each photodiode 4p in the x-direction are the same.

A triangle ABC formed by three points A, B, and C, which are denoted by black dots in FIG. 7A, is focused on. Here, the points A, B, and C are the center of the region 2b, the center of the photodiode 4pa, and the midpoint between the photodiode 4pa and the photodiode 4pc, respectively. Let Tt denote thickness of the transparent layer 4T, and thickness of the object 2 and thickness of the photodiode 4p are ignored. Then, the angle θ is determined to be θ=arctan((Ptc/2)/Tt) as an angle between a side AB and a side AC. As described above, the radiation directions used when sub-images are obtained can be determined by geometric calculation, for example.

The radiation direction is not limited to the direction that makes both light beams that have passed through two adjacent regions of the object 2 be incident on the same photodiode. For example, as illustrated in FIG. 7B, the radiation direction may be adjusted such that light beams that have passed through two adjacent regions of the object 2 are incident on different photodiodes.

Figure 7B:
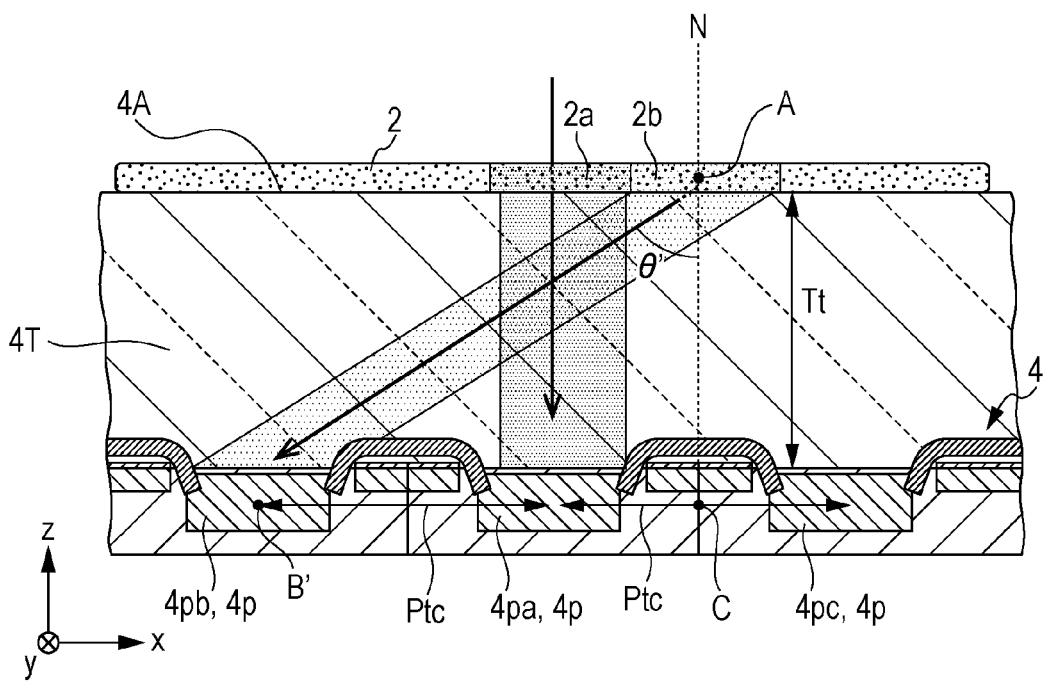
FIG. 7B is a cross-sectional view schematically illustrating a radiation direction adjusted such that light beams that have passed through two adjacent regions of the object are incident on different photodiodes.

In the example illustrated in FIG. 7B, when the radiation direction is tilted by an angle θ' from the direction perpendicular to the imaging surface 4A, light that has passed through the region 2b of the object 2 is incident on the photodiode 4pb adjacent to the photodiode 4pa. By focusing on a triangle AB'C formed by the aforementioned points A and C and the midpoint B' of the photodiode 4pb, the angle θ' can be determined based on a relationship of θ'=arctan((3Ptc/2)/Tt).

As understood from FIG. 7A and FIG. 7B, which region of the object 2 the light that is to be incident on a photodiode of interest has passed through is determined by the arrangement of the photodiode of interest, the object, a light source, and the like. Accordingly, a correspondence between an output of each photodiode and an arrangement of each region of the object 2 can be known based on the structure of the image sensor 4 (or module described later) and the structure of an image obtaining device described later.

In the image generating system of the embodiment of the present disclosure, noise detection is performed using pixel values obtained by the same photodiode for two different radiation directions, for example. Alternatively, noise detection can be performed using a pixel value obtained by a certain photodiode for one of two different radiation directions and a pixel value obtained by another photodiode adjacent to the certain photodiode for the other of the two different radiation directions. A correspondence between pixel values used in noise detection is typically fixed between a plurality of sub-images. Specifically, the image generating system typically operates in a state where a setting is made to use pixel values obtained by the same photodiode for two different radiation directions or pixel values obtained by two adjacent photodiodes. That is, appropriate radiation directions are used depending on which set of pixel values is used. In specific examples described later, noise detection is performed using pixel values obtained by the same photodiode for two different radiation directions. In such a case, radiation directions that make both light beams that have passed through two adjacent regions of the object 2 be incident on the same photodiode are selected. In the specific examples described later, a table describing a correspondence between information indicating the radiation directions and pixel values to be used in noise detection is used.

<Module>

Sub-images are obtained in a state where the object 2 is positioned in proximity to the imaging surface of the image sensor 4 during generation of a high-resolution image based on the principle described with reference to FIG. 1A to FIG. 6. In an embodiment of the present disclosure, sub-images are obtained using a module having a structure in which the object 2 and the image sensor 4 are integrated together. An example of a configuration of the module and an example of a module production method will be described below with reference to the drawings.

Figure 8A:
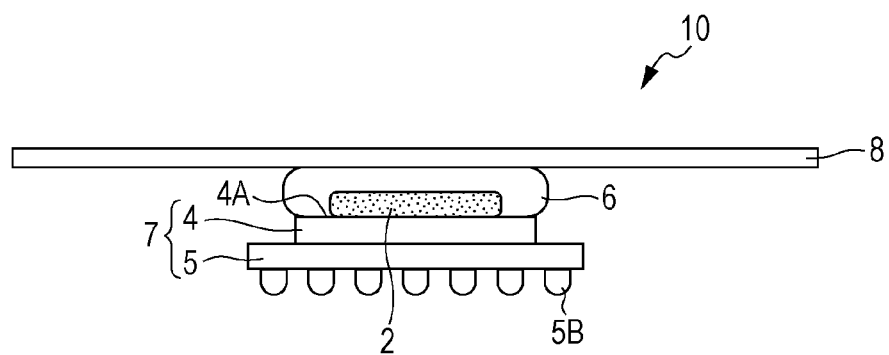
FIG. 8A is a diagram schematically illustrating an example of a cross-sectional structure of a module.

FIG. 8A schematically illustrates an example of a cross-sectional structure of the module. In a module 10 illustrated in FIG. 8A, the object 2 covered with a mounting medium 6 is disposed on the imaging surface 4A of the image sensor 4. Note that although the object 2 is in contact with the imaging surface 4A in the schematic cross-section illustrated in FIG. 8A, the mounting medium 6 may be interposed between the imaging surface 4A and the object 2.

In the illustrated example, a transparent plate (glass plate, typically) 8 is disposed above the object 2. That is, in the configuration illustrated in FIG. 8A, the object 2 is interposed between the image sensor 4 and the transparent plate 8. Since ease-of-handling improves if the module 10 includes the transparent plate 8, such a configuration is beneficial. For example, a commonly used microscope slide can be used as the transparent plate 8. Note that FIG. 8A schematically illustrates each component, and the real size and shape of each component do not necessarily match the size and shape illustrated in FIG. 8A. The same applies to other figures to be referred to below.

Figure 8B:
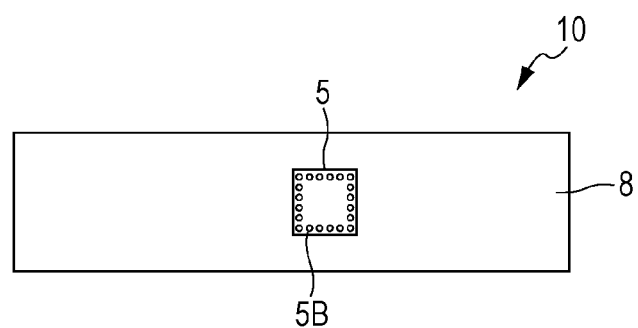
FIG. 8B is a plan view illustrating an example of an external appearance of the module illustrated in FIG. 8A, viewed from the image sensor side.

In the configuration illustrated in FIG. 8A, the image sensor 4 is fixed to a package 5 including one or more electrodes. FIG. 8B illustrates an example of an external appearance of the module 10 illustrated in FIG. 8A, viewed from the image sensor 4 side. As illustrated in FIG. 8A and FIG. 8B, the package 5 includes back-side electrodes 5B on a surface thereof opposite to the transparent plate 8 side. The back-side electrodes 5B are electrically connected to the image sensor 4 via a not-illustrated wiring pattern formed on the package 5. That is, an output of the image sensor 4 can be acquired via the back-side electrodes 5B. Herein, for the sake of convenience, a structure in which the package 5 and the image sensor 4 are integrated is sometimes referred to as a "sensor unit".

Figure 9:
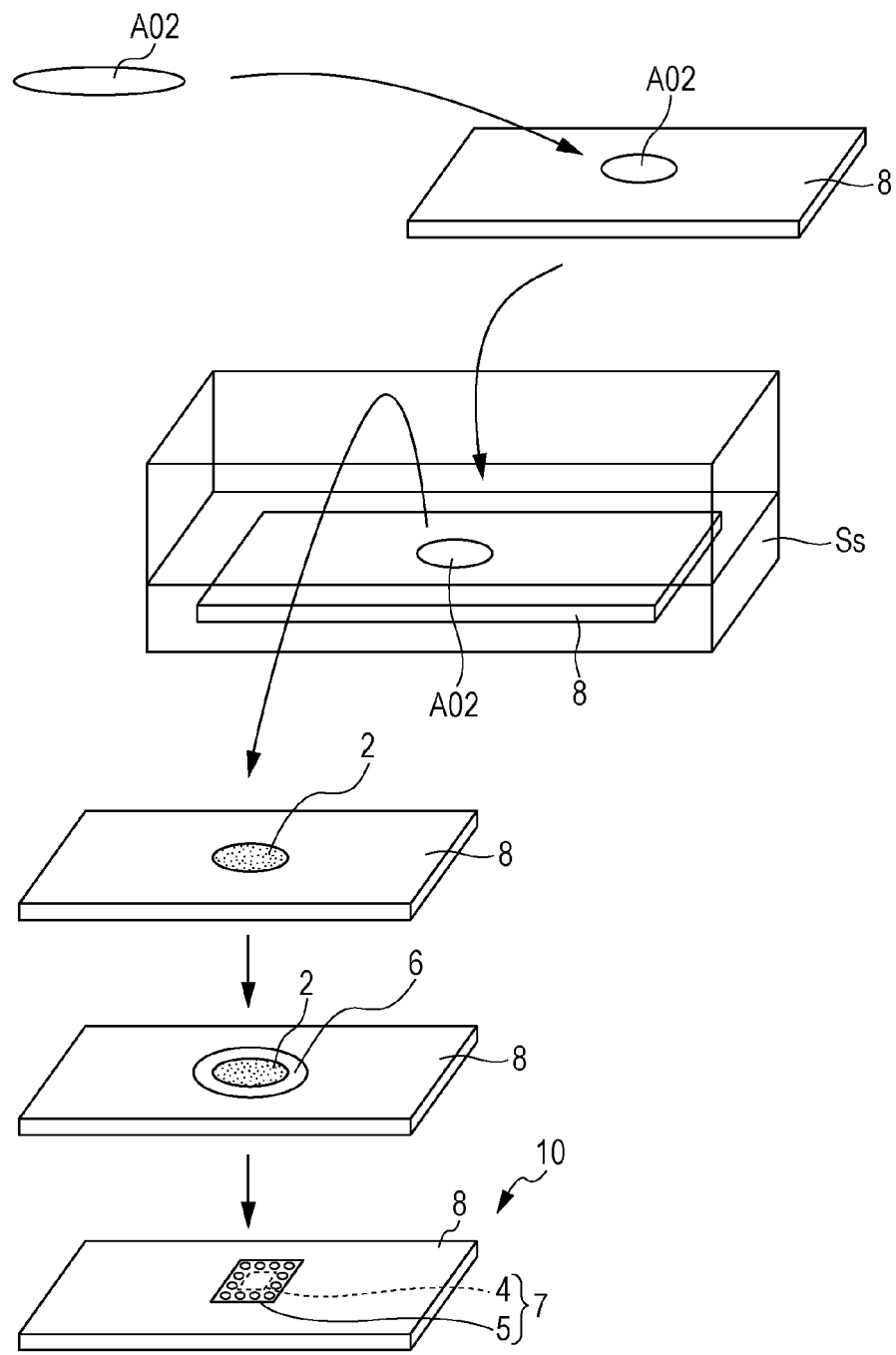
FIG. 9 is a diagram for describing an example of a module production method.

Referring to FIG. 9, an example of a method for producing the module 10 will be described. In this example, a thin slice of biological tissue (tissue section) is used as an example of the object 2. The module 10 including a thin slice of biological tissue as the object 2 can be used in pathological diagnosis.

As illustrated in FIG. 9, a tissue section A02 is placed on the transparent plate 8 first. The transparent plate 8 may be a microscope slide used for observation of a sample under optical microscopes. A microscope slide is used as an example of the transparent plate 8 below. A microscope slide typically has a thickness of 1 mm, a long-side length of 76 mm, and a short-side length of 26 mm. The tissue section A02, together with the transparent plate 8, is then immersed in a dye solution Ss, so that the tissue section A02 is stained. Then, the mounting medium 6 is disposed on the transparent plate 8, so that the object 2 obtained by staining the tissue section A02 is covered with the mounting medium 6. The mounting medium 6 has a function of protecting the object 2. Then, a sensor unit 7 is disposed on the object 2 such that the imaging surface of the image sensor 4 faces the object 2. In this way, the module 10 is obtained.

The module 10 is produced for each object to be imaged. For example, in the case of pathological diagnosis, a plurality of (e.g., 5 to 20) tissue sections are prepared from one specimen. Accordingly, a plurality of modules 10 each including, as the object 2, a tissue section obtained from the same specimen can be produced. If a plurality of sub-images are obtained for each of the plurality of modules 10, high-resolution images each corresponding to one of the plurality of modules 10 can be generated.

As illustrated in FIG. 8A, the module 10 includes the image sensor 4 that obtains an image of the object 2, unlike prepared slides used for observation under optical microscopes. Such a module may be called "electronic prepared slide". The use of the module 10 having a structure in which the object 2 and the sensor unit 7 are integrated together as illustrated in FIG. 8A can provide an advantage in which an arrangement of the object 2 and the image sensor 4 can be fixed. Note that the package 5 of the sensor unit 7 may be provided when necessary, and the module may be produced by integrating the object 2 and the image sensor 4 together. In other words, the module used for imaging of the object 2 may be a configuration not including the package 5.

Figure 10A:
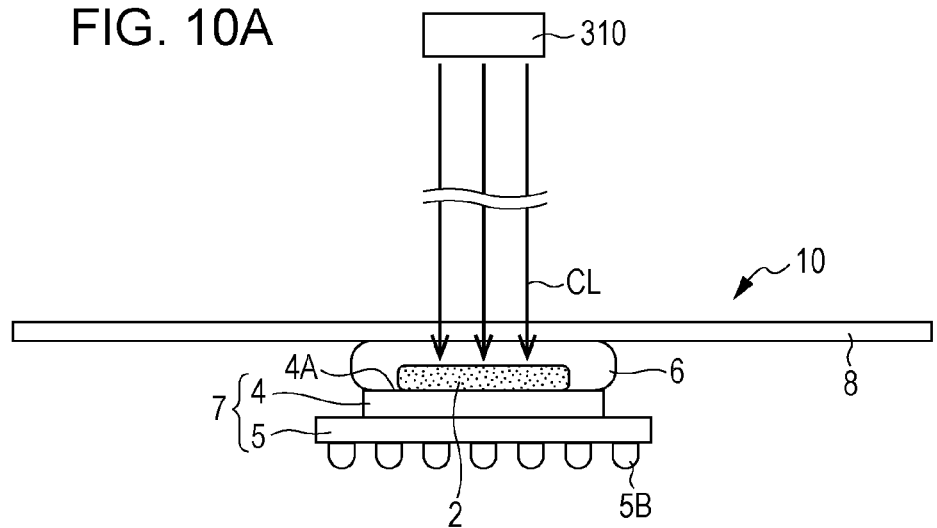
FIG. 10A is a cross-sectional view illustrating an example of a radiation angle set when a sub-image is obtained.
Figure 10B:
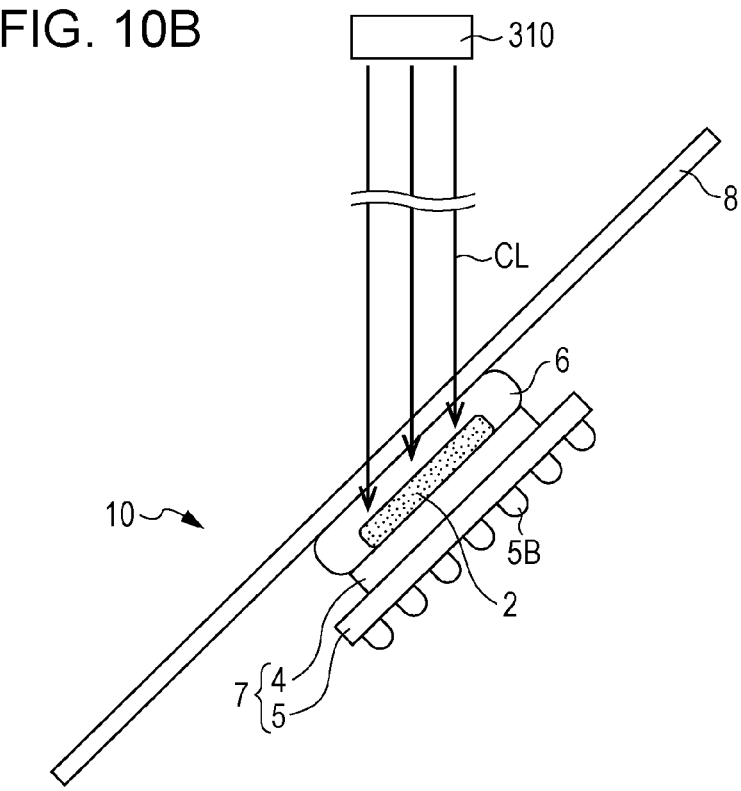
FIG. 10B is a cross-sectional view illustrating an example of a method for irradiating an object with light at a radiation angle different from the radiation angle illustrated in FIG. 10A.

When an image of the object 2 is obtained using the module 10, the object 2 is irradiated with illuminating light through the transparent plate 8. Light that has passed through the object 2 is incident on the image sensor 4. Consequently, an image of the object 2 is obtained. A plurality of different images can be obtained with the angle being changed at the time of light radiation, by sequentially performing imaging while changing a relative arrangement of the light source and the object. For example, a light source 310 is disposed right above the image sensor 4 as illustrated in FIG. 10A. If imaging is performed in a state where the objet 2 is irradiated with collimated light CL from the direction of the normal of the imaging surface 4A of the image sensor 4, a sub-image similar to the sub-image Sa illustrated in FIG. 2C is obtained. In addition, if imaging is performed by irradiating the object 2 with the collimated light CL with the module 10 tilted as illustrated in FIG. 10B, a sub-image similar to the sub-image Sb illustrated in FIG. 3C (or the sub-image Sc illustrated in FIG. 4C) is obtained. A high-resolution image can be obtained using the principle described with reference to FIG. 1A to FIG. 6, by sequentially performing imaging while changing the orientation of the module 10 with respect to the light source in this way.

Problems Found by Inventor

When imaging is performed with an object positioned in proximity to an image sensor, a transparent structure is sometimes disposed between the object and the light source. For example, in the case of using the module 10, the transparent plate 8 can be present between the object 2 and the light source during imaging. The transparent plate 8 makes handling of the module 10 easier and contributes to improvement of ease-of-handling during imaging. On the other hand, dirt such as a hair, dust, or a fragment of the object (fragment of the tissue section, for example) may attach to a surface of the transparent plate 8 of the module 10 on which illuminating light is incident. If such dirt, stain, scar, or the like is present on the surface of the transparent structure opposite to the surface close to the object, part of the illuminating light scatters or diffracts due to such dirt, stain, scar, or the like. Herein, dirt, stain, scar, or the like is sometimes collectively referred to as a "foreign object".

For example, if dirt is on the surface of a transparent structure, an amount of light incident on photoelectric converters of an image sensor that obtains an image of an object may decrease. As a result, noise resulting from the presence of the dirt is caused in a generated high-resolution image. In other words, if dirt is on the surface of a transparent structure, it is difficult to reproduce an accurate image of the object in a high-resolution image.

In such a case, a high-resolution image in which an accurate image of the object is reproduced can be obtained if re-imaging is performed to obtain sub-images after removing the dirt. However, since re-imaging needs to be performed a plurality of times corresponding to a plurality of radiation directions to employ the principle described with reference to FIG. 1A to FIG. 6, re-imaging is impractical.

Japanese Unexamined Patent Application Publication No. 2003-304395 discloses a film scanner that obtains an image using infrared and detects dirt on a film by using the obtained image. However, since the technique disclosed in Japanese Unexamined Patent Application Publication No. 2003-304395 requires an infrared light source in addition to a light source for obtaining an image using visible light, the device becomes complicated.

As a result of careful considerations in view of the above, the inventor has conceived an image generating system capable of improving the practical usability of a resolution-increasing technique that realizes a resolution exceeding the intrinsic resolution of an image sensor.

Prior to detailed description of an embodiment of the present disclosure, the overview of the embodiment of the present disclosure will be described first.

An image generating system according to an aspect of the present disclosure includes an image obtaining device, an image generating device, and an image processing device. The image obtaining device includes an illuminating system configured to irradiate an object in a module in which the object and an imaging element are integrated together, with light sequentially from a plurality of different radiation directions with respect to the object. The image obtaining device obtains a plurality of images corresponding to the plurality of different radiation directions. The image generating device generates a high-resolution image having a resolution higher than each of the plurality of images by combining the plurality of images together. The image processing device is configured to detect noise resulting from a foreign object located farther from an imaging surface of the imaging element than the object and remove the noise. The noise can be detected based on a difference between a pixel value of a certain pixel among pixels constituting one of the plurality of images and a pixel value of a pixel corresponding to the certain pixel among pixels constituting another one of the plurality of images.

In a certain aspect, the image processing device detects noise by comparing one of the plurality of images with another one of the plurality of images. For example, noise detection may be performed by comparing a pixel value of each of pixels constituting one of the plurality of images with a pixel value of a corresponding one of pixels constituting another one of the plurality of images.

In a certain aspect, the image processing device detects noise based on a magnitude of a change in pixel value between pixels in a pixel block constituted by a plurality of pixels in proximity to one another in the high-resolution image.

In a certain aspect, the image processing device removes the noise by replacing a pixel value of a pixel containing noise with a pixel value calculated from pixel values of pixels other than the pixel containing the noise.

In a certain aspect, the pixel value calculated from the pixel values of the pixels other than the pixel containing the noise is a pixel value calculated using pixel values of neighboring pixels of the pixel containing the noise.

In a certain aspect, the image processing device removes the noise by replacing the pixel containing the noise with a pixel of an image obtained when light is radiated from a radiation direction different from the plurality of different radiation directions each corresponding to a corresponding one of the plurality of images that constitute the high-resolution image.

In a certain aspect, the image processing device removes the noise by adding, to the pixel value of the pixel containing the noise, a difference between a pixel value of a pixel containing neither an image of the foreign object nor an image of the object and a pixel value of a pixel containing the image of the foreign object but not containing the image of the object.

In a certain aspect, the illuminating system includes one or more light sources, a stage on which the module is removably mounted, and a stage driving mechanism configured to be able to change orientation of the stage.

In a certain aspect, the illuminating system includes a plurality of light sources that emit light of a plurality of wavelength ranges different from one another.

In a certain aspect, the illuminating system includes a plurality of light sources disposed at different positions corresponding to the plurality of different radiation directions, the plurality of light sources sequentially emitting illuminating light.

In a certain aspect, the illuminating system includes a gonio-mechanism that changes at least one of orientation of the stage and directions of the one or more light sources.

An image generation method according to another aspect of the present disclosure includes a step of obtaining a plurality of images, a step of generating a high-resolution image of an object, a step of detecting noise, and a step of removing noise. In the step of obtaining a plurality of images, a module in which an object and an imaging element are integrated together is irradiated with illuminating light sequentially from a plurality of different radiation directions so that the illuminating light that has passed through the object is incident on the imaging element, and a plurality of images corresponding to the plurality of different radiation directions are obtained. The imaging element in the module can be disposed at a position at which the illuminating light that has passed through the object is incident. In the step of generating a high-resolution image of the object, a high-resolution image of the object having a resolution higher than each of the plurality of images is generated by combining the plurality of images together. In the step of detecting noise, noise resulting from a foreign object located farther from an imaging surface of the imaging element than the object is detected. The noise can be detected based on a difference between a pixel value of a certain pixel among pixels constituting one of the plurality of images and a pixel value of a pixel corresponding to the certain pixel among pixels constituting another one of the plurality of images. Noise detection may be performed before the high-resolution image is generated or may be performed after the high-resolution image is generated. In the step of removing noise, the noise is removed by replacing a pixel value of the pixel containing the noise with another pixel value.

In a certain aspect, in the step of detecting noise, noise is detected by comparing one of the plurality of images with another one of the plurality of images. For example, noise detection may be performed by comparing a pixel value of each of pixels constituting one of the plurality of images with a pixel value of a corresponding one of pixels constituting another one of the plurality of images.

In a certain aspect, in the step of detecting noise, noise is detected based on a magnitude of a change in pixel value between pixels in a pixel block constituted by a plurality of pixels in proximity to one another in the high-resolution image.

In a certain aspect, the other pixel value is a pixel value calculated from pixel values of pixels other than the pixel containing the noise.

In a certain aspect, the pixel value calculated from the pixel values of the pixels other than the pixel containing the noise is a pixel value calculated using pixel values of neighboring pixels of the pixel containing the noise.

In a certain aspect, the other pixel value is a pixel value of a pixel included in an image obtained when light is radiated from a radiation direction different from the plurality of different radiation directions each corresponding to one of the plurality of images that constitute the high-resolution image.

In a certain aspect, the other pixel value is a pixel value obtained by adding, to the pixel value of the pixel containing the noise, a difference between a pixel value of a pixel containing neither an image of the foreign object nor an image of the object and a pixel value of a pixel containing the image of the foreign object but not containing the image of the object.

A program according to still another aspect of the present disclosure includes instructions causing one or more processors to execute a process including a step of generating a high-resolution image of an object and a step of removing noise. In the step of generating a high-resolution image of an object, a high-resolution image of an object is generated by combining a plurality of images obtained by irradiating the object with light sequentially from a plurality of different radiation direction, the plurality of images containing images of different portions of the object, the high-resolution image having a resolution higher than each of the plurality of images. In the step of removing noise, noise resulting from a foreign object located farther from an imaging surface of an imaging element than the object is removed from the high-resolution image.

An imaging element according to yet another aspect of the present disclosure is an imaging element used in an image generating system including an image obtaining device, an image generating device, and an image processing device. The image obtaining device includes an illuminating system that irradiates an object with light sequentially from a plurality of different radiation directions with respect to the object, and obtains a plurality of images corresponding to the plurality of different radiation directions using the imaging element disposed at a position at which illuminating light that has passed through the object is incident. The image generating device generates a high-resolution image of the object having a resolution higher than each of the plurality of images by combining the plurality of images together. The image processing device detects noise resulting from a foreign object located farther from the imaging surface of the imaging element than the object and removes the noise. The noise can be detected based on a difference between a pixel value of a certain pixel among pixels constituting one of the plurality of images and a pixel value of a pixel corresponding to the certain pixel among pixels constituting another one of the plurality of images. The imaging element is removably mounted on the image obtaining device and includes an object support on a surface on which the illuminating light is incident when the imaging element is mounted on the image obtaining device, the object can be positioned on the object support.

An embodiment of the present disclosure will be described in detail below with reference to the drawings. Note that the embodiment described hereinafter provides a general or specific example of the present disclosure. The values, shapes, materials, components, arrangements and connections of the components, steps, orders of the steps, etc., given in the following embodiment are illustrative, and are not intended to limit the present disclosure. In addition, among the components in the following embodiment, a component not recited in any of the independent claims indicating the most generic concept is described as an optional component.

<Image Generating System>

FIG. 11 illustrates an overview of an example of a configuration of an image generating system according to an embodiment of the present disclosure. An image generating system 1000 illustrated in FIG. 11 includes an image obtaining device (digitizer) 100, an image generating device 140, and an image processing device 150. As described later in detail, the image generating device 140 generates a high-resolution image of the object 2 by combining together a plurality of images (sub-images) obtained by the image obtaining device 100. The image processing device 150 detects noise resulting from a foreign object located farther from the imaging surface of the image sensor 4 than the object 2 and removes the noise. The image processing device 150, for example, detects noise in the high-resolution image and removes the detected noise from the high-resolution image.

In an example illustrated in FIG. 11, the image generating device 140 and the image processing device 150 constitute part of an information processing device 200. In addition, in the illustrated example, the information processing device 200 includes a control device 170 that controls operations of the image obtaining device 100 and a memory 160. Examples of operations of the image generating device 140 and the image processing device 150 will be described later.

The information processing device 200 can be implemented by a general-purpose or special-purpose computer. The information processing device 200 may be integrated with the image obtaining device 100 or may be an independent device different from the image obtaining device 100. The information processing device 200 need not be disposed at the same place as the image obtaining device 100. For example, the information processing device 200 may be disposed at a place different from a place where the image obtaining device 100 is disposed, and the information processing device 200 and the image obtaining device 100 may be connected to each other via a network such as the Internet.

The image generating device 140, the image processing device 150, and the control device 170 may be independent devices. A configuration in which at least one of the image generating device 140, the image processing device 150, and the control device 170 is connected to the information processing device 200 and/or the image obtaining device 100 via a network such as the Internet is also possible.

Alternatively, each of the image generating device 140, the image processing device 150, and the control device 170 may be partially or entirely implemented by one or more processors (computers). For example, at least one of the image generating device 140 and the image processing device 150 can be implemented by a processing circuit, such as a DSP (digital signal processor) or an FPGA (Field Programmable Gate Array). Two or more of the image generating device 140, the image processing device 150, and the control device 170 may be implemented by a single processor (computer).

In the configuration illustrated in FIG. 11, a computer program for controlling at least one of the image obtaining device 100, the image generating device 140, and the image processing device 150 or the like can be stored in the memory 160. For example, in the case where the image generating device 140 is a general-purpose processor (computer), the image generating device 140 reads the computer program from the memory 160. The image generating device 140 performs a process described by the program, whereby a high-resolution image is generated. Likewise, in the case where the image processing device 150 is a general-purpose processor (computer), the image processing device 150 can detect and remove noise by reading the computer program stored in the memory 160 and executing the program. The computer program may be stored in any known external storage device or known storage medium connectable to the information processing device 200. A list of information regarding the plurality of radiation directions may be stored in the memory 160.

An example of the memory 160 is a RAM. The memory 160 is not limited to the RAM, and any known storage device can be used. At least any of the image generating device 140, the image processing device 150, and the control device 170 includes a memory, and the function of the memory 160 may be implemented by the memory.

The image obtaining device 100 illustrated in FIG. 11 includes an illuminating system 30a, which includes a light source 31 that generates illuminating light, a stage 32 configured such that the module 10 is removably mounted thereon, and a stage driving mechanism 33 configured to be able to change the orientation of the stage 32. FIG. 11 schematically illustrates a state where the module 10 is mounted on the stage 32. The module 10 is not a mandatory element of the image obtaining device 100.

As illustrated, the module 10 is mounted on the stage 32 such that the imaging surface 4A (see, for example, FIG. 10A) of the image sensor 4 included in the sensor unit 7 faces the light source 31. At that time, the object 2 is located between the light source 31 and the image sensor 4. In other words, the sensor unit 7 (or the image sensor 4) is disposed at a position at which light that has passed through the object 2 is incident in a state where the module 10 is connected to the stage 32. In this example, the object 2 is mounted on the imaging surface 4A that receives light that has been emitted from the light source 31 and has passed through the object 2, and the imaging surface 4A of the image sensor 4 functions as an object support 7S. Obviously, the arrangement of the sensor unit 7 and the object 2 in a state where the module 10 is connected to the stage 32 is not limited to the example illustrated in FIG. 11. For example, the arrangement of the sensor unit 7 and the object 2 may be made opposite to the arrangement illustrated in FIG. 11. Specifically, the module 10 may be arranged above the light source 31 such that the light source 31 faces the imaging surface 4A of the image sensor 4. A plurality of images used to generate a high-resolution image can be obtained as long as the image sensor 4 of the sensor unit 7 is disposed at a position at which light that has passed through the object 2 is incident. The term "supporting" used herein is not limited to supporting something from below.

The illuminating system 30a changes the radiation direction with respect to the object 2, for example, by changing the orientation of the stage 32. Details about the configuration and an example of an operation of the illuminating system 30a will be described later. The expression changing the "orientation" broadly includes changes such as changing the tilt with respect to a reference surface, changing a rotation angle with respect to a reference direction, and changing the position with respect to a reference point.

The object 2 is irradiated with illuminating light, generated by the light source 31, sequentially from a plurality of different radiation directions with respect to the object 2. A plurality of different images corresponding to the plurality of different radiation directions are obtained by the image sensor 4 of the sensor unit 7 as a result of irradiating the object 2 with the light while changing the radiation direction. Note that information obtained from the sensor unit 7 for each radiation direction need not necessarily be an image (sub-image) itself. That is, it is sufficient that pixel values corresponding to respective photodiodes included in the image sensor 4 are obtained for each radiation direction, and a sub-image need not be generated for each radiation direction. A high-resolution image can be generated using pixel values included in the plurality of obtained images.

Referring next to FIG. 12A to FIG. 13B, an example of a method for changing the radiation direction of illuminating light with respect to the object will be described.

Figure 12A:
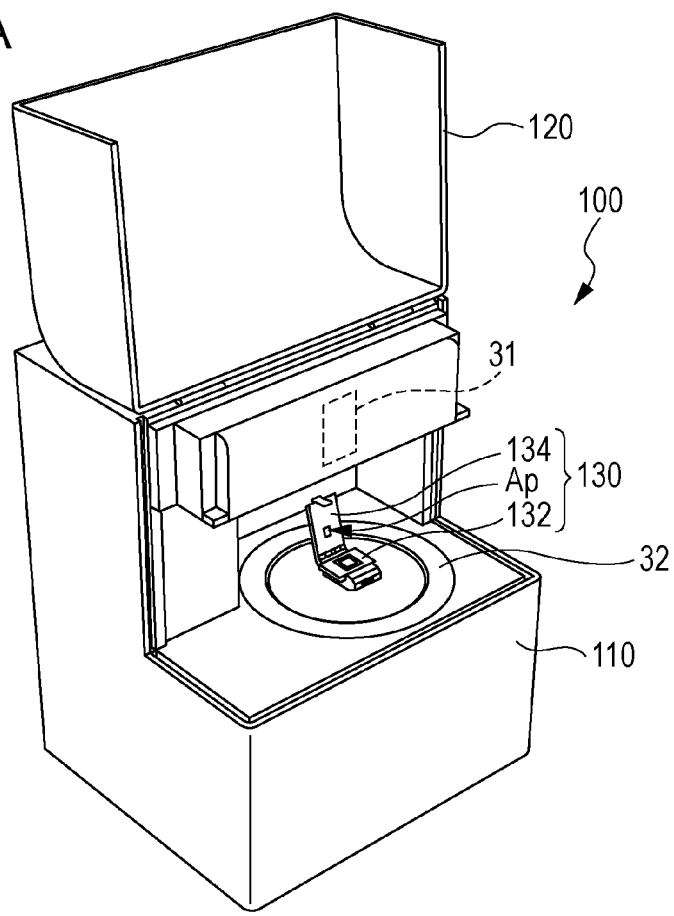
FIG. 12A is a perspective view illustrating an exemplary external appearance of an image obtaining device.
Figure 12B:
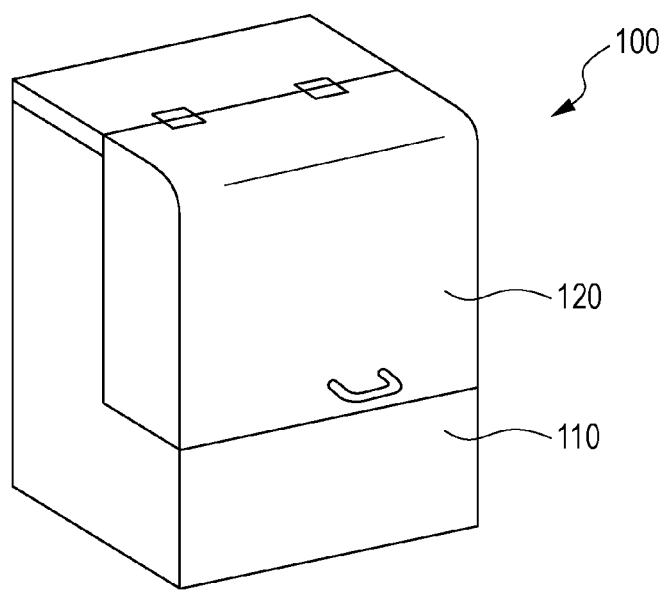
FIG. 12B is a perspective view illustrating the image obtaining device illustrated in FIG. 12A, with its lid portion closed.

FIG. 12A and FIG. 12B each illustrate an exemplary external appearance of the image obtaining device 100. In the configuration illustrated in FIG. 12A, the image obtaining device 100 includes a body 110, which includes the light source 31 and the stage 32, and a lid portion 120 coupled to the body 110 in an openable/closeable manner. By closing the lid portion 120, a dark room can be created inside the image obtaining device 100 (see FIG. 12B).

In the illustrated example, a socket 130 for holding the module 10 is connected onto the stage 32. The socket 130 may be fixed to the stage 32 or may be configured to be removable from the stage 32. Here, the configuration in which the socket 130 is removable from the stage 32 is used as an example. The socket 130 includes, for example, a lower base 132 configured such that the module 10 is removably mounted thereon and an upper base 134 having an aperture Ap. In the example illustrated in FIG. 12A, the socket 130 holds the module 10 by sandwiching the module 10 by the lower base 132 and the upper base 134.

The lower base 132 can include an electrical connector having an electric contact for implementing electrical connection to the sensor unit 7 of the module 10. When an image of the object is obtained, the module 10 is mounted on the lower base 132 such that the imaging surface of the image sensor 4 of the sensor unit 7 faces the light source 31. At that time, as a result of the electric contact of the electrical connector being in contact with the back-side electrodes 5B of the sensor unit 7 (see FIG. 8A and FIG. 8B), the sensor unit 7 of the module 10 is electrically connected to the electrical connector of the lower base 132.

Figure 12C:
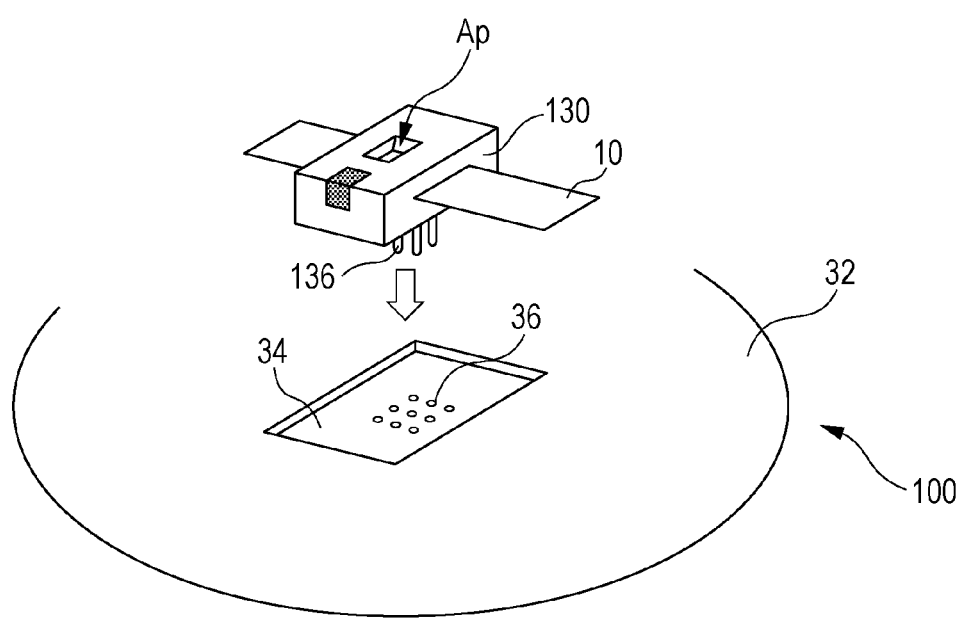
FIG. 12C is a diagram schematically illustrating an example of how a socket is mounted onto a stage of the image obtaining device.

FIG. 12C illustrates an example of a method for mounting the socket 130 onto the stage 32 of the image obtaining device 100. In the configuration illustrated in FIG. 12C, the socket 130 includes an electrode 136 that protrudes from the bottom surface. This electrode 136 can be part of the electrical connector of the lower base 132. In addition, in the example illustrated in FIG. 12C, the stage 32 of the image obtaining device 100 includes an attachment portion 34 at which a jack 36 is provided. For example, the electrode 136 of the socket 130 is fitted to the jack 36 as illustrated in FIG. 12C, whereby the socket 130 holding the module 10 is mounted on the stage 32. In this way, an electrical connection is established between the sensor unit 7 of the module 10 held by the socket 130 and the image obtaining device 100.

The stage 32 can include a circuit that receives an output of the sensor unit 7, that is, an output of the image sensor 4 in a state where the socket 130 holding the module 10 is mounted thereon. In the embodiment of the present disclosure, the image obtaining device 100 obtains, from the image sensor 4 of the module 10, information (image signal or image data (pixel values of respective pixels)) denoting an image of the object 2 via the electrical connector of the socket 130. That is, the image obtaining device 100 obtains a first plurality of pixel values output from the photodiodes of the image sensor 4 when light is radiated from a certain radiation direction and obtains a second plurality of pixel values output from the photodiodes of the image sensor 4 when light is radiated from another radiation direction.

Note that when imaging is performed on a plurality of objects using a plurality of modules 10, the same number of sockets 130 as the number of modules 10 may be prepared and the target of imaging may be changed by swapping the sockets 130 holding the respective modules 10. Alternatively, the target of imaging may be changed by swapping the modules 10, with one socket 130 kept fitted to the stage 32. As described above, in the embodiment of the present disclosure, the module 10 is not permanently fixed to the image obtaining device 100. In other words, in the embodiment of the present disclosure, the sensor unit 7 (or the image sensor 4) that performs imaging of the object is removable from the image obtaining device 100.

As illustrated in FIG. 12C, the bottom surface of the socket 130 can be closely in contact with the upper surface of the attachment portion 32 by mounting the socket 130 onto the stage 32. In this way, the arrangement of the socket 130 relative to the stage 32 is fixed. Accordingly, the arrangement of the stage 32 and the module 10 held by the socket 130 can be maintained constant before and after the orientation of the stage 32 is changed. Typically, the principal surface of the transparent plate 8 of the module 10 is substantially parallel to the stage 32 in a state where the socket 130 is mounted on the stage 32.

Figure 13A:
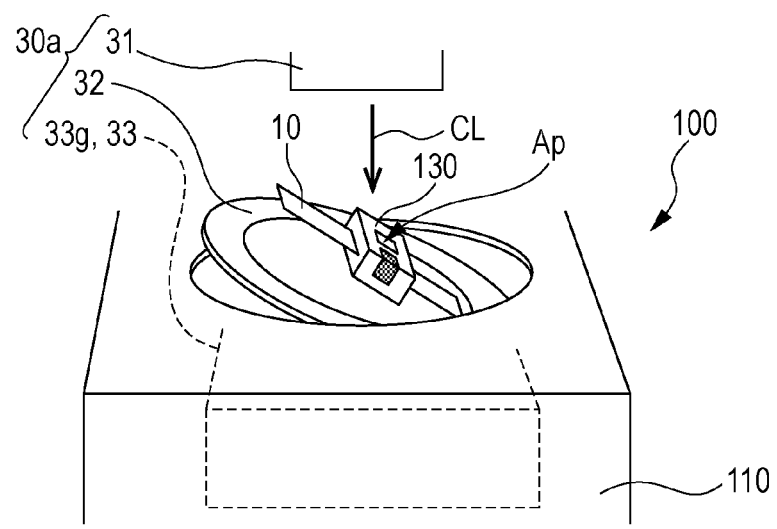
FIG. 13A is a diagram schematically illustrating an example of a method for changing the radiation direction.

FIG. 13A illustrates an example of a method for changing the radiation direction. As illustrated, the module 10 held by the socket 130 is irradiated with the illuminating light CL emitted from the light source 31. The illuminating light CL is incident on the object 2 of the module 10 through the aperture Ap of the socket 130. Light that has passed through the object 2 is then incident on the imaging surface of the sensor unit 7 of the module 10. Light emitted from the light source 31 is typically collimated light. However, light emitted from the light source 31 need not be collimated light if the light that is incident on the object is considered to be substantially parallel light.

As described with reference to FIG. 11, the image obtaining device 100 includes the stage driving mechanism 33.

The stage driving mechanism 33 includes mechanisms such as a gonio-mechanism and a rotation mechanism, and changes a tilt of the stage 32 with respect to the body 110 and/or the rotation angle with respect to an axis that passes the center of the stage 32. In the configuration illustrated in FIG. 13A, the stage driving mechanism 33 includes a gonio-mechanism 33g that changes the orientation of the stage 32. The stage driving mechanism 33 may include a slide mechanism capable of moving the stage 32 in parallel on a reference plane (horizontal plane, typically).

Figure 13B:
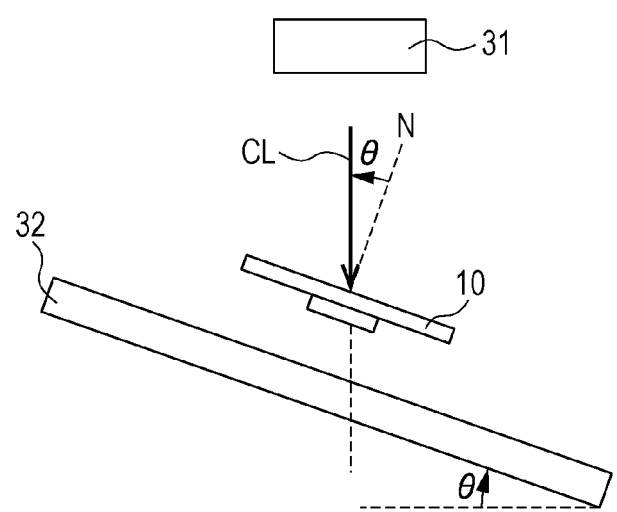
FIG. 13B is a diagram schematically illustrating a change in a direction of a light beam incident on an object when the stage is tilted with respect to a reference surface by an angle θ.

The orientation of the stage 32 can be changed by causing the stage driving mechanism 33 to operate. In this example, since the socket 130 holding the module 10 is attached to the stage 32, the orientation of the module 10 can be changed by changing the orientation of the stage 32. For example, suppose that a direction in which illuminating light is incident when the stage 32 is not tilted with respect to the reference surface is a direction of the normal of the imaging surface of the image sensor. In this example, a relationship (e.g., parallel) between a tilt of the stage 32 with respect to the reference surface and a tilt of the module 10 with respect to the reference surface (or a tilt of the transparent plate 8) is maintained constant before and after the orientation of the stage 32 is changed. Accordingly, when the stage 32 is tilted by the angle θ with respect to the reference surface as illustrated in FIG. 13B, a direction in which light beams are incident on the object is also tilted by the angle θ. Note that a dashed-line N in FIG. 13B denotes the normal of the imaging surface of the image sensor.

As described above, the object can be irradiated with illuminating light sequentially from a plurality of different radiation directions with respect to the object 2, by changing the orientation of the module 10 together with the stage 32. Accordingly, a plurality of images corresponding to the plurality of different radiation directions with respect to the object 2 can be obtained by the sensor unit 7 of the module 10. The radiation direction with respect to the object 2 can be expressed by, for example, a set of an angle between the normal N of the imaging surface of the image sensor and a light beam that is incident on the object 2 (zenith angle θ illustrated in FIG. 13B) and an angle (azimuth angle) between a reference direction set on the imaging surface and a projection of the incident light beam onto the imaging surface.

Figure 14A:
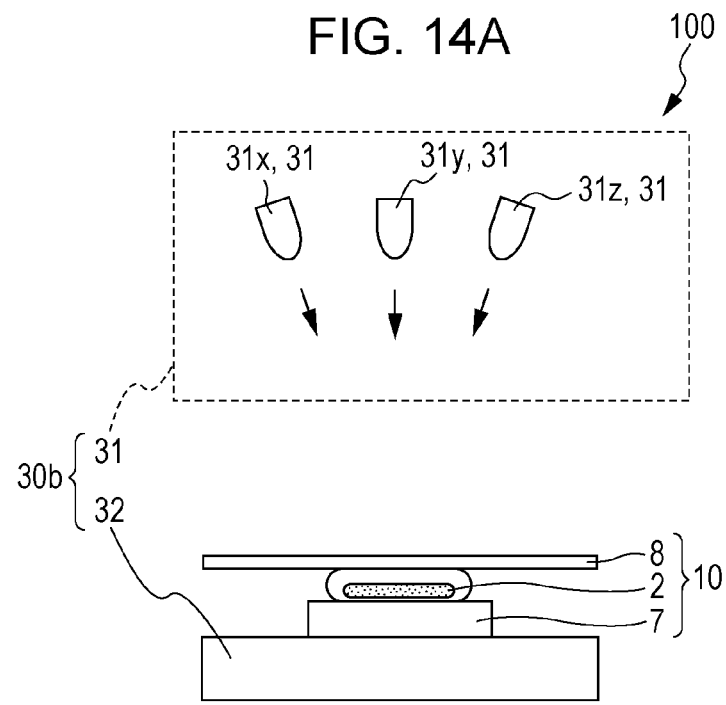
FIG. 14A is a diagram schematically illustrating another example of a configuration of an illuminating system.

FIG. 14A illustrates another example of the configuration of the illuminating system. In the configuration illustrated in FIG. 14A, the light source 31 of an illuminating system 30b includes a plurality of light sources 31x, 31y, and 31z. The light sources 31x, 31y, and 31z are disposed at positions corresponding to respective radiation directions different from each other. Illuminating light is emitted sequentially from the light sources 31x, 31y, and 31z. In this way, the object 2 can be irradiated with light sequentially from the plurality of different radiation directions with respect to the object 2. Note that the configuration illustrated in FIG. 14A is merely an example, and the number of light sources included in the illuminating system is not limited to three.

Figure 14B:
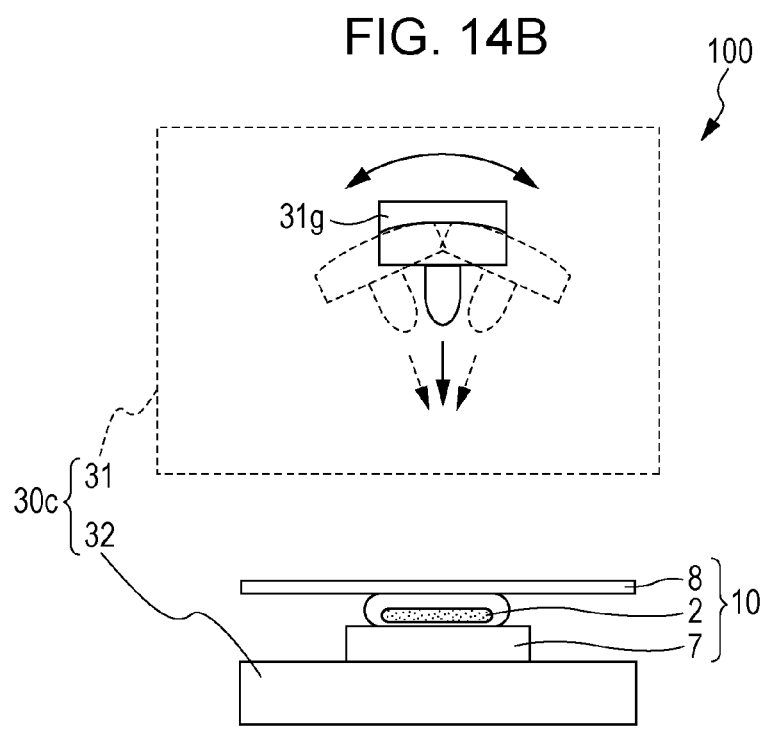
FIG. 14B is a diagram schematically illustrating still another example of the configuration of the illuminating system.

FIG. 14B illustrates still another example of the configuration of the illuminating system. In the configuration illustrated in FIG. 14B, an illuminating system 30c includes a gonio-mechanism 31g that changes the direction of the light-emitting portion of the light source 31. As illustrated, the object 2 can be irradiated with light sequentially from a plurality of different radiation directions with respect to the object 2 also by changing the direction of the light source 31. The illuminating system 30c may include a rotation mechanism that changes the rotation angle of the light source 31 with respect to the axis that passes the center of the stage 32 or a slide mechanism capable of moving the light source 31 in parallel, together with the gonio-mechanism 31g or instead of the gonio-mechanism 31g. The radiation direction may be changed by changing the orientation of the stage 32 and moving the light source 31 together.

Figure 14C:
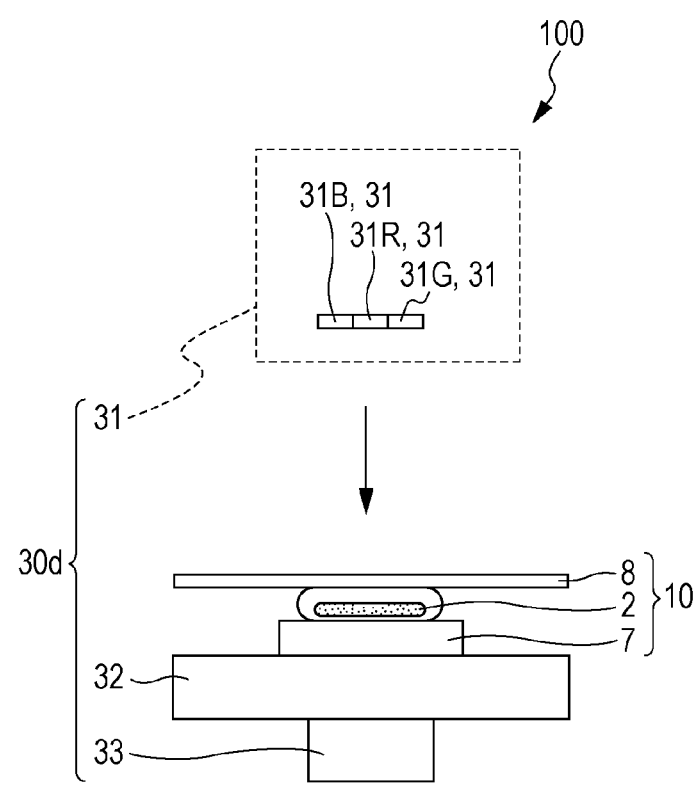
FIG. 14C is a diagram schematically illustrating yet another example of the configuration of the illuminating system.

The light source 31 includes, for example, an LED chip. The light source 31 may include a plurality of LED chips each having a peak in a different wavelength range. For example, in an illuminating system 30d illustrated in FIG. 14C, the light source 31 includes an LED chip 31B that emits blue light, an LED chip 31R that emits red light, and an LED chip 31G that emits green light. In the case where a plurality of light-emitting elements are disposed in proximity to one another (approximately 100 µm apart, for example), a set of these light-emitting elements can be assumed as a point light source.

A plurality of sub-images can be obtained for each of different colors, for example, by time-sequentially radiating light of different colors for each radiation direction using the plurality of light-emitting elements that emit the light of different colors. For example, a set of blue sub-images, a set of red sub-images, and a set of green sub-images may be obtained. A color high-resolution image can be generated by using the obtained sets of sub-images. For example, in the case of pathological diagnosis, a larger amount of beneficial information regarding the presence/absence of a lesion can be obtained by using a color high-resolution image. Illuminating light of different colors may be time-sequentially obtained by using a white LED chip as the light source 31 and disposing a color filter at the light path. In addition, an image sensor for color imaging may be used as the image sensor 4. However, from the viewpoint of suppressing a decrease in an amount of light incident on the photoelectric converters of the image sensor 4, a configuration not including the color filter is more advantageous.

The light source 31 is not limited to the LED and may be an incandescent lamp, a laser element, a fiber laser, a discharge tube, or the like. Light emitted from the light source 31 is not limited to visible light and may be ultraviolet radiation or infrared radiation. The number and arrangement of the light-emitting elements included in the light source 31 may be set in a given manner.

<Image Generation Method>

Figure 15A:
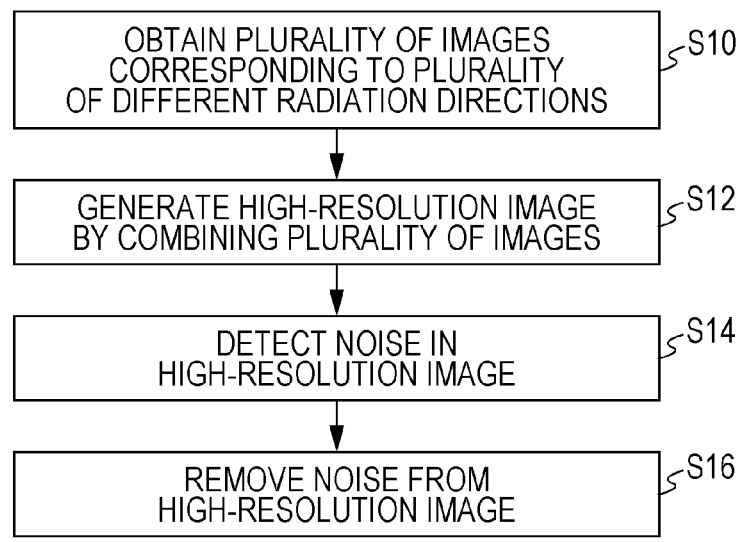
FIG. 15A is a diagram illustrating an overview of an exemplary image generation method according to the embodiment of the present disclosure.

FIG. 15A illustrates an overview of an exemplary image generation method according to the embodiment of the present disclosure. The image generation method according to the embodiment of the present disclosure roughly includes a step of obtaining a plurality of images (sub-images), a step of generating a high-resolution image of an object, and a step of detecting noise. The image generation method according to the embodiment of the present disclosure may further include a step of removing noise. In the example illustrated in FIG. 15A, a plurality of images corresponding to a plurality of different radiation directions are obtained by irradiating the module with illuminating light sequentially from the plurality of different radiation directions in step S10. Obtaining a plurality of images in step S10 equates to obtaining a plurality of pixel values denoting sub-images and need not necessarily include a step of generating the sub-images.

In the embodiment of the present disclosure, a module including an object and a sensor unit together such that light that has passed through the object is incident on the image sensor is used. In step S12, a high-resolution image of the object is generated by combining the plurality of images together. In step S14, noise in the high-resolution image thus obtained is detected. In the embodiment of the present disclosure, detection of noise resulting from a foreign object located farther from the image surface of the sensor unit than the object is performed. In step S16, the detected noise is removed. Specifically, noise in the high-resolution image is removed by replacing a pixel value of a pixel containing noise with another pixel value. A program for performing these steps is stored, for example, in the memory 160.

Figure 15B:
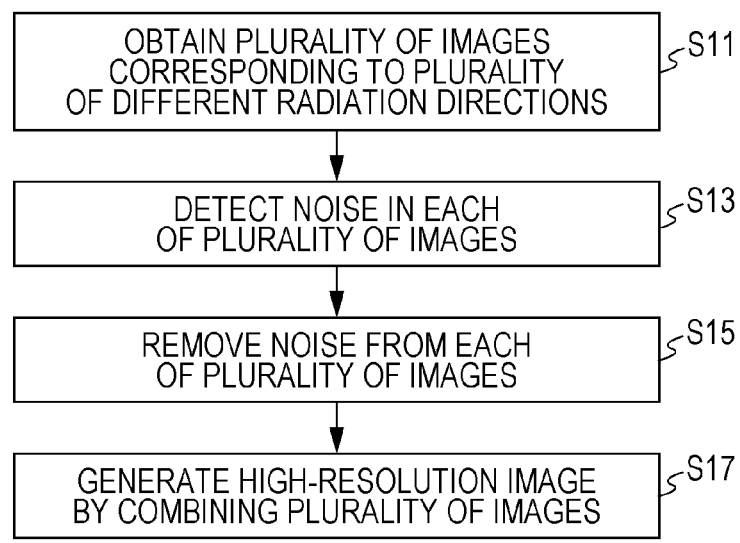
FIG. 15B is a diagram illustrating an overview of another exemplary image generation method according to the embodiment of the present disclosure.

The steps illustrated in FIG. 15A and the order of the steps are merely examples. As illustrated in FIG. 15B, noise detection and noise removal may be performed before the high-resolution image is generated. That is, noise detection and removal may be performed on each of a plurality of images each obtained for a corresponding one of a plurality of different radiation directions, and a high-resolution image may be obtained by combining together the plurality of images resulting from noise removal. In the example illustrated in FIG. 15B, a plurality of images (sub-images) corresponding to a plurality of different radiation directions are obtained in step S11. Detection of noise in each of the sub-images and removal of the detected noise are respectively performed in step S13 and step S15. As in step S10, obtaining the plurality of images in step S11 equates to obtaining a plurality of pixel values denoting sub-images and need not necessarily include a step of generating the sub-images. Then in step S17, a high-resolution image of the object is generated by combining the plurality of images together.

Note that the above-described steps need not be performed consecutively, and, for example, another step may be performed between two of the steps. Two or more steps among the above-described steps may be performed in parallel.

Figure 16:
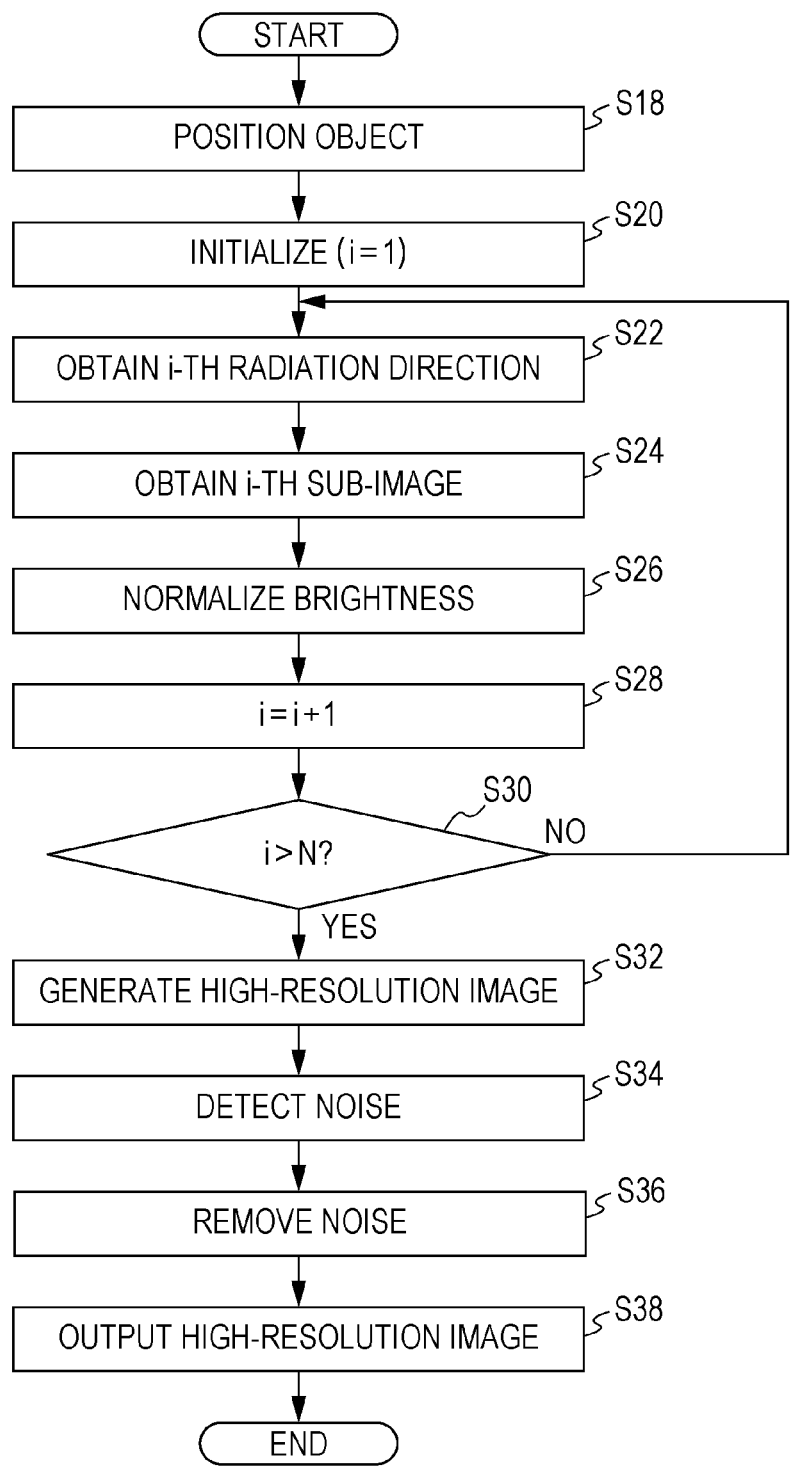
FIG. 16 is a flowchart illustrating details of the exemplary image generation method according to the embodiment of the present disclosure.

FIG. 16 illustrates details of the example of the image generation method according to the embodiment of the present disclosure. First in step S18, the object 2 is positioned at the image obtaining device 100 (see, for example, FIG. 11). Here, the module 10 is fixed to the socket 130 mounted on the stage 32 of the image obtaining device 100.

Then in step S20, initialization is performed. For example, 1 is assigned to an index i (where i is an integer) for identifying the radiation direction and the sub-image.

Then in step S22, information regarding the 1st (i=1) radiation direction with respect to the object 2 is obtained. Information indicating the radiation direction may be described in a program for controlling an operation of the image generating system 1000 (see FIG. 11) or may be stored in, for example, a list (or table) format in the memory 160. As described later in detail, if the radiation direction is known, a set of pixel values to be used in noise detection can be appropriately determined. Accordingly, in a certain aspect, the memory 160 (see FIG. 11) stores a table in which information regarding the radiation direction and a set of pixels for which a difference between pixel values is to be determined are associated with each other.

The information indicating the radiation direction can be a value of a radiation angle (e.g., the angle θ illustrated in FIG. 7A or the angle θ' illustrated in FIG. 7B) with respect to the direction of the normal of the imaging surface of the sensor unit 7. An example will be described below in which the resolution is increased by four times through radiation of light from four directions on the basis of the principle described with reference to FIG. 1A to FIG. 6. In the example described here, the 1st radiation direction is set to the first radiation direction described with reference to FIG. 2A and FIG. 2B. That is, information indicating that the radiation angle with respect to the imaging surface of the sensor unit 7 is 0° is obtained in step S22 in this example.

Obviously, the 1st radiation direction is not limited to the first radiation direction described with reference to FIG. 2A and FIG. 2B. The 1st radiation direction can be a direction different from the direction perpendicular to the imaging surface of the sensor unit 7. The information regarding the radiation direction obtained at that time is temporarily stored, for example, in a workspace of the memory 160 in a table format together with the value of the above-described index i.

Then in step S24, the 1st sub-image is obtained. Prior to radiation, the radiation direction with respect to the object 2 is changed by the control device 170 causing the stage driving mechanism 33 to operate. Thereafter, the object 2 is irradiated with illuminating light from a predetermined radiation direction, and consequently a plurality of pixel values denoting the 1st sub-image are obtained. Data of the obtained sub-image (typically, pixel values) is temporarily stored in the memory 160 in association with the value of the index i, for example.

Then in step S26, brightness of each pixel of the obtained sub-image is normalized if necessary. A distance over which light that has passed through the object 2 travels to reach the imaging surface is larger when the object 2 is irradiated with the light from a direction tilted with respect to the imaging surface of the sensor unit 7 than when the object 2 is irradiated with the light from the direction of the normal of the imaging surface. Accordingly, a sub-image obtained when the object 2 is irradiated with a direction tilted with respect to the imaging surface is sometimes darker as a whole than a sub-image obtained when the object 2 is radiated with light from the direction of the normal of the imaging surface, because of the influence of absorption and scattering that occur in the module 10. A variation in brightness between sub-images as a whole can be reduced by performing normalization of brightness on the obtained sub-images. Herein, the term "normalization" indicates a process of multiplying a pixel value of each pixel by a constant so that the sum of pixel values of a plurality of pixels included in an image to be normalized becomes equal to the sum of pixel values of a plurality of pixels included in a reference image.

Then in step S28, the value of the index i is updated. Typically, i is incremented.

Then in step S30, it is determined whether a predetermined number of sub-images have been obtained. For example, determination as to whether i>N (N is an integer of 2 or greater) is performed. Since the resolution is increased by four times through radiation of light from four directions in the example described here, it is determined whether i>4 (N=4) is satisfied. If i is smaller than or equal to N, the process returns to step S22, in which a sub-image is obtained again after the radiation direction is changed.

If the process returns to step S22, information regarding the 2nd (i=2) radiation direction is obtained. The 2nd radiation direction is, for example, the second radiation direction described with reference to FIG. 3A and FIG. 3B. That is, the radiation direction is changed to a direction tilted toward the x-direction with respect to the normal N of the imaging surface 4A in step S24 that follows step S22 in this example. Specifically, when the 2nd sub-image is obtained, light is radiated from the direction indicated by the angle θ illustrated in FIG. 7A.

The information regarding the radiation direction (e.g., the value of the angle θ and the tilted direction) obtained in step S22 is temporarily stored, for example, in the workspace of the memory 160 in a table format together with the value of the index i (i.e., i=2). In addition, data of the sub-image (typically, pixel values) obtained in step S24 is temporarily stored in the memory 160 in association with the value of the index i. The information regarding the radiation direction may be the magnitude of the angle with respect to the direction of the normal of the imaging surface of the sensor unit 7 or may be a difference from the radiation angle corresponding to information regarding the radiation direction for which the value of i is smaller by 1.

Note that if a relationship between two different radiation directions (e.g., which direction how much one of the radiation directions is tilted toward with respect to the other radiation direction) is known, which pixel value in one of the sub-images is to be used in noise detection in association with which pixel value in the other sub-image is determined. Accordingly, a correspondence between pixel values to be used in noise detection may be further added to the table in addition to the information regarding the radiation direction.

After step S24 is performed, steps S26 to S30 described above are performed. When the process returns to step S22 again, information regarding the 3rd (i=3) radiation direction is obtained. The 3rd radiation direction is, for example, the third radiation direction described with reference to FIG. 4A and FIG. 4B. In this case, the 3rd sub-image is obtained with the radiation direction changed to a direction tilted toward the y-direction with respect to the normal N of the imaging surface 4A. Here, the information regarding the 3rd radiation direction, data of the 3rd sub-image, and a correspondence between pixel values to be used in noise detection are temporarily stored in the workspace of the memory 160 in a table format. The correspondence between pixel values to be used in noise detection may be a correspondence between the 1st sub-image and the 3rd sub-image or a correspondence between the 2nd sub-image and the 3rd sub-image.

Thereafter, steps S26 to S30 described above are performed again. At this point, since i>N is not satisfied yet, the process returns to step S22. In step S22, information regarding the 4th (i=4) radiation direction is obtained. The 4th radiation direction is, for example, the fourth radiation direction described with reference to FIG. 5A. In this case, the 4th sub-image is obtained with the radiation direction changed to a direction tilted toward the u-direction with respect to the normal N of the imaging surface 4A. The information regarding the 4th radiation direction, data of the 4th sub-image, and a correspondence between pixel values to be used in noise detection are temporarily stored in the workspace of the memory 160 in a table format.

Thereafter, steps S26 to S30 described above are performed again. If it is determined in step S30 that i is greater than N, the process proceeds to step S32. In step S32, a high-resolution image is generated by employing the principle described with reference to FIG. 1A to FIG. 6. Here, the image generating device 140 reads the data of the sub-images from the memory 160 and generates a high-resolution image using the plurality of obtained sub-images. The number of pixel values included in the high-resolution image is larger than the number of pixel values obtained in step S24.

Then in step S34, noise contained in the high-resolution image is detected. As described above, noise detected in this step is noise resulting from a foreign object located farther from the imaging surface of the sensor unit 7 than the object 2. Here, the image processing device 150 receives data of the high-resolution image generated by the image generating device 140 and detects noise based on a noise detection principle described later.

During noise detection, a set of pixels for which a difference between pixel values is to be determined is identified by referring to the table stored in the memory 160, for example. When light is radiated from four directions, i.e., the first radiation direction (i=1) to the fourth radiation direction (i=4) as in the example described above, at least one set of two pixel values obtained by the same photodiode can be used for two radiation directions. Thus, in the table, a pixel value obtained by a certain photodiode in response to radiation of light from a certain radiation direction among four radiation directions and a pixel value obtained by the certain photodiode in response to radiation of light from another radiation direction are associated to indicate a correspondence between pixel values to be used in noise detection.

Accordingly, in the embodiment, noise detection is performed using a difference between two pixel values obtained by the same photodiode for two radiation directions. For example, noise in the x-direction can be detected by using a difference between two pixel values obtained by the same photodiode for the first radiation direction and the second radiation direction. Similarly, noise in the y-direction can be detected by using a difference between two pixel values obtained by the same photodiode for the first radiation direction and the third radiation direction. Noise in the u-direction can be detected by using a difference between two pixel values obtained by the same photodiode for the first radiation direction and the fourth radiation direction. After noise is detected, for example, coordinate values of pixels containing noise are temporarily stored in the memory 160.

In the case where noise is detected every time a sub-image is obtained before a high-resolution image is generated, a set of pixels for which a difference between pixel values is to be determined can be appropriately determined by referring to the table. Note that a correspondence between pixels to be used in noise detection need not necessarily be described in a table format. For example, a relational expression associating pixel values to be used in noise detection may be stored in the memory 160. For example, let $V(i)_{j,k}$ denote a pixel value of a pixel located at a j-th row and a k-th column in an i-th sub-image. Then, an expression indicating a correspondence between $V(i)_{j,k}$ and $V(i+1)_{j,k}$ may be stored in the memory 160, where j=1, 2, . . . , J and k=1, 2, . . . , K (J and K are integers of 2 or greater). For example, noise detection in the x-direction can be performed by applying the expression indicating the correspondence between $V(i)_{j,k}$ and $V(i+1)_{j,k}$ in a range from j=1 to j=(J−1) for the first radiation direction and the second radiation direction.

Then in step S36, the detected noise is removed. In this embodiment, the image processing device 150 performs a process of removing noise. The position of the pixel containing noise can be identified based on the coordinate values stored in the memory 160 in step S34. A specific example of the noise removal method will be described later.

Then in step S38, the noise-removed high-resolution image is output to a display device, such as a display. Alternatively, data of the noise-removed high-resolution image is output to another device connected to the image generating system 1000. Step S38 may be performed as needed.

<Principle of Noise Detection>

A principle of noise detection used in the embodiment of the present disclosure will be described next. Understanding how noise appears in a high-resolution image makes it easier to understand the principle of noise detection used in the embodiment of the present disclosure. Accordingly, herein, an example of how noise appears in a high-resolution image is described first, and then a specific example of the noise detection method will be described. The case of implementing a four times higher resolution through radiation of light from four directions is described as an example below.

Figure 17A:
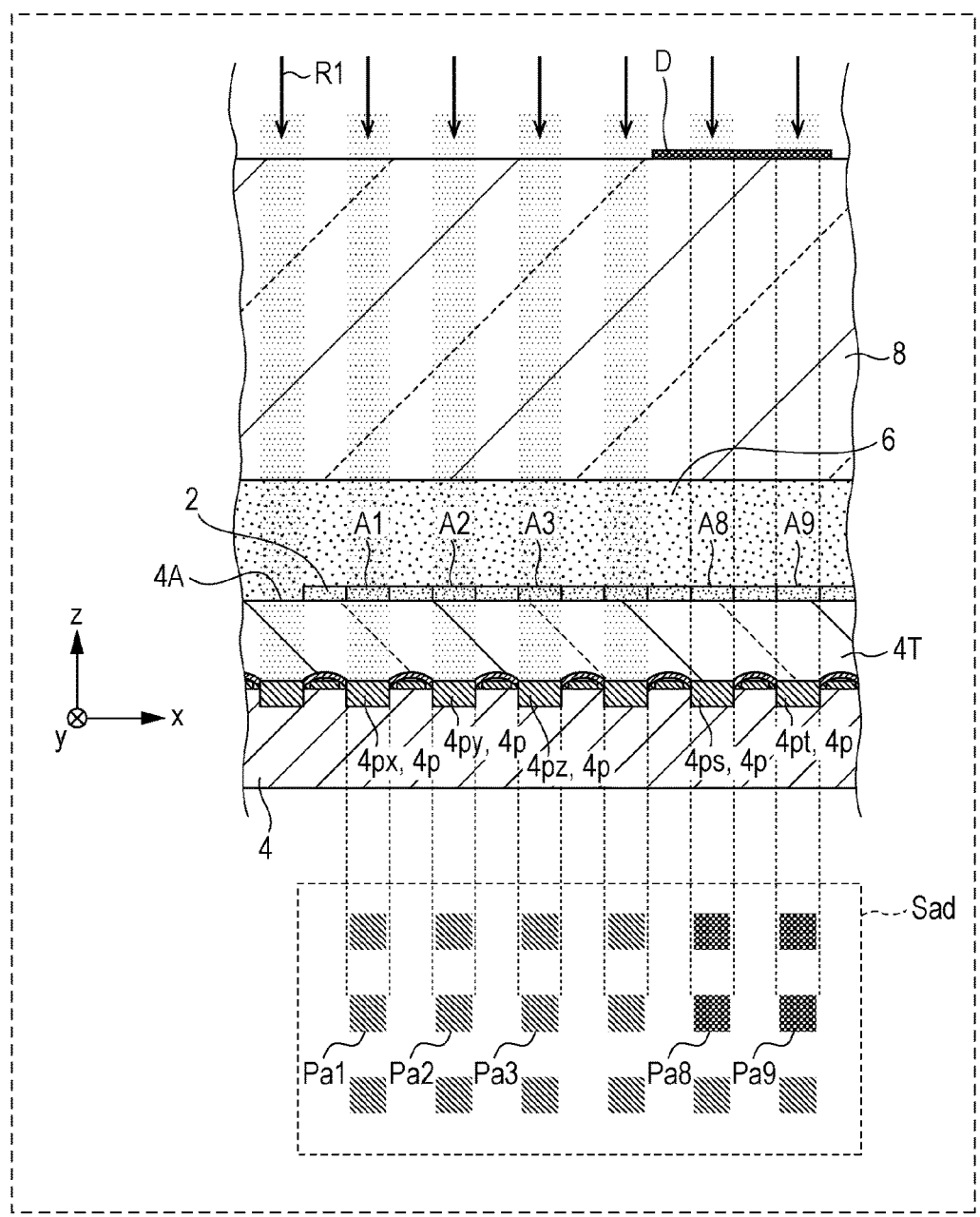
FIG. 17A is a diagram schematically illustrating a relationship between regions of the object which illuminating light passes through and an image obtained by the image sensor when the light is radiated from the first radiation direction.

FIG. 17A schematically illustrates a relationship between regions of the object 2 which illuminating light passes through and an image obtained by the image sensor 4 when the light is radiated from the above-described first radiation direction (see FIG. 2A and FIG. 2B). In the example illustrated in FIG. 17A, the image sensor 4 includes the transparent layer 4T that covers light-incident surfaces of the photodiodes 4p. The object 2 covered with the mounting medium 6 is located on this transparent layer 4T. That is, the upper surface of the transparent layer 4T serves as the imaging surface 4A, and the upper surface of the transparent layer 4T functions as the object support 7S (see FIG. 11) in this example. Note that, in the example illustrated in FIG. 17A, the dirt D is on the surface of the transparent plate 8 that is opposite to the side where the object 2 is located. The dirt D partially overlaps the object 2 when viewed from a direction perpendicular to the imaging surface 4A of the image sensor 4.

In FIG. 17A, an arrow R1 schematically denotes the first radiation direction. In this example, the first radiation direction R1 is parallel to the z-direction. A dotted portion in FIG. 17A schematically denotes part of illuminating light that is incident on regions of the object 2 located right above the photodiodes 4p and part of resulting light that is incident on the photodiodes 4p. In other words, the dotted portion denotes part of illuminating light that contributes to generation of a sub-image. For convenience of description, the transparent plate 8 is illustrated to be thinner than the real thickness in this figure, and a ratio in dimensions of individual portions in this figure is different from that in the real module. The same applies to FIG. 17B, FIG. 21, FIG. 23A to FIG. 23C described later.

As illustrated in FIG. 17A, when light is radiated from the first radiation direction R1, light that has passed through regions of the object 2 located right above the photodiodes 4p is incident on the photodiodes 4p. For example, light that has passed through a region A1 of the object 2 located right above a photodiode 4px (part of first resulting light corresponding to the first radiation direction R1) is incident on the photodiode 4px illustrated in FIG. 17A. A pixel Pa1 of a sub-image Sad obtained when illuminating light is radiated from the first radiation direction R1 has information regarding the region A1. Similarly, pixels Pa2 and Pa3 illustrated in FIG. 17A respectively have information regarding a region A2 of the object 2 located right above a photodiode 4py and information regarding a region A3 of the object 2 located right above a photodiode 4pz.

In the illustrated example, the dirt D overlaps regions A8 and A9 of the object 2 when viewed from a direction perpendicular to the imaging surface 4A of the image sensor 4. Accordingly, a photodiode 4ps located right below the region A8 receives light that has passed through both the dirt D and the region A8 of the object 2. In this case, an amount of light incident on the photodiode 4ps decreases compared with the case where the dirt D is not on the transparent plate 8. Consequently, a pixel value of a pixel Pa8 corresponding to the photodiode 4ps located right below the region A8 is smaller than a pixel value supposed to be obtained if the dirt D were not on the transparent plate 8, among pixels included in the sub-image Sad obtained when illuminating light is radiated from the first radiation direction R1. That is, the pixel value of the pixel Pa8 thus obtained is smaller than a pixel value denoting an image of the region A8. Similarly, a pixel value of a pixel Pa9 corresponding to a photodiode 4pt located right below the region A9 is smaller than a pixel value denoting an image of the region A9, among pixels included in the sub-image Sad.

In general, pixel values of the pixels Pa8 and Pa9 respectively corresponding to the photodiodes 4ps and 4pt located at positions that coincide with the position of the dirt D are relatively smaller than pixel values of other pixels Pa1, Pa2, and Pa3 denoting an image of the object. As a result, if imaging is performed in a state where the dirt D is on the transparent plate 8, a pixel (hereinafter, sometimes referred to as a "dark pixel") relatively darker than a pixel denoting an image of the object is caused in a sub-image.

Figure 17B:
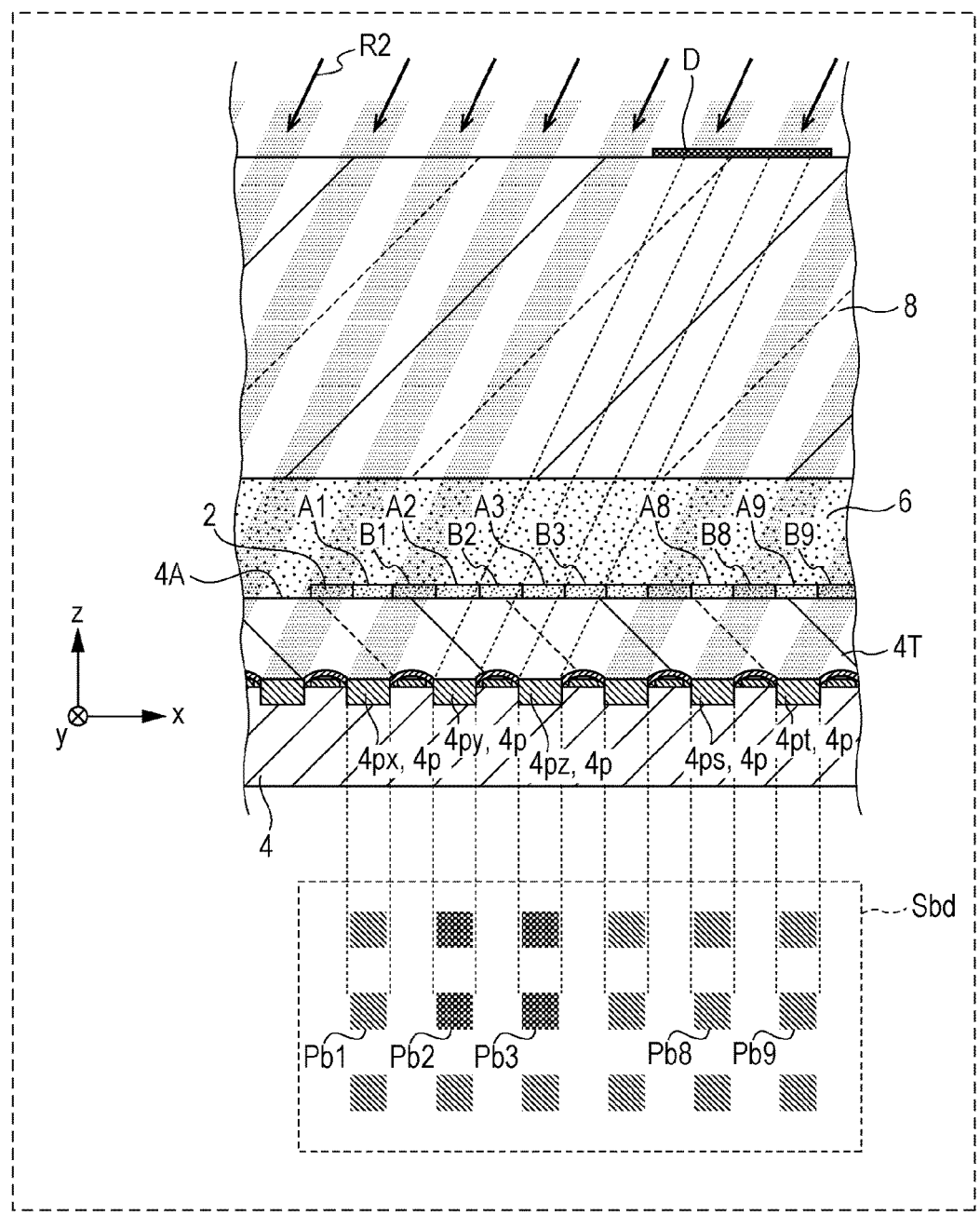
FIG. 17B is a diagram schematically illustrating a relationship between regions of the object which illuminating light passes through and an image obtained by the image sensor when the light is radiated from the second radiation direction.

FIG. 17B schematically illustrates a relationship between regions of the object 2 which illuminating light passes through and an image obtained by the image sensor 4 when the light is radiated from the above-described second radiation direction (see FIG. 3A and FIG. 3B). In FIG. 17B, an arrow R2 schematically denotes the second radiation direction.

In the illustrated example, light that has passed through a region B1 of the object 2 that is on the right side of and is adjacent to the region A1 (part of second resulting light corresponding to the second radiation direction R2) is incident on the photodiode 4px. A pixel Pb1 of a sub-image Sbd obtained when illuminating light is radiated from the second radiation direction R2 has information regarding the region B1.

A region B8 that is on the right side of and is adjacent to the region A8 of the object 2 is focused on. Since this region B8 is located above the light-shielding layer of the image sensor 4, an image of the region B8 is not obtained by radiation of light from the first radiation direction R1. However, light that has passed through a region of the object 2 located above the light-shielding layer of the image sensor 4 can be caused to be incident on the photodiode by irradiating the object 2 with light from a direction tilted with respect to the normal of the imaging surface 4A as illustrated in FIG. 17B. In the illustrated example, light that has passed through the region B8 that is on the right side of and is adjacent to the region A8 of the object 2 (another part of the second resulting light corresponding to the second radiation direction R2) is incident on the photodiode 4ps.

In this example, light that has passed through a region B9 that is on the right side of and is adjacent to a region A9 of the object 2 is incident on the photodiode 4pt located on the right side of the photodiode 4ps. Accordingly, a pixel Pb8 corresponding to the photodiode 4ps and a pixel Pb9 corresponding to the photodiode 4pt respectively have information regarding the region B8 of the object 2 and information regarding the region B9 of the object 2.

As illustrated, in this example, the dirt D is present between the light source, which is not illustrated, and the photodiode 4py and the photodiode 4pz. Accordingly, the photodiode 4py receives light that has passed through the dirt D and the region B2 of the object 2, and the photodiode 4pz receives light that has passed through the dirt D and the region B3 of the object 2 in this example. Since an amount of light incident on the photodiode 4py and the photodiode 4pz decreases compared with the case where the dirt D is absent, accurate images of the region B2 that is on the right side of and is adjacent to the region A2 and the region B3 that is on the right side of and is adjacent to the region A3 in the object 2 are not obtained when illuminating light is radiated from the second radiation direction R2. As illustrated in FIG. 17B, a pixel Pb2 corresponding to the photodiode 4py and a pixel Pb3 corresponding to the photodiode 4pz in the sub-image Sbd obtained when illuminating light is radiated from the second radiation direction R2 are dark pixels.

It should be noted that if the radiation direction is changed when the dirt D is present at a distance different from a distance of the object 2 from the surface of the photodiode 4p, the photodiode for a dark pixel also changes in response to the change in the radiation direction. Therefore, as understood from comparison of FIG. 17A with FIG. 17B, the positions where dark pixels appear differ from sub-image to sub-image.

In other words, among two pixels obtained by the same photodiode when illuminating light is radiated from two radiation directions different from each other, one of the two pixels can be a pixel denoting an image of the object 2 and the other can be a dark pixel. For example, both the pixel value of the pixel Pa2 in the sub-image Sad illustrated in FIG. 17A and the pixel value of the pixel Pb2 in the sub-image Sbd illustrated in FIG. 17B are determined based on an output from the photodiode 4py. The pixel Pa2 in the sub-image Sad is a pixel denoting an image of the region A2 of the object 2, whereas the pixel Pb2 in the sub-image Sbd is a dark pixel that is relatively darker than the pixel Pa2 in the sub-pixel Sad.

Accordingly, noise resulting from a foreign object located farther from the imaging surface of the sensor unit 7 than the object 2 can be detected by at least determining a difference between a pixel value for one (pixel Pa2 in this example) of pixels included in a certain sub-image and a pixel value of a pixel (pixel Pb2 in this example) corresponding to the pixel in the certain sub-pixel among pixels included in another sub-image. As described later using a specific example, noise resulting from a foreign object located at a distance different from a distance of the object 2 from the surface of the photodiode 4p may be detected by comparing two sub-images different from each other, for example.

In the above-described example, a difference between the pixel value of the pixel Pa2 included in the sub-pixel Sad obtained by irradiating the object 2 with light from the first radiation direction R1 and the pixel value of the pixel Pb2 included in the sub-image Sbd obtained by irradiating the object 2 with light from the second radiation direction R2 is determined. An example of a method for determining two pixels used to calculate the difference between pixel values will be described below.

As understood from the description with reference to FIG. 7A and FIG. 7B, if the image sensor 4 that obtains an image of the object 2 is used in common for different radiation directions, the photodiode on which light that has passed through a region of the object 2 is incident is determined by the radiation direction of the illuminating light. Accordingly, for example, when light is radiated from a direction of a normal of the imaging surface 4A and a direction tilted with respect to the normal N of the imaging surface 4A by the angle θ illustrated in FIG. 7A, a difference between two pixel values obtained by the same photodiode for the two radiation direction can be determined. In addition, for example, when light is radiated from the direction of the normal of the imaging surface 4A and a direction tilted with respect to the normal N of the imaging surface 4A by the angle θ' illustrated in FIG. 7B (direction rotated from the direction of the normal of the imaging surface 4A clockwise by the angle θ'), a difference between a pixel value obtained for one of the radiation directions by a certain photodiode and a pixel value obtained for the other radiation direction by a photodiode adjacent to the photodiode (adjacent photodiode on the left side in the x-direction in this example) can be determined. Thus, an appropriate set of pixels for detecting a dark pixel can be determined, for example, by storing information regarding the radiation direction (value of the radiation angle θ, for example) in association with a set of pixels for which a difference between pixel values is to be determined in the memory 160 (see FIG. 11) using a table format.

Figure 17C:
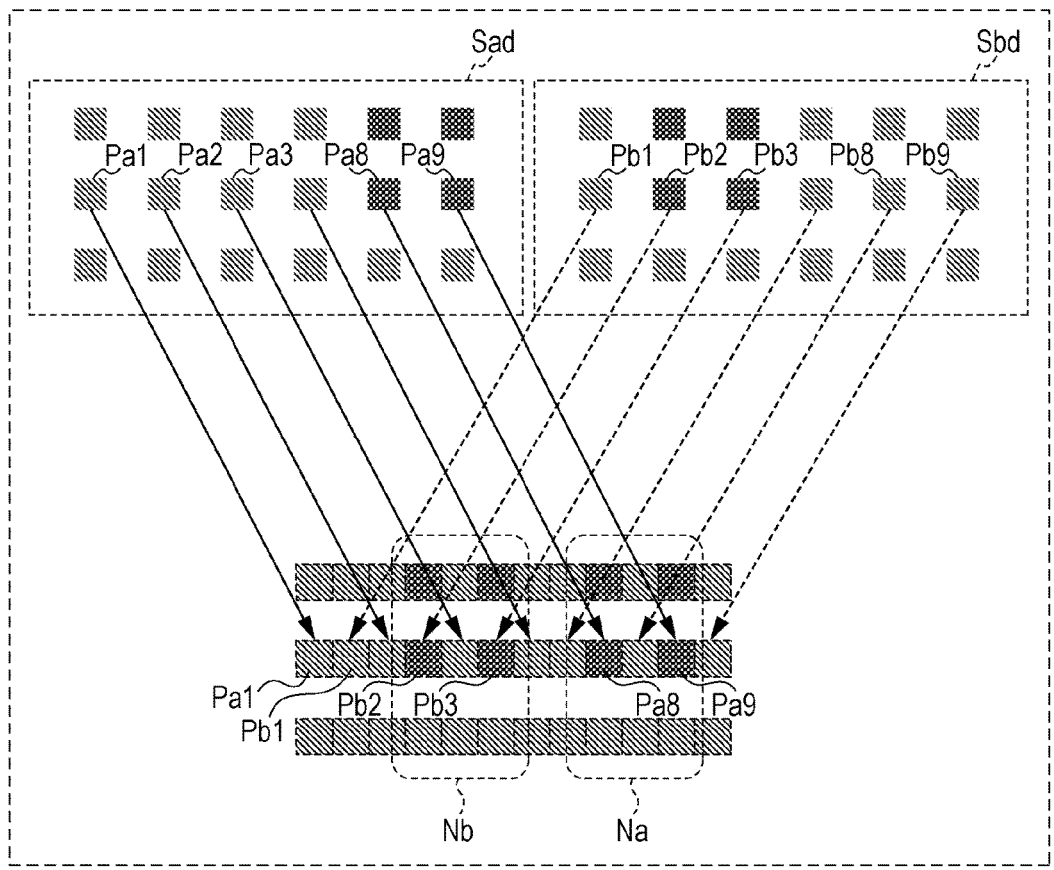
FIG. 17C is a diagram schematically illustrating a state where a sub-image illustrated in FIG. 17A and a sub-image illustrated in FIG. 17B are combined together.

FIG. 17C schematically illustrates a state where the sub-image Sad illustrated in FIG. 17A and the sub-image Sbd illustrated in FIG. 17B are combined together. As is apparent from comparison of FIG. 17A with FIG. 17B, on a photodiode on which light that has passed through a certain region of the object 2 is incident when light is radiated from the first radiation direction R1, light that has passed through a region adjacent to the certain region of the object 2 is incident when the light is radiated from the second radiation direction R2. Accordingly, during generation of a high-resolution image, pixels are arranged such that a pixel (pixel Pa1, for example) corresponding to a certain photodiode (photodiode 4px, for example) in the sub-image Sad is adjacent to a pixel (pixel Pb1, for example) corresponding to the photodiode in the sub-image Sbd as illustrated in FIG. 17C.

As described above, if the radiation direction is changed when the dirt D is present at a distance different from a distance of the object 2 from the surface of the photodiode 4p, the photodiode that receives light that has passed through the dirt D also changes in response to the change in the radiation direction. Typically, a photodiode that receives light that has passed through the dirt D when illuminating light is radiated from a certain radiation direction obtains an image of the object 2 for another radiation direction or receives light that has passed through neither the dirt D nor the object 2. Accordingly, when a high-resolution image is generated using a plurality of sub-images obtained in a state where the dirt D is present on the transparent plate 8, dark pixels are separated by a pixel denoting the image of the object 2 or a pixel not denoting any image because the illuminating light passes through the transparent plate 8. That is, dark pixels do not appear consecutively but appear inconsecutively in a high-resolution image as schematically illustrated in FIG. 17C.

In this example, the sub-images Sad and Sbd are respectively obtained in response to radiation of illuminating light from the first and second radiation directions that realize a twice higher resolution in the x-direction in FIG. 17A and FIG. 17B. Accordingly, one pixel denoting an image of the object 2 is sandwiched by two dark pixels (see FIG. 17C). Note that two or more pixels denoting an image of the object 2 are sometimes sandwiched by two dark pixels depending on the setting of the radiation direction or a multiplying factor for increasing the resolution.

As described above, dark pixels appear in the high-resolution image such that the dark pixels are separated by a pixel denoting an image of the object 2 or a pixel not denoting any image. This indicates that, if a high-resolution image includes a dark pixel, an abrupt change in the pixel value occurs near the dark pixel. Therefore, noise resulting from a foreign object located at a distance different from a distance of the object 2 from the surface of the photodiodes 4p can be detected also by detecting the presence of inconsecutive dark pixels using an abrupt change in the pixel value in a high-resolution image.

Figure 17D:
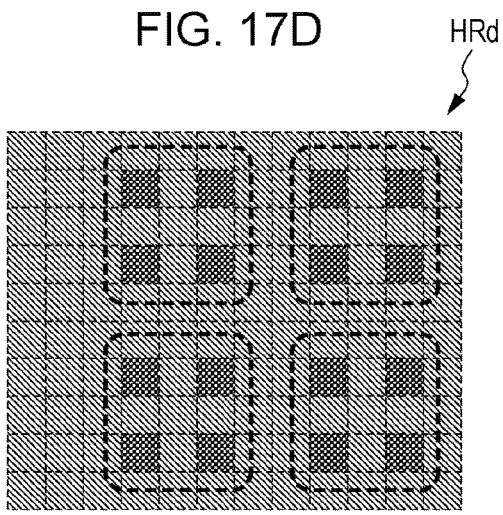
FIG. 17D is a diagram schematically illustrating how noise appears in a high-resolution image generated by combining together four sub-images obtained by radiation of light from four directions.

Note that FIG. 17C indicates that a region Na containing noise resulting from dark pixels in the sub-image Sad and a region Nb containing noise resulting from dark pixels in the sub-image Sbd appear at positions separate from each other in the combined image of the sub-image Sad and the sub-image Sbd. That is, if sub-images obtained for a plurality of radiation directions include dark pixels, noise occurs dispersedly at a plurality of regions of a high-resolution image for the plurality of radiation directions. This is not limited to the x-direction illustrated in FIG. 17A and FIG. 17B, and the same applies to the other directions. Thus, for example, when a four times higher resolution is realized by radiation of light from four directions, noise occurs at four regions corresponding to radiation of light from the four directions in the high-resolution image. FIG. 17D schematically illustrates how noise appears in a high-resolution image HRd generated by combining four sub-images obtained by radiation of light from four directions. FIG. 17D schematically illustrates regions containing noise using thick dashed-lines. Note that a sub-image not containing any dark pixel is sometimes obtained depending on the setting of the radiation direction.

As illustrated in FIG. 17A and FIG. 17B, sub-images are obtained by using the module 10 in which the object 2 is disposed between the transparent plate 8 and the image sensor 4 in this example. The thicker the transparent plate 8 in the module 10 and the larger the tilt of the radiation direction with respect to the normal of the imaging surface 4A of the image sensor 4, the larger an interval between regions where noise occurs in the high-resolution image. That is, even if there is one piece of dirt D on the transparent plate 8, noise can occur in a wide range in the high-resolution image. According to the embodiment of the present disclosure, such noise can be detected and removed. The technique of the embodiment of the present disclosure is useful particularly in generation of a high-resolution image.

<Specific Example of Noise Detection Method>

As described with reference to FIG. 17A to FIG. 17D, the position of a dark pixel in a sub-image changes depending on a change in the radiation direction. When a microscope slide is used as the transparent plate 8, a distance from the surface of the photodiodes 4$p$ to the dirt D is approximately 1 mm, which is approximately 1000 times as large as a distance (typically, several μm) of the object 2 from the surface of the photodiodes 4$p$. Accordingly, even if the change in the radiation direction is small, the position of the dark pixel greatly changes in sub-images. In contrast, since the object 2 is disposed in proximity to the surface of the photodiodes 4$p$ in the embodiment of the present disclosure, the position of the image of the object 2 in sub-images hardly changes in response to the change in the radiation direction.

Figure 18A:
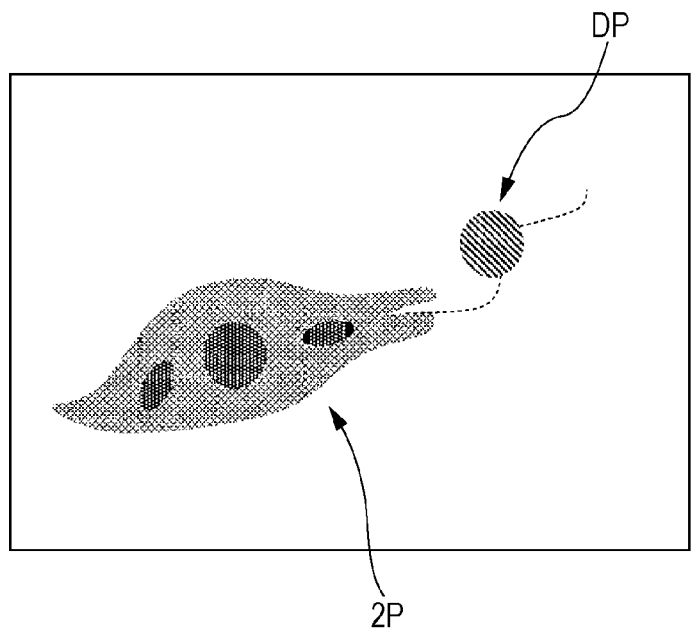
FIG. 18A is a diagram schematically illustrating an example of a sub-image obtained when dirt is present at a distance different from a distance of the object from the surface of the photodiodes.
Figure 18B:
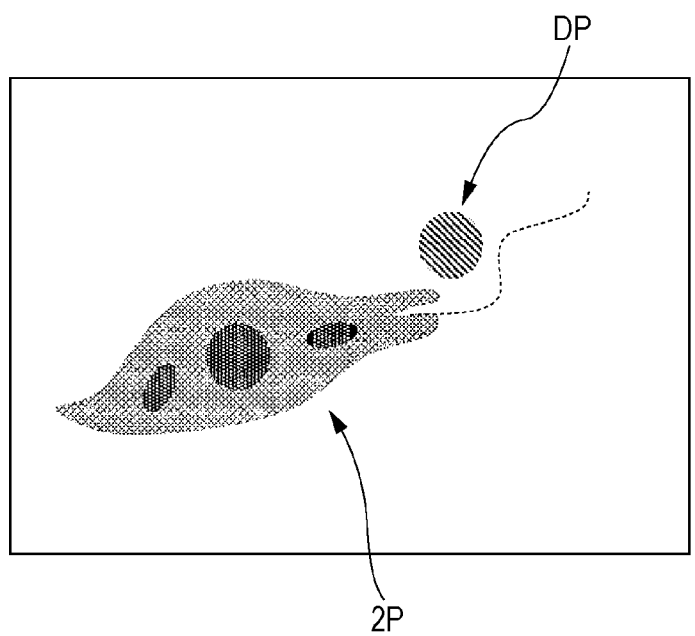
FIG. 18B is a diagram schematically illustrating an example of a sub-image obtained when illuminating light is radiated from a radiation direction different from the radiation direction used when the sub-image illustrated in FIG. 18A is obtained.

FIG. 18A and FIG. 18B are referred to. FIG. 18A illustrates an example of a sub-image obtained when the dirt D is present at a distance different from a distance of the object 2 from the surface of the photodiodes 4$p$. In the example illustrated in FIG. 18A, an image DP of the dirt D overlaps an image 2P of the object 2. FIG. 18B illustrates an example of a sub-image obtained when illuminating light is radiated from a radiation direction different from the radiation direction used when the sub-image illustrated in FIG. 18A is obtained. When the radiation direction is changed, the position of the image DP in the sub-image changes as schematically illustrated in FIG. 18B. In contrast, the image 2P of the object 2 hardly moves. As described with reference to FIG. 1A to FIG. 6, each of sub-images typical has pixel information for regions of the object different from each other. Accordingly, the image 2P of the object 2 illustrated in FIG. 18A and the image 2P of the object 2 illustrated in FIG. 18B are images different from each other when they are compared on a pixel-by-pixel basis. However, from a broader point of view, almost the same images of the object 2 are obtained for the radiation directions different from each other as schematically illustrated in FIG. 18A and FIG. 18B.

Suppose that, in the case where a plurality of sub-images are obtained by radiating illuminating light from the first to fourth radiation directions described above, both images obtained by a certain photodiode for two radiation directions among these radiation directions are images of the object 2. In this case, the image obtained for one of the radiation directions is an image of a certain region of the object 2, and an image obtained for the other radiation direction is an image of a region neighboring the certain region of the object 2. That is, in the case where both images obtained by a certain photodiode are images of the object 2, an absolute value of a difference between a pixel value of a pixel corresponding to the photodiode in the sub-image obtained for one of the radiation directions and a pixel value of a pixel corresponding to the photodiode in the sub-image obtained for the other radiation direction is close to 0. In contrast, in the case where one of these pixels is a dark pixel, the absolute value of the difference between the pixel values of the pixels in the two sub-images indicates a larger value. That is, a dark pixel can be found by comparing the difference between pixel values obtained by the same photodiode with a predetermined threshold.

For example, let Pv1 denote an output (pixel value herein) of a certain photodiode, among the photodiodes of the image sensor 4, obtained when illuminating light is radiated from a certain radiation direction, and let Pv2 denote an output (pixel value herein) of the certain photodiode obtained when illuminating light is radiated from another radiation direction. Let ε denote a predetermined threshold. If Pv1<Pv2 and |Pv1−Pv2|>ε are satisfied, it can be determined that the pixel value Pv1 is a pixel value of a pixel containing noise. In addition, if Pv1>Pv2 and |Pv1−Pv2|>ε are satisfied, it can be determined that the pixel value Pv2 is a pixel value of a pixel containing noise. Division may be used instead of subtraction between the pixel values Pv1 and Pv2. The "subtraction" calculation according to the embodiment of the present disclosure can include a "division"-based calculation.

Note that noise in a high-resolution image may appear as a pattern of pixels (hereinafter, sometimes referred to as "bright pixels") brighter than the other pixels. For example, if Pv1>Pv2 and |Pv1−Pv2|>ε are satisfied, it can be determined that the pixel value Pv1 is a pixel value of a bright pixel. In addition, if Pv1<Pv2 and |Pv1−Pv2|>ε are satisfied, it can be determined that the pixel value Pv2 is a pixel value of a bright pixel.

A photodiode on which light that has passed through a certain region of the object 2 is incident may differ from a photodiode on which light that has passed through a region neighboring the certain region is incident, depending on the setting of the radiation direction as illustrated in FIG. 7B. In such a case, the positions of pixels denoting images of these regions differ in two sub-images. When a photodiode that obtains an image of a certain region of the object 2 and a photodiode that obtains an image of a region neighboring the certain region differ in two sub-images, a difference between pixel values can be determined after shifting one of the sub-images using a shift amount calculated based on the radiation directions.

As described above, noise can be detected by calculating a difference between a pixel value of a pixel in a certain sub-image and a pixel value of a corresponding pixel in another sub-image. The difference between corresponding pixel values in sub-images may be calculated for at least one set of corresponding two pixels in the sub-images. The "corresponding two pixels in sub-images" are typically two pixels whose pixel values are obtained by the same photodiode for different radiation directions. Noise may be detected by calculating a difference between a pixel value of each pixel in a certain sub-image and a pixel value of the corresponding pixel in another sub-image or by comparing such pixel values. Comparing pixel values for all pixels included in sub-images equates to comparing two sub-images different from each other.

Alternatively, noise may be detected based on a change in the pixel values of pixels in a pixel block, which is constituted by a plurality of pixels included in a high-resolution image. In other words, the pixel values Pv1 and Pv2 obtained for different radiation directions may be extracted from a high-resolution image, and the above-described comparison may be performed. That is, determination as to whether Pv1<Pv2 and |Pv1−Pv2|>ε are satisfied or whether Pv1>Pv2 and |Pv1−Pv2|>ε are satisfied may be performed.

The "pixel block" is a section including a plurality of pixels in a high-resolution image, and includes one or more pixels extracted from each of the plurality of sub-images. Note that, when a high-resolution image having, for example, a four times higher resolution is generated, a pixel corresponding to a certain photodiode in a certain sub-image and a pixel corresponding to the certain photodiode in another sub-image are arranged to be vertically, horizontally, or diagonally adjacent to each other as described with reference to FIG. 17C. Accordingly, determining a change in the pixel values of pixels in a pixel block basically equates to comparing pixel values of two corresponding pixel values in sub-images.

An example of detecting noise based on a change in the pixel values of pixels in a pixel block, which is a 3×3 pixel array, in the high-resolution image will be described below.

FIG. 17D is referred to again. As already described, when a high-resolution image is generated using a plurality of sub-images obtained in a state where the dirt D is present on the transparent plate 8, dark pixels appear inconsecutively in the high-resolution image. For example, when a four times higher resolution is realized using sub-images obtained in response to radiation of illuminating light from the first to fourth radiation directions described above, a pattern in which a pixel denoting an image of the object 2 is sandwiched by two dark pixels appears as indicated by each thick dashed-line in FIG. 17D. Noise in the high-resolution image can be detected by detecting such a dark-pixel pattern.

Figure 19A:
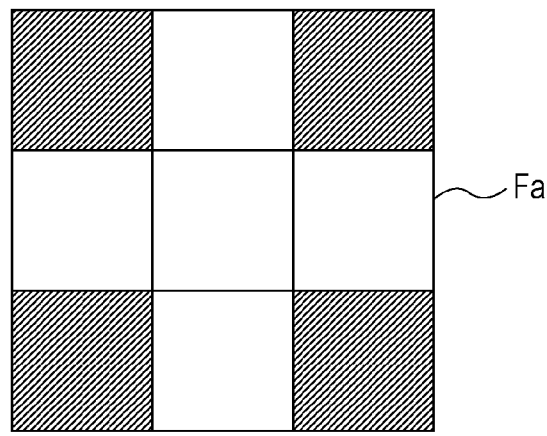
FIG. 19A is a diagram schematically illustrating an example of a filter usable to detect a dark-pixel pattern resulting from the dirt.
Figure 19B:
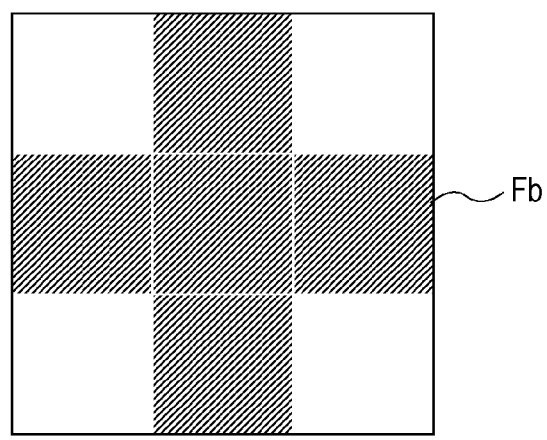
FIG. 19B is a diagram schematically illustrating an example of a filter usable to detect a dark-pixel pattern resulting from the dirt.

FIG. 19A and FIG. 19B each schematically illustrate an example of a filter usable to detect a dark-pixel pattern resulting from the dirt D. A filter Fa illustrated in FIG. 19A is used to extract a pixel value of the central pixel of a 3×3 pixel block and pixel values of four neighboring pixels of the central pixel. A filter Fb illustrated in FIG. 19B is used to extract pixel values of four pixels other than the central pixel and its four neighboring pixels from the pixel block. Herein, the term "four neighboring pixels" of a certain pixel refers to a group of four pixels vertically and horizontally adjacent to the pixel. In addition, the term "eight neighboring pixels" of a certain pixel refers to a group constituted by four pixels vertically and horizontally adjacent to the certain pixel and four pixels diagonally adjacent to the certain pixel. In other words, "eight neighboring pixels" of a certain pixel are eight pixels other than the central pixel in a 3×3 pixel array centered at the certain pixel.

For example, the case of applying the filter Fa illustrated in FIG. 19A to a pixel block constituted by pixels denoting an image of the objet 2 in the high-resolution image HRd illustrated in FIG. 17D is considered. In this case, five pixels denoting an image of the object 2 are extracted. In addition, the case of applying the filter Fb illustrated in FIG. 19B to the pixel block is considered. In this case, four pixels denoting an image of the object 2 are extracted.

Figure 20A:
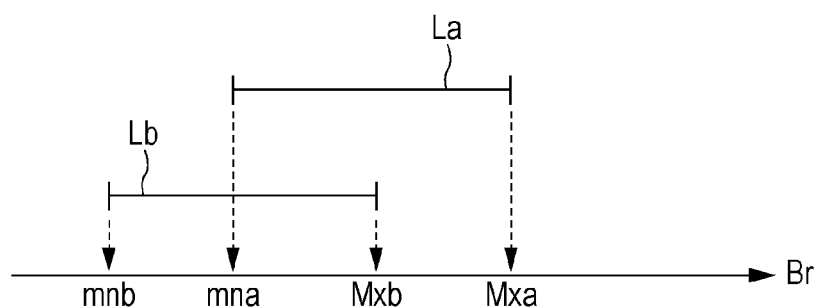
FIG. 20A is a diagram schematically illustrating an example of a range of pixel values of five pixels extracted using a filter and an example of a range of pixel values of four pixels extracted using a filter.

FIG. 20A illustrates an example of a range of the pixel values of the five pixels extracted using the filter Fa and an example of a range of the pixel values of the four pixels extracted using the filter Fb. In FIG. 20A, the horizontal axis denotes a pixel value Br. The pixel value Br is expressed by a gradation level ranging from 0 to 255, for example. Line segments La and Lb in FIG. 20A schematically illustrate a range of the pixel values of the five pixels extracted using the filter Fa and a range of the pixel values of the four pixels extracted using the filter Fb, respectively.

Pixels denoting an image of the object 2 are extracted when either the filter Fa or the filter Fb is applied to a pixel block constituted by pixels denoting the image of the object 2. Accordingly, a difference in the pixel value Br between the pixels extracted using these filters is relatively small. Typically, the line segment La, which is defined by the largest value Mxa and the smallest value mna of the pixel values of the pixels extracted using the filter Fa, and the line segment Lb, which is defined by the largest value Mxb and the smallest value mnb of the pixel values of the pixels extracted using the filter Fb, have an overlap as illustrated in FIG. 20A.

The case of applying the filter Fa to a pixel block in the thick dashed-line in the high-resolution image HRd illustrated in FIG. 17D is considered next. In this case, five pixels denoting an image of the object 2 are extracted. In addition, the case of applying the filter Fb to the pixel block in the thick dashed-line is considered. In this case, four dark pixels are extracted. Accordingly, pixel values of the pixels extracted using the filter Fb are smaller than pixel values of the pixels extracted using the filter Fa.

Figure 20B:
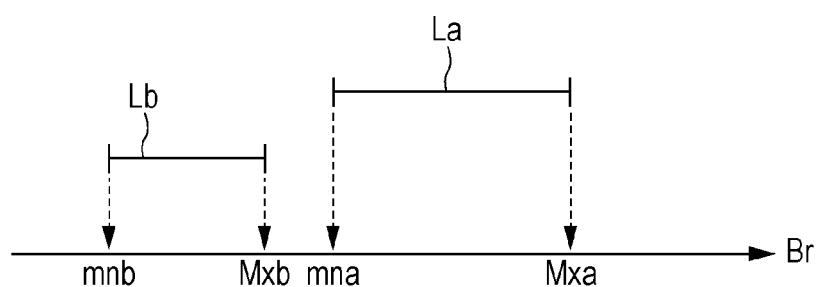
FIG. 20B is a diagram schematically illustrating another example of the range of the pixel values of the five pixels extracted using the filter and another example of the range of the pixel values of the four pixels extracted using the filter.
Figure 21:
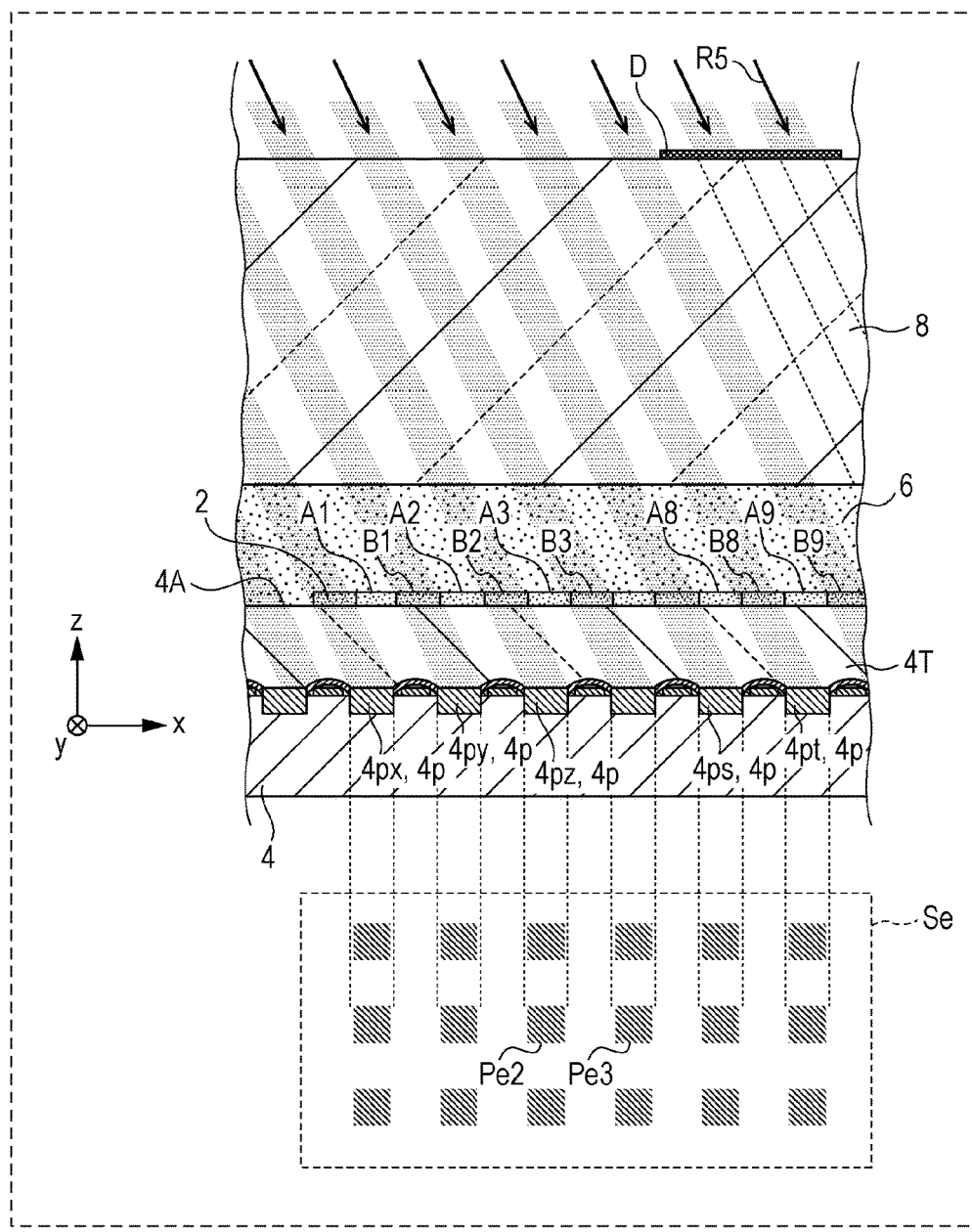
FIG. 21 is a diagram schematically illustrating a relationship between regions of the object which illuminating light passes through and an image obtained by the image sensor when the light is radiated from a fifth radiation direction different from the first to fourth radiation directions.

FIG. 20B illustrates another example of the range of the pixel values of the five pixels extracted using the filter Fa and another example of the range of the pixel values of the four pixels extracted using the filter Fb. When the filter Fa and the filter Fb are applied to a pixel block in the thick dashed-line in the high-resolution image HRd illustrated in FIG. 17D, a graph illustrated in FIG. 20B is obtained. In the example illustrated in FIG. 20B, the line segment La and the line segment Lb do not have any overlap. Conversely, the fact that the line segment La corresponding to the filter Fa and the line segment Lb corresponding to the filter Fb do not have any overlap as illustrated in FIG. 20B indicates that a pattern of inconsecutive dark pixels appears in the high-resolution image.

Since Mxb<mna is satisfied in the example illustrated in FIG. 20B, it can be determined that the pixel block to which the filter Fa and the filter Fb are applied contains noise if Mxb<mna is satisfied. Note that noise in the high-resolution image may appear as a pattern of brighter pixels than other pixels. In such a case, Mxa<mnb is satisfied. Thus, if Mxb<mna or Mxa<mnb is satisfied, it can be determined that the pixel block contains noise.

The filters used to detect a pattern of inconsecutive dark pixels or a pattern of inconsecutive bright pixels are not limited to the filter Fa illustrated in FIG. 19A and the filter Fb illustrated in FIG. 19B. Filters used to detect a specific pattern can be appropriately selected in accordance with the setting of the radiation direction or the like. In addition, the size of the pixel block is not limited to 3 rows×3 columns. The size of the pixel block may be (2n+1) rows×(2n+1) columns, where n is a natural number. In this case, filters having a size of (2n+1) rows×(2n+1) columns can be used. When the coordinate values specifying the pixel located at the upper left position of the filter is (1, 1), a filter for extracting pixel values of pixels other than pixels whose coordinate values are (2m+1, 2m'+1) and a filter for extracting pixel values of pixels whose coordinate values are (2m+1, 2m'+1) among pixels constituting the pixel block can be used, for example. Here, each of m and m' is an integer greater than or equal to 0 and less than equal to n.

If pixels denoting an image of the dirt D are separated from pixels denoting an image of the object 2 in a certain sub-image as illustrated in FIG. 18B, the image of the dirt D appears at a position separate from that of the image of the object 2 also in the high-resolution image. The positions of the pixels denoting the image of the dirt D in a certain sub-image can be identified based on comparison of pixel values of pixels in sub-images, for example. If the positions of the pixels denoting the image of the dirt D in a certain sub-image can be identified, it is easy to identify positions of the pixels denoting the image of the dirt D or dark pixels in the other sub-images. For example, template matching in which an image of the dirt D that appears separately from the image of the object 2 is used as a template image or feature-amount-based matching using a local feature amount may be performed. In addition, a direction in which the image of the dirt D moves in response to a change in the radiation direction is known in advance in the technique of the embodiment of the present disclosure. For example, when the radiation direction is tilted toward the x-axis direction, the position of the image of the dirt D in the sub-image also moves in the x-axis direction (see FIG. 17A and FIG. 17B). Accordingly, it is considered that, when a similarity between two different sub-images obtained with the radiation direction tilted toward the x-axis direction is calculated by moving, relative to one of the two different sub-images, the other toward the x-axis direction, a cross-correlation function (similarity) takes a maximum value for a point where the images of the object in two sub-images overlap. The position of the image of the object or the position of the image of the dirt D can be identified by searching for a maximum value of the similarity between two sub-images in this way.

<Specific Examples of Noise Removal Method>

Specific examples of the noise removal method will be described next. A more accurate image of an object can be reproduced in a high-resolution image by detecting noise through a noise detection process and then removing the noise from the high-resolution image. Specifically, noise resulting from a foreign object located at a distance different from a distance of the object 2 from the surface of the photodiodes 4p is removed by replacing a pixel value of a pixel containing noise (pixel indicating an image of the dirt D herein) with a pixel value calculated from pixel values of pixels other than the pixel containing noise.

(First Example of Noise Removal Method)

A position of a pixel containing noise in a high-resolution image is already known in the noise detection process. For example, when the noise detection process is performed using the above-described set of the filter Fa and the filter Fb, four pixels located at the corners of a pixel block for which Mxb<mna or Mxa<mnb is satisfied are pixels containing noise. Hereinafter, $V_{j,k}$ denotes a pixel value of a pixel located at a j-th row and a k-th column of a pixel array constituting an image.

For example, noise can be removed from the high-resolution image by replacing pixel values of these pixels containing noise with an average pixel value of pixels not containing noise among pixels included in the high-resolution image. Specifically, let $V_{p,q}$ and $V'_{p,q}$ respectively denote a pixel value of a pixel containing noise and a noise-removed pixel value, and let W denote the number of pixels not containing noise. Then, the pixel value $V'_{p,q}$ can be determined using Equation (1) below.

$$V'_{p,q}=(\Sigma'V_{p,q})/(J\times K) \qquad (1)$$

In Equation (1), "Σ'" in the numerator denotes the sum for pixels not containing noise among pixels included in the pixel array, and "×" in the denominator denotes multiplication. Note that the noise removal process may be performed on a sub-image basis if the positions of the pixels containing noise are determined on a sub-image basis.

(Second Example of Noise Removal Method)

A pixel value of a pixel containing noise may be replaced with a pixel value calculated using pixel values of neighboring pixels of the pixel containing noise. For example, an average pixel value of two pixels vertically adjacent to the pixel containing noise and two pixels horizontally adjacent to the pixel containing noise may be determined, and the pixel value of the pixel containing noise may be replaced with this average value. Specifically, noise may be removed by replacing the pixel value $V_{p,q}$ of the pixel containing noise with the pixel value $V'_{p,q}$ calculated using Equation (2) below.

$$V'_{p,q}=(V_{p-1,q}+V_{p+1,q}+V_{p,q+1})/4 \qquad (2)$$

Interpolation may be performed for the pixel containing noise using neighboring pixels of the pixel containing noise in this way. The pixels used in calculation of the average may be, for example, four neighboring pixels or eight neighboring pixels of the pixel containing noise. Alternatively, the pixel value of the pixel containing noise may be estimated based on pixel values of neighboring pixels of the pixel containing noise by using a method, such as the nearest-neighbor method, the bilinear method, or the bicubic method.

(Third Example of Noise Removal Method)

In addition, noise may be removed in the following manner. For example, another sub-image is obtained by radiating illuminating light from a radiation direction different from the plurality of radiation directions corresponding to the plurality of sub-images that constitute the high-resolution image, and a pixel containing noise is replaced with (complemented by) a pixel in this sub-image.

FIG. 17B is referred to again. For example, when illuminating light is radiated from the radiation direction illustrated in FIG. 17B, an accurate image denoting the regions B2 and B3 of the object 2 are not obtained since the dirt D is present between the light source not illustrated and the regions B2 and B3. In the example illustrated in FIG. 17B, the pixels Pb2 and Pb3 in the sub-image Sbd are dark pixels.

A fifth sub-image Se is obtained by irradiating the object 2 with light from a fifth radiation direction R5 different from the first to fourth radiation directions described above, as illustrated in FIG. 21. When illuminating light is radiated from the fifth radiation direction R5 illustrated in FIG. 21, the illuminating light is incident on both the regions B2 and B3 of the object 2, and thus light that has passed through the regions B2 and B3 are incident on the photodiodes 4p.

Accordingly, pixels Pe2 and Pe3 included in the sub-image Se thus obtained respectively denote an image of the region B2 of the object 2 and an image of the region B3 of the object 2. Accordingly, the images of the regions B2 and B3 of the object 2 can be perfectly reproduced by replacing the pixels Pb2 and Pb3 in the sub-image Sbd illustrated in FIG. 17B with the pixels Pe2 and Pe3 in the sub-image Se illustrated in FIG. 21, respectively.

That is, a pixel value Ve2 of the pixel Pe2 of the sub-image Se can be used, instated of the pixel value Vb2 of the pixel Pb2, as a pixel value V'2 of a pixel corresponding to the pixel Pb2 of the sub-image Sbd in the high-resolution image, as indicated by Equation (3) below. Likewise, a pixel value Ve3 of the pixel Pe3 of the sub-image Se can be used, instead of the pixel value Vb3 of the pixel Pb3, as a pixel value V'3 of a pixel corresponding to the pixel Pb3 of the sub-image Sbd in the high-resolution image.

$$V'2=Ve2 \quad (3)$$

$$V'3=Ve3 \quad (4)$$

As described above, according to the embodiment of the present disclosure, an image of a certain region of the object 2, which cannot be obtained by radiation of light from a certain radiation direction, can be obtained by radiation of light from another radiation direction. By using an image thus obtained, a more accurate image of the object can be reproduced in the high-resolution image.

Figure 22:
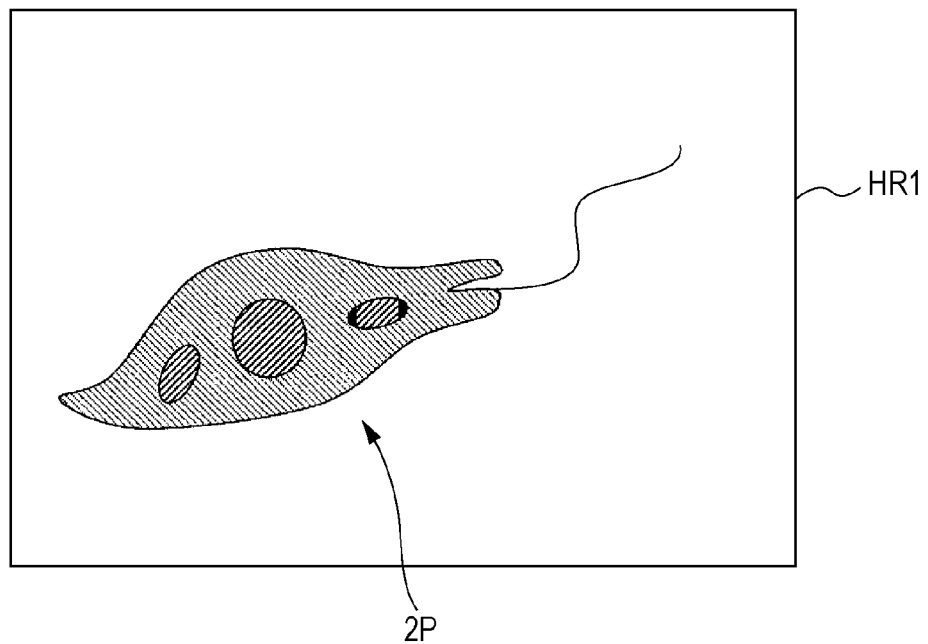
FIG. 22 is a diagram schematically illustrating an example of a noise-removed high resolution image.

For example, a noise-free high-resolution image such as the one illustrated in FIG. 22 can be generated based on the sub-images illustrated in FIG. 18A and FIG. 18B and a sub-image obtained when illuminating light is radiated from a radiation direction different from the radiation directions used when these sub-images are obtained. In a high-resolution image HR1 illustrated in FIG. 22, the image DP of the dust D illustrated in FIG. 18A and FIG. 18B is removed and the image of the object 2 is perfectly reproduced. Note that the resolution of the sub-images illustrated in FIG. 18A and FIG. 18B is equal to the intrinsic resolution of the image sensor 4, whereas the resolution of the high-resolution image HR1 illustrated in FIG. 22 is higher than the intrinsic resolution of the image sensor 4.

(Fourth Example of Noise Removal Method)

As described below, noise may be removed by replacing a pixel value of a pixel containing noise with a corrected pixel value.

Figure 23A:
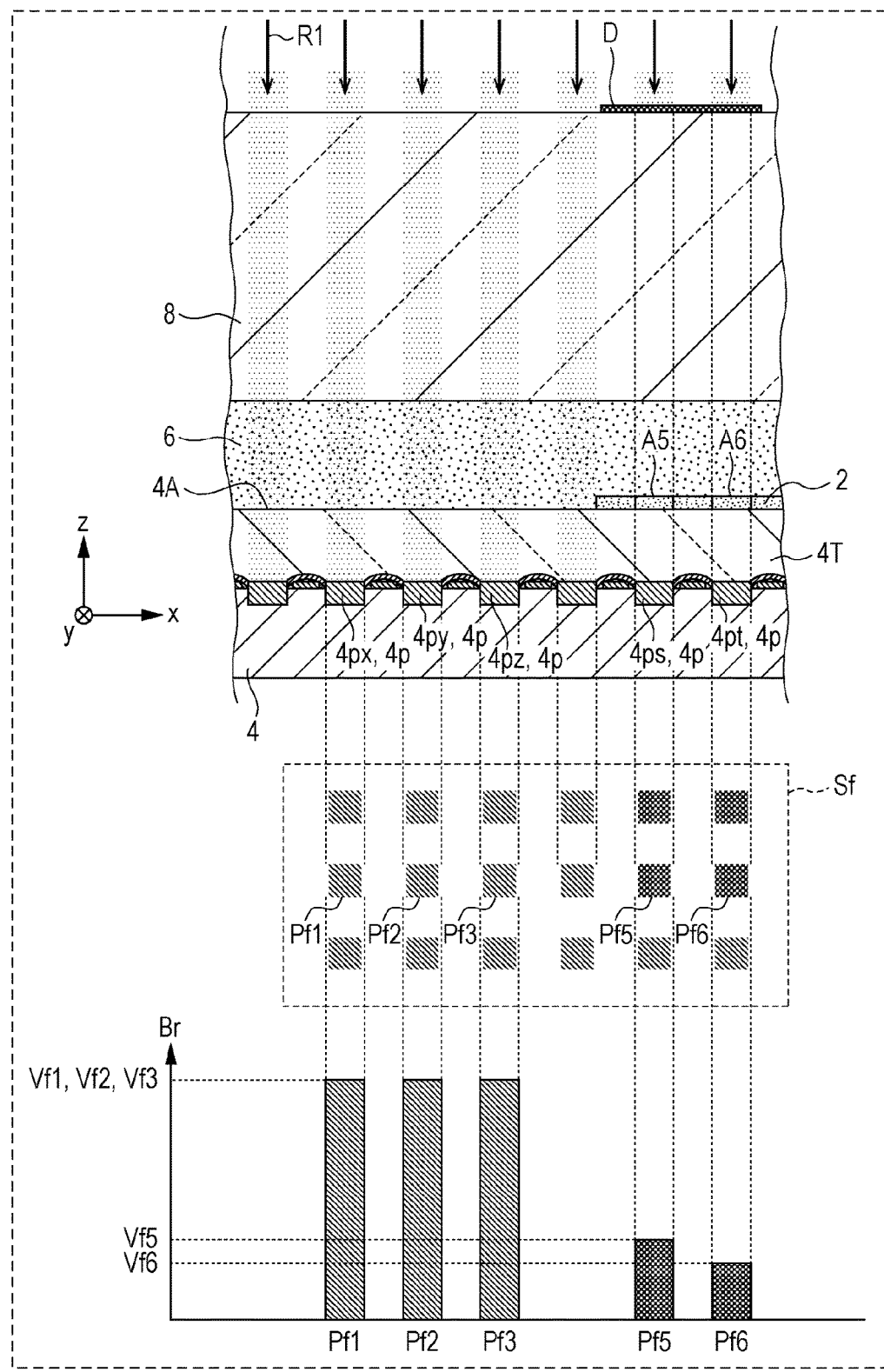
FIG. 23A is a diagram collectively illustrating a sub-image obtained when illuminating light is radiated from the first radiation direction and a bar graph schematically illustrating a pixel value of each pixel included in the sub-image.

FIG. 23A illustrates another example of a sub-image obtained when illuminating light is radiated from the first radiation direction (see FIG. 2A and FIG. 2B) described above. In the example illustrated in FIG. 23A, regions A5 and A6, which are portions of the object 2, are located right above the photodiodes 4ps and 4pt, respectively, and the dirt D is present above the regions A5 and A6 of the object 2. Note that the object 2 does not overlap photodiodes 4px, 4py, and 4pz located on the left side of the photodiodes 4ps and 4pt and that the dirt D does not overlap the photodiodes 4px, 4py, and 4pz.

FIG. 23A collectively illustrates, as one diagram, a sub-image Sf, which is another example of the sub-image obtained when illuminating light is radiated from the first radiation direction, and a bar graph schematically illustrating the pixel value Br of each pixel included in the sub-image Sf. As illustrated in the upper portion of FIG. 23A, neither the object 2 nor the dirt D is present above the photodiodes 4px, 4py, and 4pz. Illuminating light that has passed through the transparent plate 8 is directly incident on the photodiodes 4px, 4py, and 4pz. Accordingly, pixels Pf1, Pf2, and Pf3 respectively corresponding to the photodiodes 4px, 4py, and 4pz indicate relatively high pixel values. As illustrated in the lower portion of FIG. 23A, pixel values Vf1 to Vf3 of the pixels Pf1 to Pf3 are relatively high values that are substantially equal. In contrast, pixels Pf5 and Pf6 respectively corresponding to the photodiodes 4ps and 4pt are dark pixels, and pixel values Vf5 and Vf6 of the pixels Pf5 and Pf6 are smaller than the pixel values Vf1 to Vf3.

In the example illustrated in FIG. 23A, since the dirt D is present between the region A5 of the object 2 and the light source not illustrated, an amount of light incident on the region A5 decreases compared with the case where the dirt D is absent. However, since light that travels from the light source toward the photodiode 4ps does not entirely blocked by the dirt D, at least part of light that travels from the light source toward the region A5 is incident on the region A5. At least part of the light that has incident on the region A5 is then incident on the photodiode 4ps. Thus, the pixel Pf5 obtained by the photodiode 4ps includes information regarding the region A5. As described above, even if the dirt D is on the transparent plate 8, information regarding the region A5 located at a position that coincides with the position of the dirt D is not entirely lost. The same applies to the pixel Pf6 obtained by the photodiode 4pt.

Figure 23B:
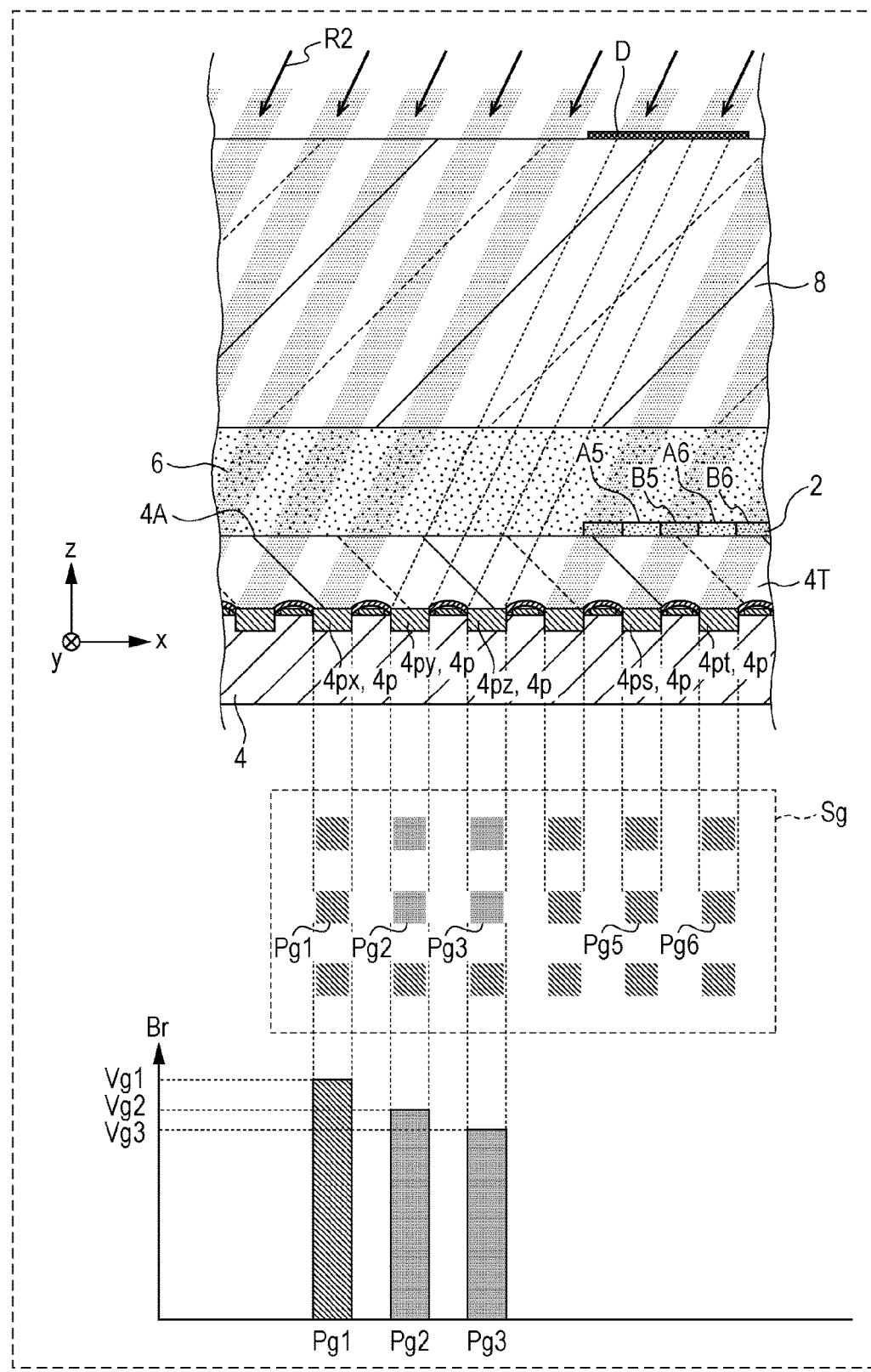
FIG. 23B is a diagram collectively illustrating a sub-image obtained when the radiation direction is changed from the state illustrated in FIG. 23A to the second radiation direction and a bar graph schematically illustrating the pixel value of each pixel included in the sub-image.

FIG. 23B collectively illustrates an example of a sub-image obtained when the radiation direction is changed to the second radiation direction (see FIG. 3A and FIG. 3B) described above from the state illustrated in FIG. 23A. FIG. 23B also illustrates, as one diagram, a sub-image Sg thus obtained and a bar graph schematically illustrating the pixel value Br of each pixel included in the sub-image Sg.

Light that has not passed through the dirt D but has passed through the object is incident on the photodiode 4ps and the photodiode 4pt in the state illustrated in FIG. 23B. In this case, light that has passed through a region B5 that is on the right side of and is adjacent to the region A5 of the object 2 and light that has passed through a region B6 that is on the right side of and is adjacent to the region A6 are incident on the photodiode 4ps and the photodiode 4pt, respectively. That is, images of the region A5 and the region A6 are not obtained by radiation of light from the second radiation direction. Pixels Pg5 and Pg6 corresponding to the photodiode 4ps and the photodiode 4pt do not denote images of the region A5 and the region A6 of the object 2 but denote images of the region B5 and the region B6, respectively. Accordingly, illustration of pixel values of the pixels Pg5 and Pg6 is omitted in the bar graph illustrated in the lower portion of FIG. 23B.

In the state illustrated in FIG. 23B, neither the dirt D nor the object 2 is present between the photodiode 4px and the light source not illustrated, and illuminating light that has passed through the transparent plate 8 is directly incident on the photodiode 4px. Accordingly, a pixel Pg1 corresponding to the photodiode 4px indicates a relatively high pixel value Vg1, just like the pixel Pf1 in the sub-image Sf illustrated in FIG. 23A.

In contrast, since the dirt D is present between the photodiodes 4py and 4pz and the light source not illustrated, the photodiodes 4py and 4pz receive light that has passed through the dirt D. Accordingly, an amount of light incident on the photodiodes 4py and 4pz is smaller than an amount of light incident on the photodiode 4px. Pixels Pg2 and Pg3 corresponding to the photodiodes 4py and 4pz respectively indicate pixel values Vg2 and Vg3, which are smaller than the pixel value Vg1. In this example, Vg1>Vg2>Vg3 is satisfied. The pixels Pg2 and Pg3 can be considered as pixels denoting an image of the dirt D.

Figure 23C:
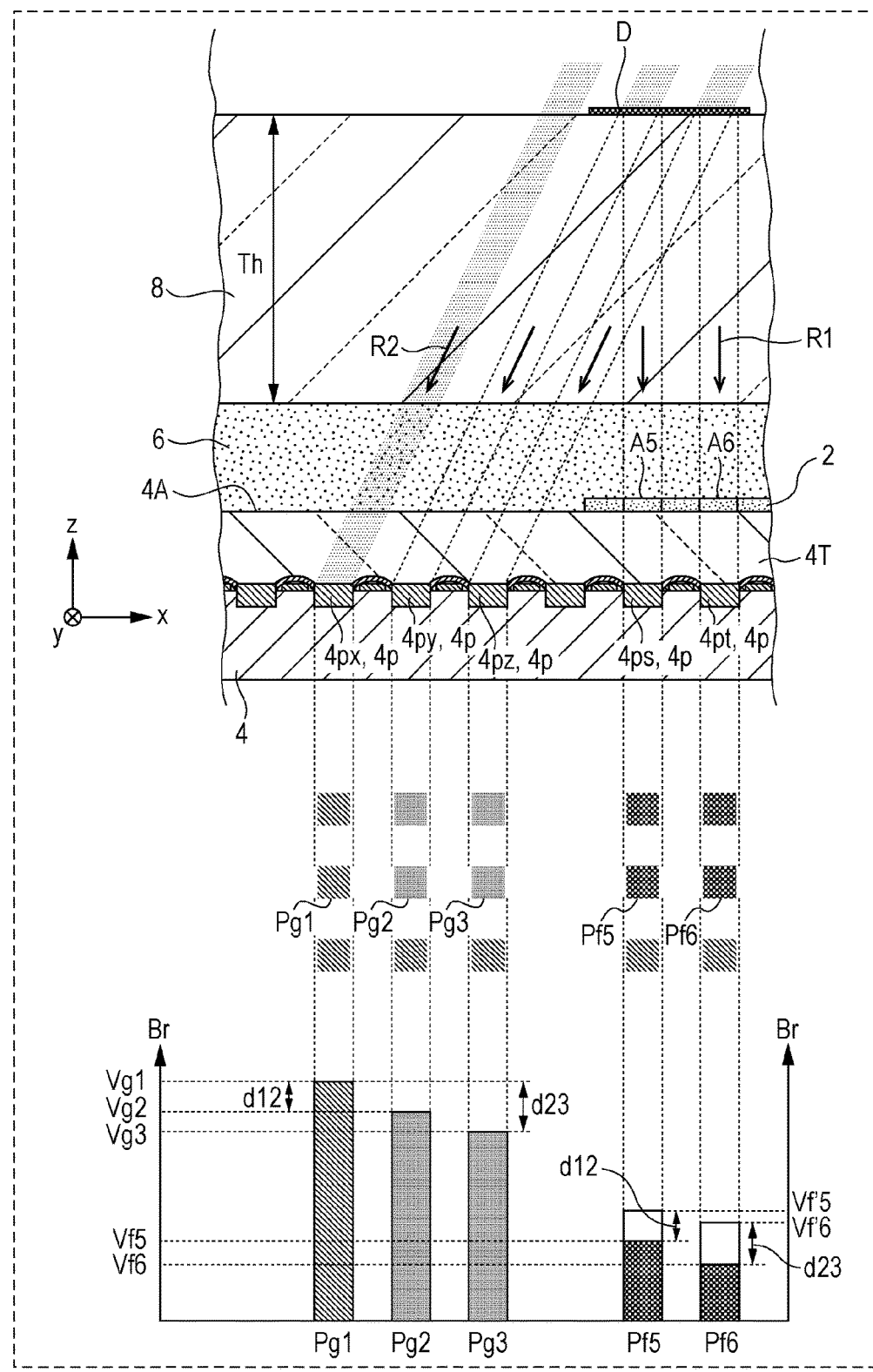
FIG. 23C is a diagram collectively illustrating pixel values of pixels described with reference to FIG. 23A and pixel values of pixels described with reference to FIG. 23B.

FIG. 23C collectively illustrates the pixel values Vf5 and Vf6 of the pixels Pf5 and Pf6 described with reference to FIG. 23A and the pixel values Vg1 to Vg3 of the pixels Pg1 to Pg3 described with reference to FIG. 23B. As described with reference to FIG. 23A, the pixel values Pf5 and Pf6 include information regarding the regions A5 and A6 of the object 2, respectively. However, since light that has passed through the dirt D is incident on the regions A5 and A6, the pixels Pf5 and Pf5 indicate pixel values smaller than pixel values supposed to be obtained if the dirt D were absent. Accordingly, it is considered that the proper pixel value that is free from the influence of the dirt D can be reproduced by adding, to each of the pixel values Vf5 and Vf6 of the pixels Pf5 and Pf6, a pixel value equivalent to a decrease in the amount of light caused as a result of light passing through the dirt D.

The pixel value equivalent to a decrease in the amount of light caused as a result of light passing through the dirt D can be estimated in the following manner. As described with reference to FIG. 23B, the photodiode 4*px* directly receives light that has passed through the transparent plate 8 when the illuminating light is radiated from the second radiation direction. That is, the pixel Pg1 obtained by the photodiode 4*px* is a pixel containing neither the image of the dirt D nor the image of the object 2. On the other hand, the photodiodes 4*py* and 4*pz* receive light that has passed through the dirt D but has not been incident on the object 2 when the illuminating light is radiated from the second radiation direction. That is, the pixels Pg2 and Pg3 are pixels containing an image of the dirt D but not containing an image of the object 2. From the above description, a difference d12 between the pixel value Vg1 of the pixel Pg1 and the pixel value Vg2 of the pixel Pg2 and a difference d23 between the pixel value Vg1 of the pixel Pg1 and the pixel value Vg3 of the pixel Pg3 can be considered to be values reflecting a decrease in the amount of light caused as a result of the illuminating light passing through the dirt D.

For example, light that travels toward the photodiode 4*ps* when illuminating light is radiated from the first radiation direction passes through a certain region of the dirt D. Light that travels toward the photodiode 4*py* when illuminating light is radiated from the second radiation direction also passes through the certain region of the dirt D as illustrated in FIG. 23C. Thus, it is considered that a decrease in the amount of light caused by the dirt D can be cancelled out if the difference d12 between the pixel values is added to the pixel value Vf5 of the pixel Pf5 obtained when illuminating light is radiated from the first radiation direction. That is, a proper image of the region A5 can be reproduced by replacing the pixel value Vf5 of the pixel Pf5 with a pixel value Vf'5 determined using Equation (5) below.

$$Vf'5 = Vf5 + d12 = Vf5 + (Vg1 - Vg2) \quad (5)$$

Likewise, a decrease in the amount of light caused by the dirt D can be canceled out if the difference d23 between the pixel value Vg1 indicated by the pixel Pg1 and the pixel value Vg3 indicated by the pixel Pg3 is added to the pixel value Vf6 of the pixel Pf6 obtained when illuminating light is radiated from the first radiation direction. That is, the pixel Vf6 of the pixel Pf6 can be replaced with a pixel value Vf'6 determined using Equation (6) below.

$$Vf'6 = Vf6 + d23 = Vf6 + (Vg1 - Vg3) \quad (6)$$

Note that a pixel value corresponding to a photodiode that receives light that has passed through the same region of the dirt D for different radiation directions need not necessarily be used as a pixel value to be subtracted from a pixel value of a pixel not containing neither the image of the dirt D nor the image of the object 2. For example, light that is incident on the photodiode 4*pt* when illuminating light is radiated from the first radiation direction and light that is incident on the photodiode 4*pz* when illuminating light is radiated from the second radiation direction pass through the same region of the dirt D. Accordingly, the pixel value Vf'6 is determined using the value d23 obtained by subtracting the pixel value Vg3 of the pixel Pg3 corresponding to the photodiode 4*pz* from the pixel value Vg1 is determined. However, a pixel value close to the proper pixel value which the image of the region A6 is supposed to have can be reproduced also by adding the difference d12 to the pixel value Vf6.

In realization of an increased resolution using the principle described with reference to FIG. 1A to FIG. 6, imaging is performed by irradiating an object with illuminating light from a plurality of radiation directions including radiation from diagonal directions. Accordingly, typically a pixel value (Vg1 herein) of a pixel containing neither the image of the dirt D nor the image of the object 2 and pixel values (Vg2 and Vg3 herein) of pixels containing the image of the dirt D but not containing the image of the object 2 are obtained during the process of increasing the resolution. According to the fourth example, since the pixel values of pixels not denoting the image of the object are utilized to remove noise, extra imaging need not be performed by changing the radiation direction.

As described above, noise can be removed by adding, to a pixel value (Vf5, for example) of a pixel containing noise, a difference between a pixel value (Vg1, for example) of a pixel containing neither the image of the dirt D nor the image of the object 2 and a pixel value (Vg2, for example) of a pixel containing the image of the dirt D but not containing the image of the object 2. Note that correction for cancelling out a decrease in the amount of light incident on a photodiode is not needed if a sub-image does not include any dark pixel. Accordingly, correction of a pixel value is not necessarily performed on all sub-images.

As described above, the distance from the surface of the photodiode 4*p* to the object 2 is approximately 1 μm, whereas the thickness of the transparent plate 8 (microscope slide herein) is typically approximately 1 mm. That is, the transparent plate 8 practically has a thickness extremely larger than a thickness schematically indicated with an arrow Th in FIG. 23C. For this reason, even if the radiation direction is changed slightly, the position of the pixel denoting the image of the dirt D greatly changes in the sub-image. That is, since it is easier to separate a pixel denoting the image of the dirt D and a pixel denoting the image of the object 2 from each other if the transparent plate 8 has a large thickness, such a configuration is advantageous.

It can be determined which pixels, among pixels included in a sub-image, are pixels (pixels Pg2 and Pg3, for example) containing the image of the dirt D but not containing the image of the object 2, for example, by using an applied version of the above-described noise detection method. In particular, since a pattern of pixels denoting the image of the dirt D similar to the pattern of dark pixels described with reference to FIG. 17C and FIG. 17D clearly appears at positions separate from pixels denoting the image of the object 2 if the transparent plate 8 has a large thickness, such a configuration is advantageous. Since pixels (pixel Pg1, for example) containing neither the image of the dirt D nor the image of the object 2 generally indicate large pixel values at a periphery portion of a sub-image or a high-resolution image, such pixels can be easily detected.

In addition to the examples described above, the pixel value of the pixel containing noise may be replaced with a pixel value of another adjacent pixel in the high-resolution image. That is, if a pixel value obtained by a photodiode on which light that has passed through a certain region of an object is incident when illuminating light is radiated from a certain radiation direction contains noise, a pixel value obtained by a photodiode on which light that has passed through a region adjacent to the certain region in the object when illuminating light is radiated from another certain radiation direction may be employed as a pixel value denoting the image of the certain region.

The above-described noise removal methods may be combined with each other. For example, estimating and complementing a pixel value of a pixel may be used in combination.

(Specific Example of Combination of Noise Detection Process and Noise Removal Process)

Figure 24A:
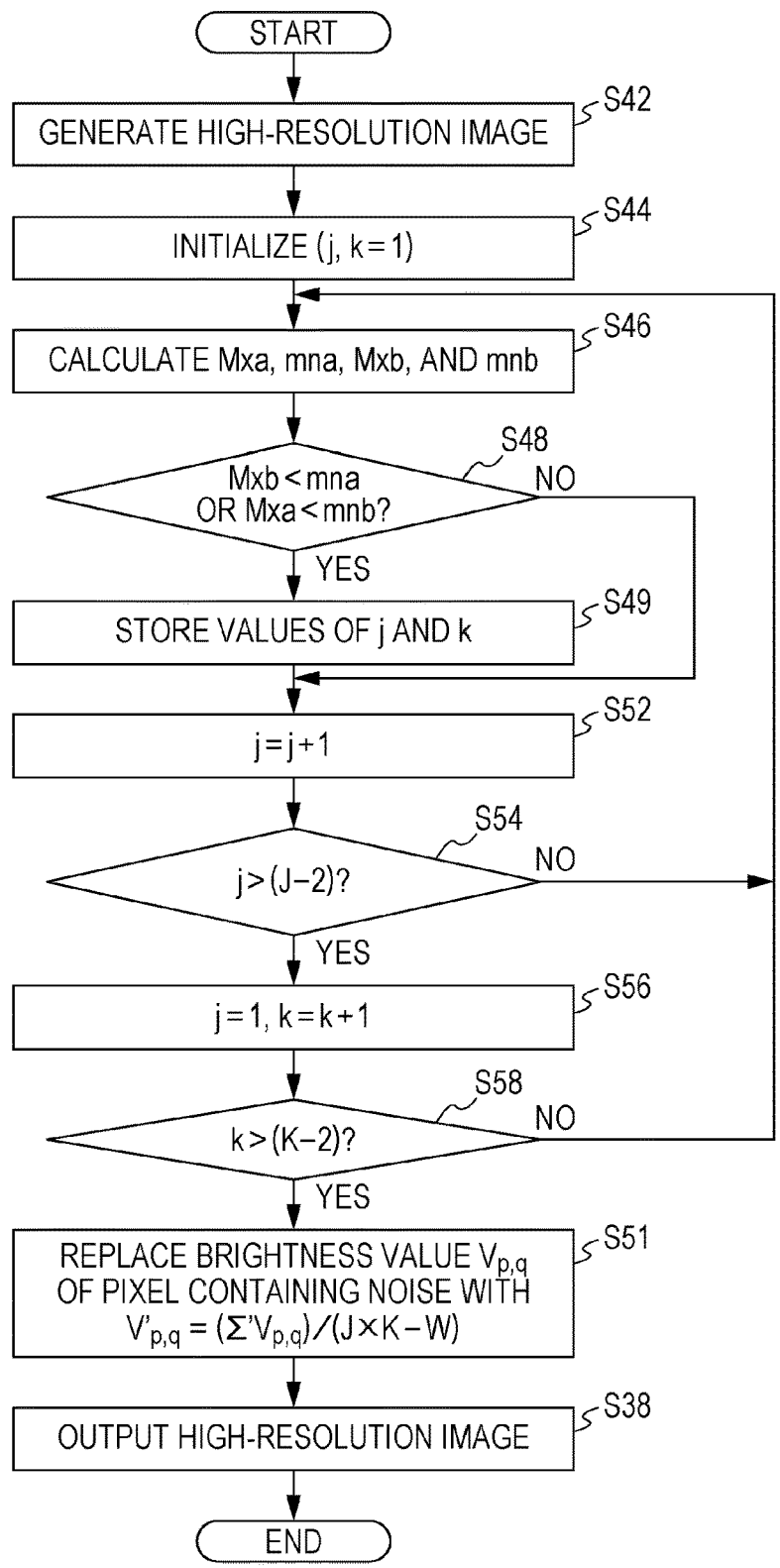
FIG. 24A is a flowchart illustrating an example of a combination of a noise detection process using filters and a noise removal process.

FIG. 24A is a flowchart illustrating an example of a combination of the noise detection process using filters and the noise removal process. For the sake of simplicity, the case where a plurality of sub-images constituting a high-resolution image have already been obtained will be described below as an example. A group of these images are temporarily stored in the memory 160 (see FIG. 11), for example.

In the example illustrated in FIG. 24A, the first example of the noise removal method described above is applied after the noise detection process using filters. First in step S42, a high-resolution image is generated using the plurality of sub-images. At this point, the high-resolution image contains noise resulting from a foreign object located at a distance different from a distance of the object 2 from the surface of the photodiodes 4p.

Then in step S44, variables j and k used to specify the coordinates of a pixel are initialized, where j and k are variables each taking an integer value. Here, 1 is assigned to each of j and k.

Then in step S46, Mxa, mna, Mxb, and mnb are calculated by applying filters to a pixel block in the high-resolution image. For example, the above-described filters Fa and Fb are applied to a pixel block of 3 rows×3 columns.

Then in step S48, it is determined whether either Mxb<mna or Mxa<mnb is satisfied. If either Mxb<mna or Mxa<mnb is satisfied, the process proceeds to step S49. If neither Mxb<mna nor Mxa<mnb is satisfied, step S49 is skipped and the process proceeds to step S52.

If either Mxb<mna or Mxa<mnb is satisfied, it can be determined that four pixels located at the corners of the pixel block are pixels containing noise. Thus, in step S49, information regarding coordinate values of the pixels containing noise is stored in memory 160, for example. For example, values of j and k at that time are stored in the memory 160.

Then in step S52, the variable j is incremented. In step S54, it is determined whether j>(J−2) is satisfied. Here, J denotes the number of rows of pixels included in the high-resolution image. If j (J−2) is satisfied, the process returns to step S46. If j>(J−2) is satisfied, the process proceeds to step S56, in which 1 is assigned to j and k is incremented. Then in step S58, it is determined whether k>(K−2) is satisfied. Here, K denotes the number of columns of pixels included in the high-resolution image. If k (K−2) is satisfied, the process returns to step S46. That is, the process for detecting pixels containing noise is performed for all pixel blocks in the high-resolution image. If k>(K−2) is satisfied, the process proceeds to step S51.

In step S51, the pixel values of the pixels containing noise are replaced with pixel values calculated from pixel values of pixels not containing noise. The position of each pixel containing noise can be determined based on the values of j and k stored in the memory 160. In this example, the pixel values $V_{p,q}$ of the pixels containing noise are collectively replaced with the pixel value $V'_{p,q}$ determined using Equation (1) above. The process then proceeds to step S38, in which the high-resolution image obtained by removing noise is output to an external device as needed.

Figure 24B:
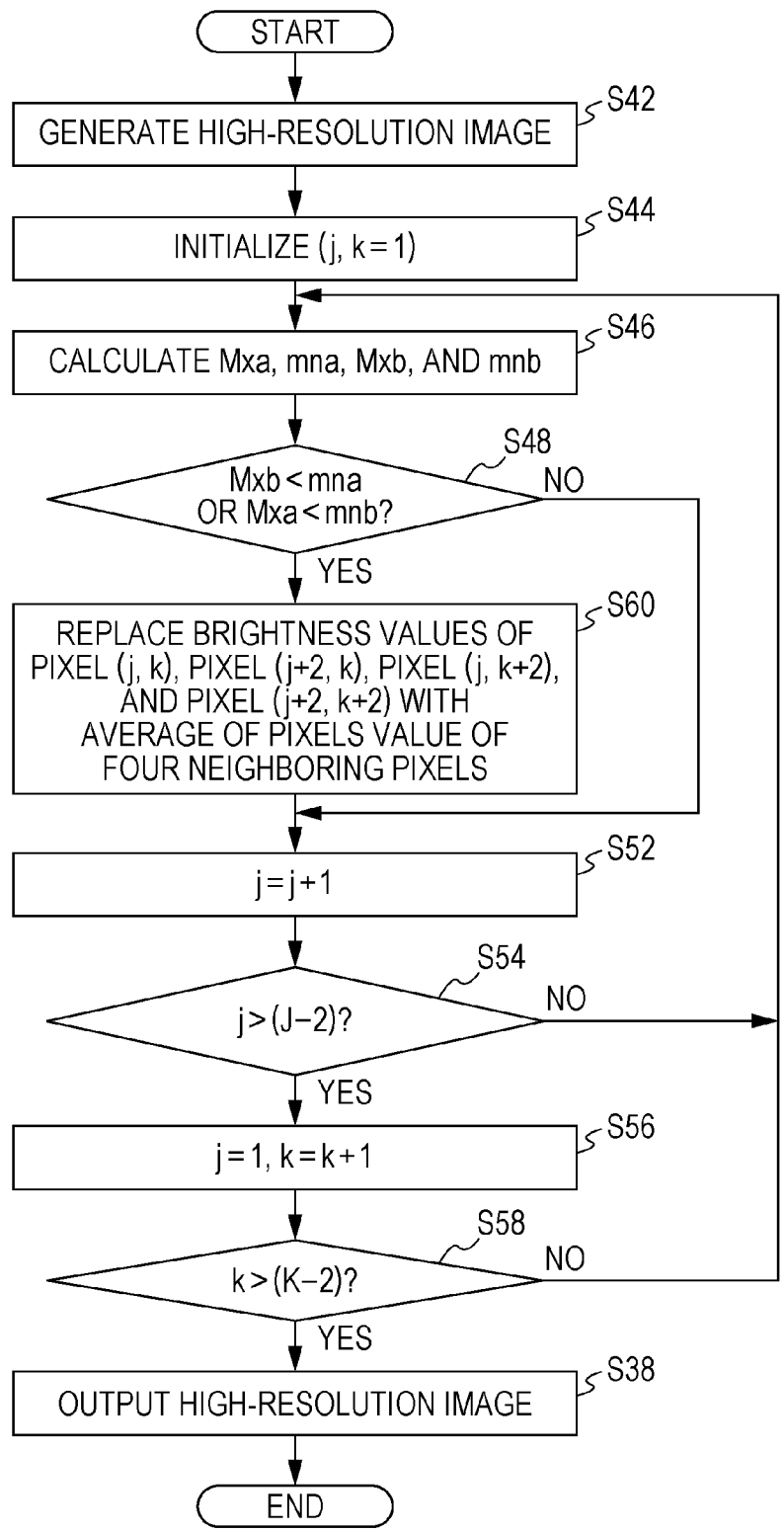
FIG. 24B is a flowchart illustrating another example of the combination of the noise detection process using filters and the noise removal process.

FIG. 24B is a flowchart illustrating another example of the combination of the noise detection process using filters and the noise removal process. In the example illustrated in FIG. 24B, the second example described above is employed as the noise removal process. The description regarding steps common to those of the process described with reference to FIG. 24A is not repeated below.

In the example illustrated in FIG. 24B, if it is determined in step S48 that either Mxb<mna or Mxa<mnb is satisfied, the process proceeds to step S60. In step S60, pixel values of four pixels whose coordinate values are (j, k), (j+2, k), (j, k+2), and (j+2, k+2) are replaced with other pixel values. In this example, the pixel value of each pixel containing noise is replaced with a pixel value calculated using pixel values of neighboring pixels of the pixel containing noise. For example, as for the pixel whose coordinate value is (j, k), the pixel value of the pixel is replaced with an average of pixel values of four neighboring pixels of the pixel. In other words, the pixel value is replaced with a pixel value determined using Equation (2) above. Note that in the case where some of four neighboring pixel of a pixel containing noise are not obtained because the corresponding pixel block is located at a periphery potion of the high-resolution image, for example, 0 can be used as pixel values of lacking pixels.

Then, the process proceeds to step S52, and the processing of detecting and replacing pixels containing noise is performed on all pixel blocks in the high-resolution image. If it is determined in step S58 that k>(K−2) is satisfied, the process proceeds to step S38, and the process sequence ends.

FIG. 24C is a flowchart illustrating still another example of the combination of the noise detection process using filters and the noise removal process. In the example illustrated in FIG. 24C, the third example described above is employed as the noise removal process. For the sake of simplicity, the case where a sub-image used to replace pixels containing noise has already been obtained in addition to the plurality of sub-images constituting a high-resolution image will be described as an example. The sub-image used to replace pixels containing noise is temporarily stored in the memory 160 (see FIG. 11), for example. The number of sub-images used to replace pixels containing noise is not limited to one and may be plural.

In the example illustrated in FIG. 24C, if it is determined in step S48 that either Mxb<mna or Mxa<mnb is satisfied, the process proceeds to step S50. In step S50, pixel values of four pixels whose coordinate values (j, k), (j+2, k), (j, k+2), and (j+2, k+2) are replaced with other pixel values. In this case, these pixels containing noise are replaced with pixels denoting an image of a certain region of the object but not containing noise. The pixels not containing noise are pixels included in an image obtained when illuminating light is radiated from a radiation direction different from those used when the sub-images constituting the high-resolution image are obtained.

The following processing is the same as that of the example illustrated in FIG. 24B. That is, the processing of detecting and replacing pixels containing noise is performed for all pixel blocks in the high-resolution image.

Figure 24D:
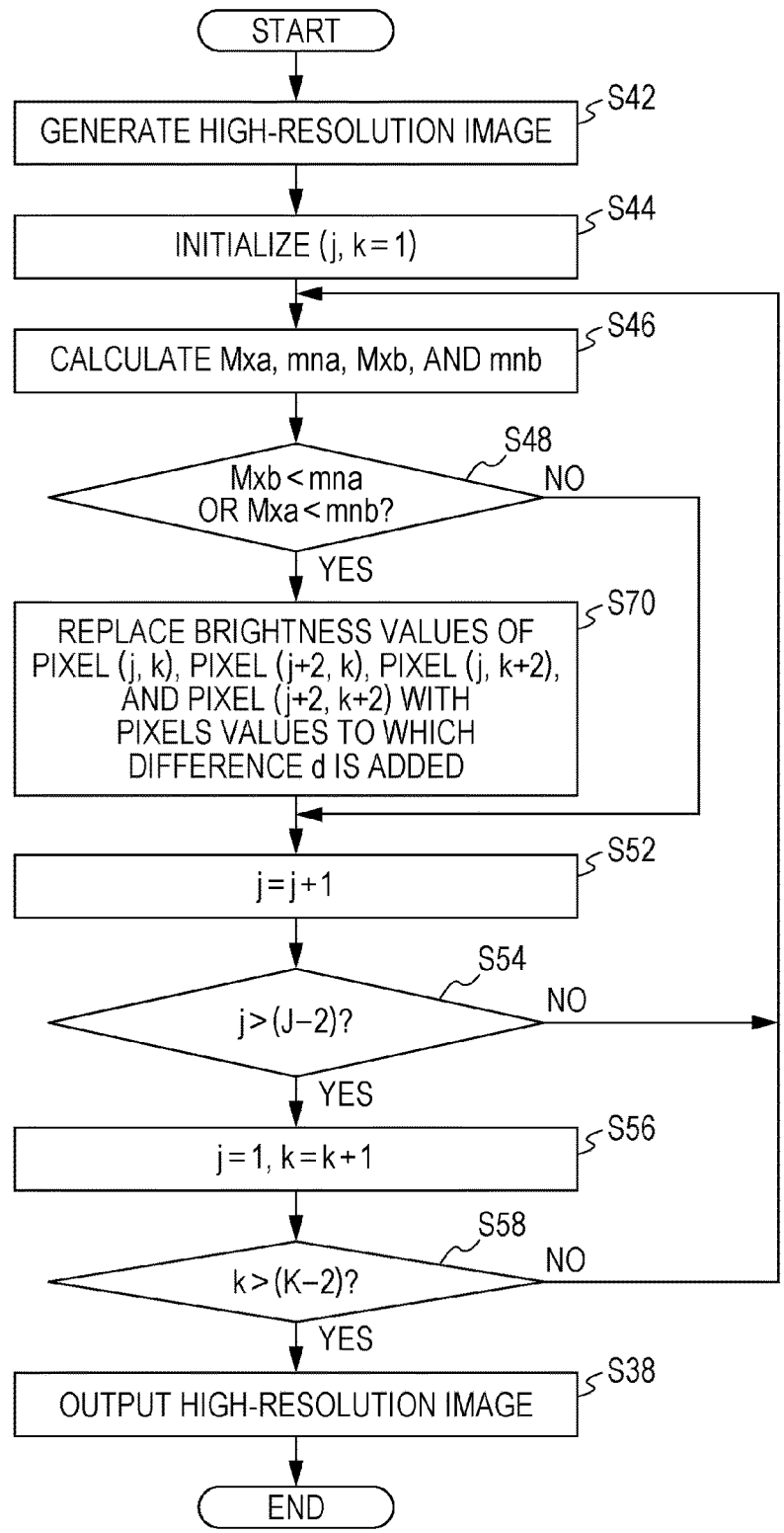
FIG. 24D is a flowchart illustrating yet another example of the combination of the noise detection process using filters and the noise removal process.

FIG. 24D is a flowchart illustrating yet another example of the combination of the noise detection process using filters and the noise removal process. In the example illustrated in FIG. 24D, the fourth example described above is employed as the noise removal process.

In the example illustrated in FIG. 24D, if it is determined in step S48 that either Mxb<mna or Mxa<mnb is satisfied, the process proceeds to step S70. In step S70, pixel values of four pixels whose coordinate values are (j, k), (j+2, k), (j, k+2), and (j+2, k+2) are replaced with other pixel values. In this example, the pixel value of each pixel containing noise is replaced with a corrected pixel value. Specifically, a difference d between a pixel value of a pixel containing neither an image of a foreign object nor an image of the object and a pixel value of a pixel containing the image of the foreign object but not containing the image of the object is added to the pixel value of the pixel containing noise. The difference d may be determined in advance before or after step S42 in which the high-resolution image is generated. The processing following step S70 is the same as that of the examples illustrated in FIG. 24B and FIG. 24C.

<Image Sensor Used in Module>

Note that, in the embodiment of the present disclosure, the image sensor 4 is not limited to a CCD image sensor and may be a CMOS (Complementary Metal-Oxide Semiconductor) image sensor or an image sensor of another type (for example, a photoelectric-converter-film-stacked image sensor described later). The CCD image sensor and the CMOS image sensor may be either a front-illuminated type or a back-illuminated type. A relationship between an element structure of the image sensor and light incident on photodiodes or a photoelectric converter film of the image sensor will be described below.

Figure 25:
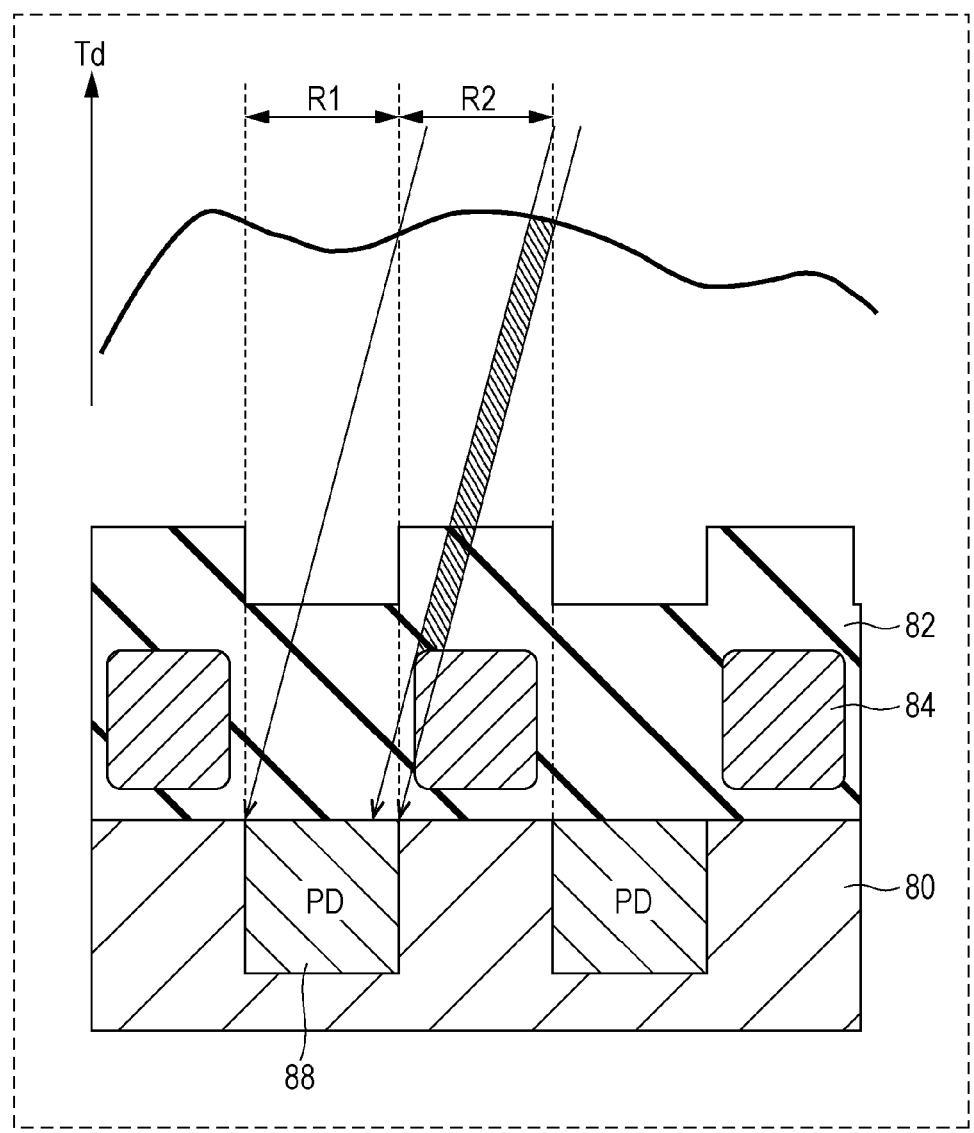
FIG. 25 is a diagram illustrating an example of a cross-sectional structure of a CCD image sensor and an example of a distribution of relative transmittance Td of the object.

FIG. 25 illustrates examples of a cross-sectional structure of the CCD image sensor and a distribution of relative transmittance Td of the object. As illustrated in FIG. 25, the CCD image sensor generally includes a substrate 80, an insulating layer 82 on the substrate 80, and lines 84 disposed in the insulating layer 82. A plurality of photodiodes 88 are disposed on the substrate 80. A light-shielding layer (not illustrated in FIG. 25) is disposed above the lines 84. In this figure, illustration of transistors and the like is omitted. Illustration of transistors and the like are also omitted in the following figures. Schematically, the cross-sectional structure around the photodiodes in a front-illuminated CMOS image sensor is substantially the same as a cross-sectional structure near the photodiodes in the CCD image sensor. Accordingly, the illustration and description of the cross-sectional structure of the front-illuminated CMOS image sensor are omitted.

When illuminating light is incident from a direction of a normal of the imaging surface as illustrated in FIG. 25, light that has passed through a region R1 of the object located right above the photodiode 88 is incident on the photodiode 88. On the other hand, light that has passed through a region R2 of the object located right above the light-shielding layer of the line 84 is incident on a light-shielding region (region where a light-shielding film is disposed) of the image sensor. Accordingly, when light is radiated from the direction of the normal of the imaging surface, an image denoting the region R1 of the object located right above the photodiode 88 is obtained.

To obtain an image denoting a region right above the light-shielding film, light can be radiated from a direction tilted with respect to the direction of the normal of the imaging surface so that light that has passed through the region R2 is incident on the photodiode 88. In this case, part of light that has passed through the region R2 may be blocked by the line 84 depending on the radiation direction. In the illustrated example, a light beam that passes through a hatched portion does not reach the photodiode 88. Accordingly, the pixel value may decrease to some extent when light is incident diagonally. However, since light that has passed through is not entirely blocked, a high-resolution image can still be generated using the sub-image thus obtained.

Figure 26:
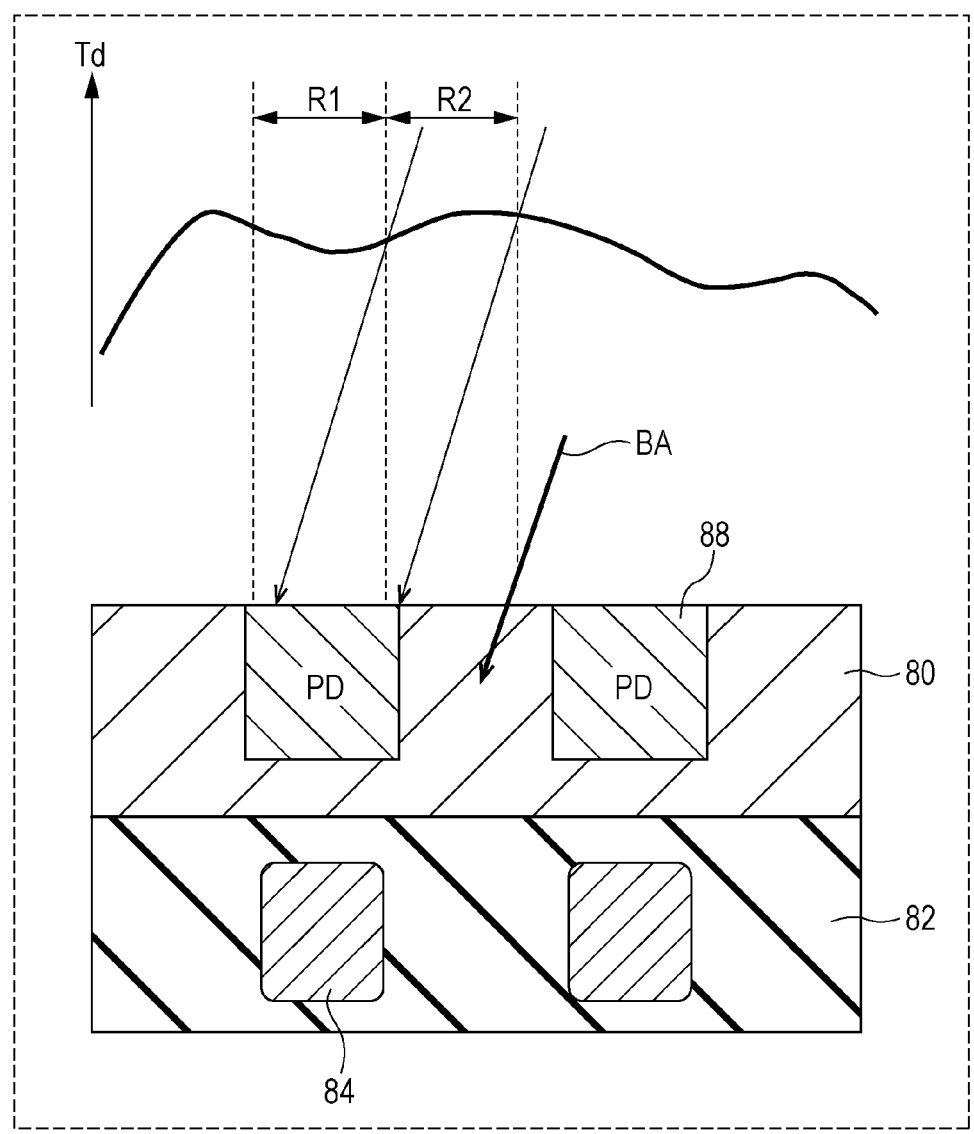
FIG. 26 is a diagram illustrating an example of a cross-sectional structure of a back-illuminated CMOS image sensor and an example of a distribution of relative transmittance Td of the object.
Figure 27:
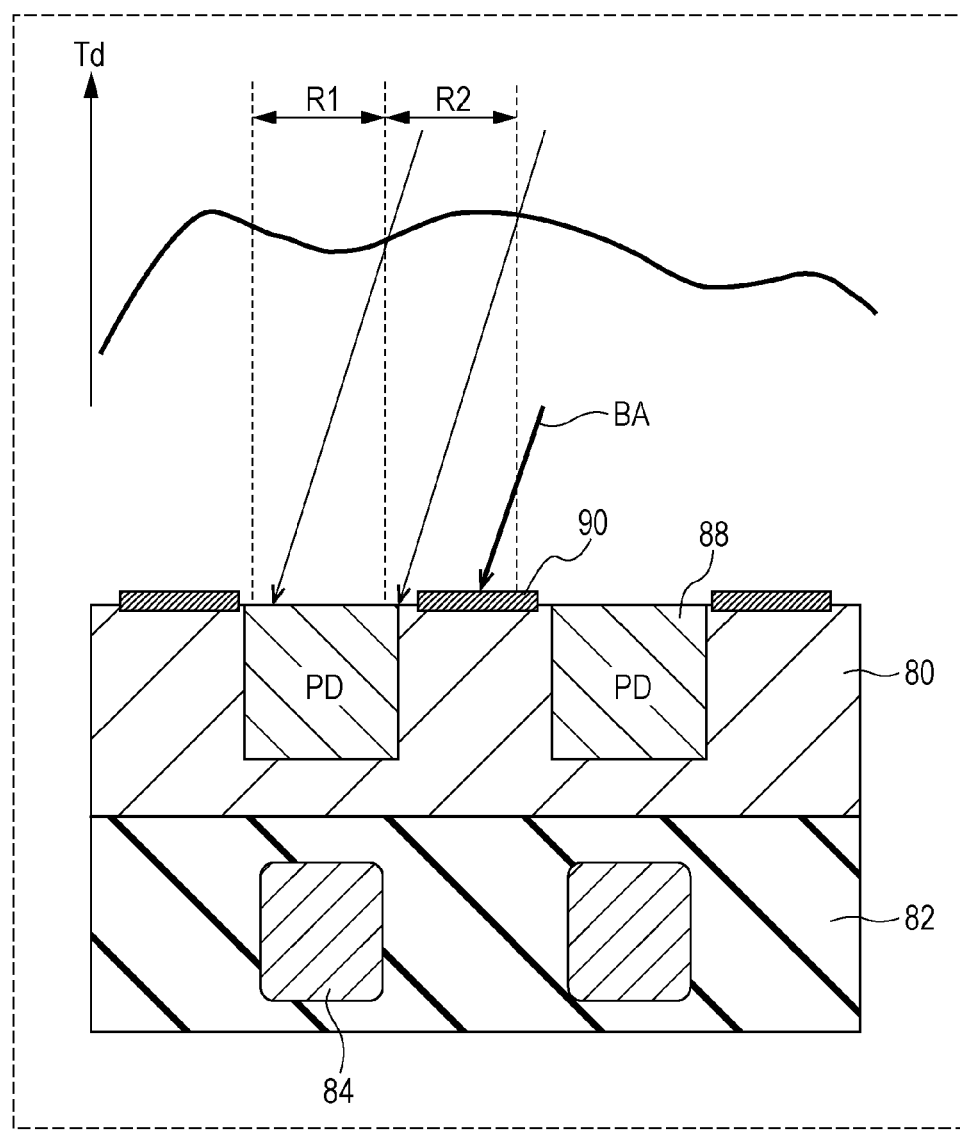
FIG. 27 is a diagram illustrating an example of a cross-sectional structure of a back-illuminated CMOS image sensor and an example of a distribution of relative transmittance Td of the object.

FIG. 26 and FIG. 27 each illustrate examples of a cross-sectional structure of a back-illuminated CMOS image sensor and a distribution of relative transmittance Td of the object. As illustrated in FIG. 26, light that has passed through is not blocked by the line 84 in a back-illuminated CMOS image sensor even if the light is incident diagonally. However, noise is caused as a result of light that has passed through another region of the object different from a region for which imaging is desired (light schematically indicated by a thick arrow BA in FIG. 26 and FIG. 27 described below) being incident on the substrate 80, and the quality of the sub-image may deteriorate. Such deterioration can be suppressed by disposing a light-shielding layer 90 on a region other than the regions where the photodiodes are formed on the substrate as illustrated in FIG. 27.

Figure 28:
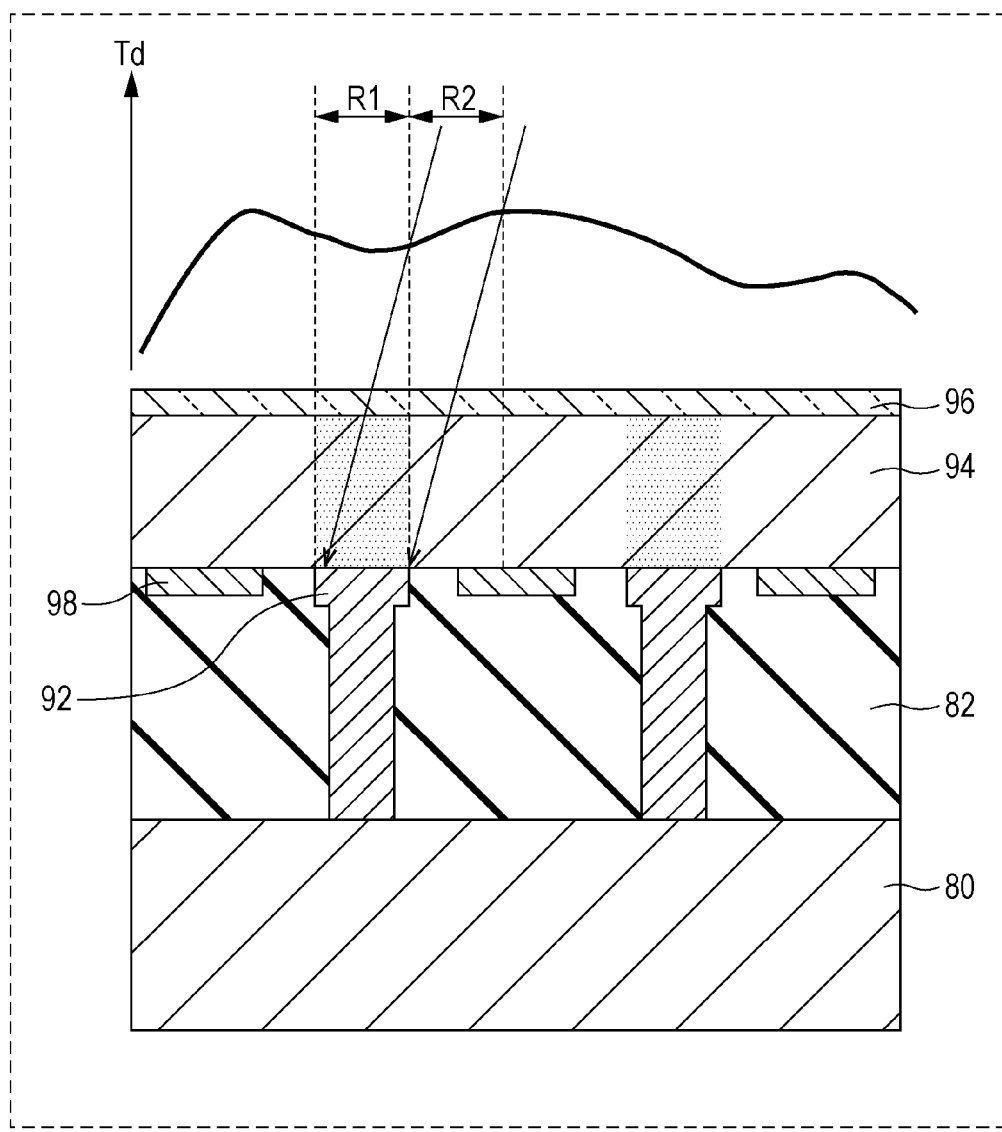
FIG. 28 is a diagram illustrating an example of a cross-sectional structure of a photoelectric-converter-film-stacked image sensor and an example of a distribution of relative transmittance Td of the object.

FIG. 28 illustrates an example of a cross-sectional structure of an image sensor (hereinafter, referred to as a "photoelectric-converter-film-stacked image sensor") including a photoelectric converter film formed of an organic material or an inorganic material and a distribution of relative transmittance Td of the object.

As illustrated in FIG. 28, the photoelectric-converter-film-stacked image sensor generally includes the substrate 80, the insulating layer 82 in which a plurality of pixel electrodes are disposed, a photoelectric converter film 94 on the insulating layer 82, and a transparent electrode 94 on the photoelectric converter film 94. As illustrated, in the photoelectric-converter-film-stacked image sensor, the photoelectric converter film 94 that performs photoelectric conversion is disposed above the substrate 80 (semiconductor substrate, for example) instead of photodiodes disposed on the semiconductor substrate. The photoelectric converter film 94 and the transparent electrode 96 are typically disposed all over the imaging surface. In this figure, illustration of a protection film that protects the photoelectric converter film 94 is omitted.

In the photoelectric-converter-film-stacked image sensor, electric charge (electrons or holes) generated by photoelectric conversion of light incident on the photoelectric converter film 94 is collected by the pixel electrode 92. In this way, a value denoting an amount of light incident on the photoelectric converter film 94 is obtained. Thus, it is considered that a unit region including one pixel electrode 92 on the imaging surface is equivalent to one unit pixel cell in the photoelectric-converter-film-stacked image sensor. Light that has passed through is not blocked by lines in the photoelectric-converter-film-stacked image sensor as in the back-illuminated CMOS image sensor even if the light is incident diagonally.

As described with reference to FIG. 1A to FIG. 6, a plurality of sub-images denoting images of different portions of the object are used to generate a high-resolution image. However, since the photoelectric converter film 94 is disposed all over the imaging surface in a typical photoelectric-converter-film-stacked image sensor, photoelectric conversion may be induced at the photoelectric converter film 94 by light that has passed through a region other than a desired region of the object even if light is incident vertically, for example. If unwanted electrons or holes thus generated are transferred to the pixel electrode 92, an appropriate sub-image may fail to be obtained. Accordingly, it is beneficial to selectively transfer electric charge generated in a region (dotted region in FIG. 28) where the pixel electrode 92 and the transparent electrode 96 overlap.

In the configuration illustrated in FIG. 28, a dummy electrode 98 is provided for each of the pixel electrodes 92 in the corresponding pixel. An appropriate potential difference is applied across the pixel electrode 92 and the dummy electrode 98 when an image of the object is obtained. With this configuration, electric charge generated in a region other than the region where the pixel electrode 92 and the transparent electrode 96 overlap can be transferred to the dummy electrode 98 and electric charge generated in the region where the pixel electrode 92 and the transparent electrode 96 overlap can be selectively transferred to the pixel electrode 92. Note that the similar effect can be obtained with patterning of the transparent electrode 96 or the photoelectric converter film 94. In such a configuration, it is considered that a region (dotted region in FIG. 28) of the photoelectric converter film 94 having an overlap with the pixel electrode 92 is equivalent to a photodiode (photoelectric converter) in the CCD image sensor and the CMOS image sensor. Thus, a ratio (S3/S1) of an area S3 of the pixel electrode 92 to an area S1 of a unit pixel cell is equivalent to the "aperture ratio".

As already described, if the aperture ratio of the image sensor 4 is approximately equal to 1/N, where N is an integer of 2 or greater, up to N-times higher resolution can be realized. In other words, a smaller aperture ratio is advantageous to increase the resolution. In the photoelectric-converter-film-stacked image sensor, the ratio (S3/S1) equivalent to the aperture ratio can be adjusted by adjusting the area S3 of the pixel electrode 92. This ratio (S3/S1) is set, for example, in a range of 10% to 50%. The photoelectric-converter-film-stacked image sensor whose ratio (S3/S1) is within the above range can be used for super resolution.

Note that the surface of the CCD image sensor and the back-illuminated CMOS image sensor that faces the object is not flat, as is clear from FIG. 25 and FIG. 27. For example, the CCD image sensor has an uneven surface. In addition, since a patterned light-shielding layer needs to be provided on the imaging surface to obtain sub-images used to generate a high-resolution image in the back-illuminated CMOS image sensor, the surface facing the object is not flat.

In contrast, the imaging surface of the photoelectric-converter-film-stacked image sensor is a substantially flat surface as is apparent from FIG. 28. Accordingly, the shape of the object is hardly deformed by the shape of the imaging surface even if the object is positioned on the imaging surface. In other words, a more detailed structure of the object can be observed by obtaining sub-images using the photoelectric-converter-film-stacked image sensor.

The various aspects described above in this specification can be combined with each other unless any contradiction occurs.

According to the embodiment of the present disclosure, noise resulting from a foreign object located at a distance different from a distance of an object from a surface of photoelectric converters can be detected and removed. The technique of the embodiment of the present disclosure is particularly useful to generate a high-resolution image. According to the embodiment of the present disclosure, the practical usability of a resolution-increasing technique that realizes a resolution exceeding the intrinsic resolution of an image sensor can improve. The high-resolution image provides information useful for pathological diagnosis, for example.

What is claimed is:

1. An image generating system comprising:
   an image obtaining device;
   an image processing circuit; and
   an image generating circuit,
   the imaging obtaining device including an illuminating system that emits illuminating light toward an object and having one or more light sources, a stage to which a module is removably mounted, and a stage driving mechanism capable of changing orientation of the stage,
   wherein the illuminating system emits a first illuminating light toward an object from a first direction based on a first orientation of the stage and emits a second illuminating light toward the object from a second direction different from the first direction after emitting the first illuminating light based on a second orientation of the stage, the object being included in a module in which an imaging element including a plurality of photoelectric converters and the object including a first portion and a second portion adjacent to the first portion are integrated together,
   the plurality of photoelectric converters obtains a first plurality of pixel values including a first pixel value, based on first resulting light obtained as a result of the first illuminating light passing through the object, and obtains a second plurality of pixel values including a second pixel value, based on second resulting light obtained as a result of the second illuminating light passing through the object,
   the plurality of photoelectric converters includes a first photoelectric converter and a second photoelectric converter,
   the first photoelectric converter outputs the first pixel value, based on part of the first resulting light obtained as a result of part of the first illuminating light passing through the first portion,
   the second photoelectric converter outputs the second pixel value, based on part of the second resulting light obtained as a result of part of the second illuminating light passing through the second portion,
   the first photoelectric converter and the second photoelectric converter are one and the same or are adjacent to each other in the imaging element,
   the image processing circuit determines whether an absolute value of a difference between the first pixel value and the second pixel value is larger than a predetermined threshold,
   the image generating circuit generates an image based on the first plurality of pixel values and the second plurality of pixel values, and
   the number of pixel values in the generated image is more than the number of the first plurality of pixel values and the number of the second plurality of pixel values.

2. The image generating system according to claim 1, wherein the image processing circuit determines that the first pixel value is a pixel value of a pixel containing noise if the absolute value of the difference between the first pixel value and the second pixel value is larger than the predetermined threshold and the first pixel value is smaller than the second pixel value, and
   determines that the second pixel value is a pixel value of a pixel containing noise if the absolute value of the difference between the first pixel value and the second pixel value is larger than the predetermined threshold and the first pixel value is larger than the second pixel value.

3. The image generating system according to claim 2, wherein the image processing circuit replaces the pixel value of the pixel determined to be a pixel containing noise with another pixel value.

4. The image generating system according to claim 3, wherein the other pixel value is a pixel value calculated from a pixel value of a pixel other than the pixel determined to be a pixel containing noise.

5. The image generating system according to claim 4, wherein the other pixel value is a pixel value calculated using pixel values of four neighboring pixels that are a group constituted by four pixels vertically and horizontally adjacent to the pixel determined to be a pixel containing noise in the image or using pixel values of eight neighboring pixels that are a group constituted by four pixels vertically and horizontally adjacent to the pixel determined to be a pixel containing noise and by four pixels diagonally adjacent to the pixel determined to be a pixel containing noise.

6. The image generating system according to claim 3, wherein the other pixel value is one of a third plurality of pixel values output from the plurality of photoelectric converters when the object is irradiated with light from a third direction different from the first direction and the second direction.

7. The image generating system according to claim 3, wherein the pixel containing noise is a pixel containing noise resulting from a foreign object located farther from an imaging surface of the imaging element than the object, and
wherein the other pixel value is a pixel value obtained by adding, to a pixel value of the pixel determined to be the pixel containing noise, a difference between a pixel value of a pixel containing neither an image of the foreign object nor an image of the object and a pixel value of a pixel containing the image of the foreign object but not containing the image of the object.

8. The image generating system according to claim 1, wherein the image processing circuit extracts the first pixel value and the second pixel value from the image generated by the image generating circuit and determines whether the absolute value of the difference between the first pixel value and the second pixel value is larger than the predetermined threshold.

9. The image generating system according to claim 8, wherein the image processing circuit detects a pixel value of the pixel containing noise from among pixels included in the image, based on a magnitude of a change in pixel values of pixels in a pixel block that constitutes a section of the image and that includes a plurality of pixels.

10. The image generating system according to claim 1, wherein the illuminating system includes a plurality of light sources that emit light of wavelength ranges different from each other.

11. The image generating system according to claim 1, wherein the illuminating system includes a plurality of light sources that are disposed at different positions corresponding to the plurality of different radiation directions and that sequentially emit a plurality of beams of illuminating light including the first illuminating light and the second illuminating light.

12. The image generating system according to any of claim 1, wherein the illuminating system includes a goniomechanism that changes at least one of orientation of the stage and directions of the one or more light sources.

13. An image generation method for an image generating system, the image generating system including an image obtaining device, an image processing circuit, an image generating circuit, and the imaging obtaining device including an illuminating system that emits illuminating light toward an object and having one or more light sources, a stage to which a module is removably mounted, and a stage driving mechanism capable of changing orientation of the stage, the image generation method comprising:
irradiating the object with a first illuminating light from a first direction based on a first orientation of the stage and irradiating the object with a second illuminating light from a second direction different from the first direction after irradiation with the first illuminating light based on a second orientation of the stage, and obtaining a first plurality of pixel values including a first pixel value, based on first resulting light obtained as a result of the first illuminating light passing through the object, and obtaining a second plurality of pixel values including a second pixel value, based on second resulting light obtained as a result of the second illuminating light passing through the object, the object being included in a module in which an imaging element including a plurality of photoelectric converters and the object including a first portion and a second portion adjacent to the first portion are integrated together, wherein
the plurality of photoelectric converters includes a first photoelectric converter and a second photoelectric converter,
the first photoelectric converter outputs the first pixel value, based on part of the first resulting light obtained as a result of part of the first illuminating light passing through the first portion,
the second photoelectric converter outputs the second pixel value, based on part of the second resulting light obtained as a result of part of the second illuminating light passing through the second portion, and
the first photoelectric converter and the second photoelectric converter are one and the same or are adjacent to each other in the imaging element;
determining whether an absolute value of a difference between the first pixel value and the second pixel value is larger than a predetermined threshold; and
generating an image based on the first plurality of pixel values and the second plurality of pixel values, the image including a larger number of pixel values than the number of the first plurality of pixel values and the number of the second plurality of pixel values.

14. An imaging element used in an image generating system including an image obtaining device, an image processing circuit, and an image generating circuit, and the imaging obtaining device including an illuminating system that emits illuminating light toward an object and having one or more light sources, a stage to which a module is removably mounted, and a stage driving mechanism capable of changing orientation of the stage, the imaging element comprising: a plurality of photoelectric converter,
wherein the illuminating system emits a first illuminating light toward an object from a first direction based on a first orientation of the stage and emits a second illuminating light toward the object from a second direction different from the first direction after emitting the first illuminating light based on a second orientation of the stage, the object including a first portion and a second portion adjacent to the first portion, and the plurality of photoelectric converters included in the imaging element disposed at a position at which light that has passed through the object is incident obtain a first plurality of pixel values including a first pixel value, based on first resulting light obtained as a result of the first illuminating light passing through the object, and obtain a second plurality of pixel values including a second pixel value, based on second resulting light obtained as a result of the second illuminating light passing through the object, the plurality of photoelectric converters includes a first photoelectric converter and a second photoelectric converter, the first photoelectric converter outputs the first pixel value, based on part of the first resulting light obtained as a result of part of the first illuminating light passing through the first portion, the second photoelectric converter outputs the second pixel value, based on part of the second resulting light obtained as a result of part of the second illuminating light passing through the second portion, the first photoelectric converter and the second photoelectric converter are one and the same or are adjacent to each other in the imaging element, the image processing circuit determines whether an absolute value of a difference between the first pixel value and the second pixel value is larger than a predetermined threshold, the image generating circuit generates an image based on the first plurality of pixel values and the second plurality of pixel values, the image including a larger number of pixel values than the number of the first plurality of pixel values and the number of the second plurality of pixel values, and the imaging element
is removably attached to the image obtaining device, and includes an object support at which the object can be positioned on a surface on which the first resulting light or the second resulting light is incident in a state where the imaging element is attached to the image obtaining device.

15. A non-transitory computer-readable recording medium for an image generating system, the image generating system including an image obtaining device, an image processing circuit, an image generating circuit, and the imaging obtaining device including an illuminating system that emits illuminating light toward an object and having one or more light sources, a stage to which a module is removably mounted, and a stage driving mechanism capable of changing orientation of the stage, the non-transitory computer-readable recording medium including a control program causing a device including a processor to execute a process, the, the process comprising:

(a) irradiating an object with a first illuminating light from a first direction based on a first orientation of the stage and irradiating the object with a second illuminating light from a second direction different from the first direction after irradiation with the first illuminating light based on a second orientation of the stage, and obtaining a first plurality of pixel values including a first pixel value, based on first resulting light obtained as a result of the first illuminating light passing through the object, and obtaining a second plurality of pixel values including a second pixel value, based on second resulting light obtained as a result of the second illuminating light passing through the object, the object being included in a module in which an imaging element including a plurality of photoelectric converters and the object including a first portion and a second portion adjacent to the first portion are integrated together, wherein the plurality of photoelectric converters includes a first photoelectric converter and a second photoelectric converter, the first photoelectric converter outputs the first pixel value, based on part of the first resulting light obtained as a result of part of the first illuminating light passing through the first portion, the second photoelectric converter outputs the second pixel value, based on part of the second resulting light obtained as a result of part of the second illuminating light passing through the second portion, and the first photoelectric converter and the second photoelectric converter are one and the same or are adjacent to each other in the imaging element;

(b) determining whether an absolute value of a difference between the first pixel value and the second pixel value is larger than a predetermined threshold; and (c) generating an image based on the first plurality of pixel values and the second plurality of pixel values, the image including a larger number of pixel values than the number of the first plurality of pixel values and the number of the second plurality of pixel values.

16. The image generating system according to claim 1, wherein no lens is provided between the object and the imaging element.

17. The image generation method according to claim 13, wherein no lens is provided between the object and the imaging element.

18. The imaging element according to claim 14, wherein no lens is provided between the object and the imaging element.

19. The recording medium accordingly to claim 15, wherein no lens is provided between the object and the imaging element.

* * * * *